(12) United States Patent
Naganawa et al.

(10) Patent No.: US 11,571,634 B2
(45) Date of Patent: Feb. 7, 2023

(54) METHOD AND APPARATUS FOR PRODUCING SPECIFIC SUBSTANCES BY EXTRACTION AND SEPARATION IN A LIQUID-LIQUID SYSTEM

(71) Applicant: Japan Atomic Energy Agency, Ibaraki (JP)

(72) Inventors: Hirochika Naganawa, Nakagun (JP); Tetsushi Nagano, Nakagun (JP)

(73) Assignee: Japan Atomic Energy Agency, Ibaraki (JP)

( * ) Notice: Subject to any disclaimer, the term of this patent is extended or adjusted under 35 U.S.C. 154(b) by 0 days.

(21) Appl. No.: 16/903,622

(22) Filed: Jun. 17, 2020

(65) Prior Publication Data

US 2020/0398185 A1 Dec. 24, 2020

(30) Foreign Application Priority Data

Jun. 19, 2019 (JP) .............................. JP2019-113657
Dec. 25, 2019 (JP) .............................. JP2019-234265

(51) Int. Cl.
  *B01D 11/04* (2006.01)
  *C22B 59/00* (2006.01)
  *C01F 17/17* (2020.01)

(52) U.S. Cl.
  CPC ...... *B01D 11/0426* (2013.01); *B01D 11/0488* (2013.01); *B01D 11/0492* (2013.01); *C01F 17/17* (2020.01); *C22B 59/00* (2013.01)

(58) Field of Classification Search
  CPC ............ B01D 11/0426; B01D 11/0488; B01D 11/0492; B01D 11/0446; B01D 11/02; B01D 11/0242; B01D 11/028; B01D 11/0288; B01D 11/0292; B01D 11/04; B01D 2011/002; B01D 2221/04; C22B 59/00; C22B 3/3844; C22B 3/16; C22B 3/20; C22B 3/26; C01F 17/17; C01F 17/10; Y02P 10/20; B01F 25/50
  See application file for complete search history.

(56) References Cited

U.S. PATENT DOCUMENTS

| | | | | |
|---|---|---|---|---|
| 8,177,881 | B2 * | 5/2012 | Sugahara | C22B 3/26 75/723 |
| 10,407,752 | B2 * | 9/2019 | Sugahara | C22B 3/26 |
| 11,015,142 | B1 * | 5/2021 | Thompson | B01D 11/0407 |

(Continued)

FOREIGN PATENT DOCUMENTS

| | | | |
|---|---|---|---|
| JP | 3223132 B2 | 10/2001 |
| JP | 5305382 B2 | 10/2013 |

(Continued)

*Primary Examiner* — Joseph W Drodge
(74) *Attorney, Agent, or Firm* — Crowell & Moring LLP

(57) ABSTRACT

A new system in which a forward extraction part, a scrubbing part, and a backward extraction part operate together and synchronously to produce specific substances by extraction and separation in a liquid-liquid system. The aqueous phase is circulated independently only in the forward extraction part one or more times, and the organic phase is circulated from the forward extraction part through the scrubbing part and the backward extraction part to the forward extraction part again in synchronization with the liquid circulation of the aqueous phase.

19 Claims, 51 Drawing Sheets

(56) References Cited

U.S. PATENT DOCUMENTS

| | | | |
|---|---|---|---|
| 2005/0218072 A1* | 10/2005 | San Lorenzo | B01D 17/0208 210/634 |
| 2006/0113246 A1* | 6/2006 | Ekman | C22B 3/26 134/40 |
| 2010/0319491 A1* | 12/2010 | Sugahara | C22B 59/00 75/743 |
| 2012/0085706 A1* | 4/2012 | Bryce | C22B 3/26 210/643 |
| 2012/0328493 A1* | 12/2012 | Sugahara | C01F 17/17 423/21.5 |
| 2013/0001096 A1* | 1/2013 | Mizuguchi | C22B 3/46 205/560 |
| 2014/0127095 A1* | 5/2014 | Bednarski | C22B 60/0226 423/21.5 |
| 2016/0304986 A1* | 10/2016 | Sugahara | B01D 11/04 |
| 2016/0312137 A1* | 10/2016 | Bohn | B01D 53/1425 |

FOREIGN PATENT DOCUMENTS

| | | |
|---|---|---|
| JP | 5565719 B2 | 8/2014 |
| JP | 5733691 B2 | 6/2015 |
| JP | 6483886 B2 | 3/2019 |
| JP | 6488512 B2 | 3/2019 |

\* cited by examiner

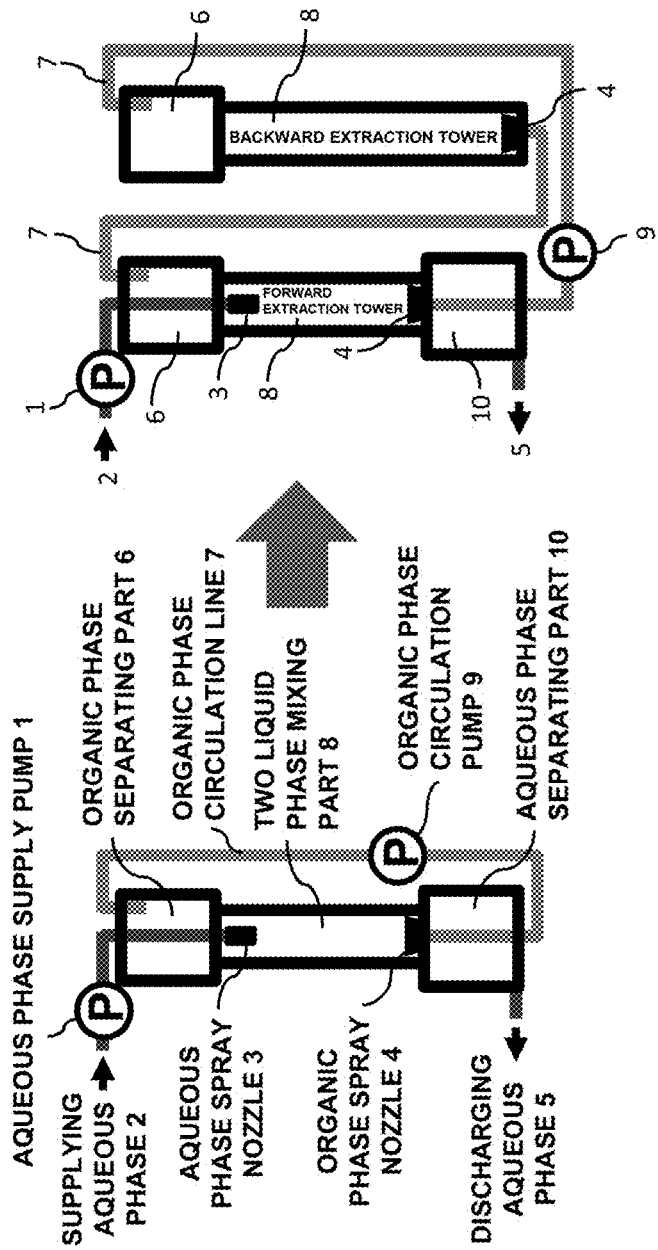

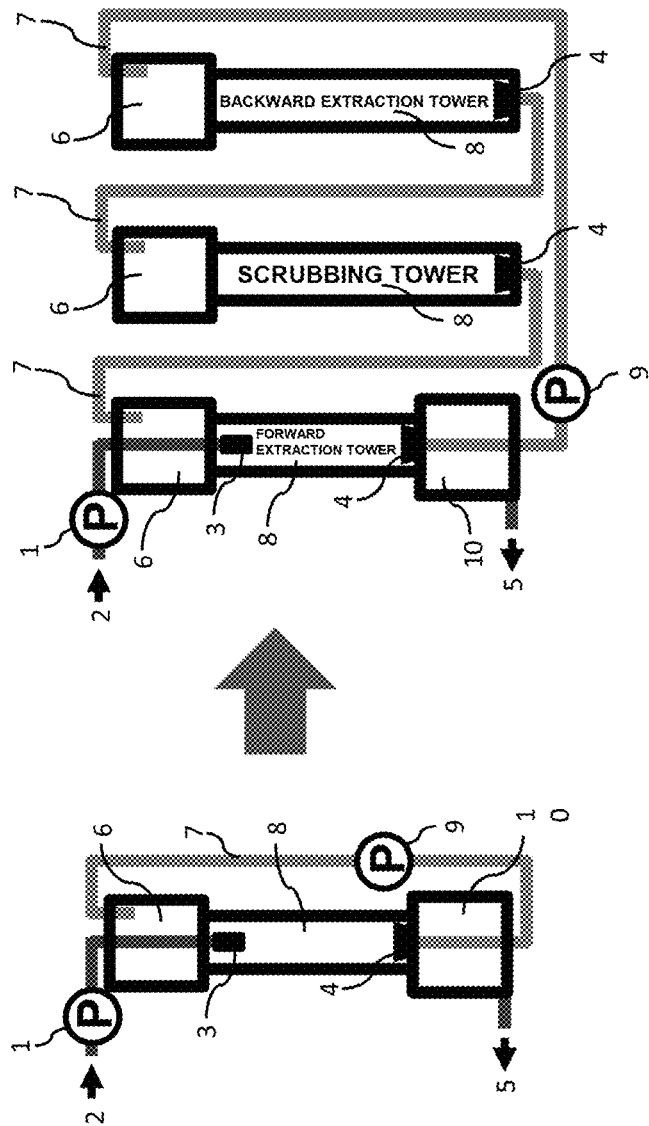

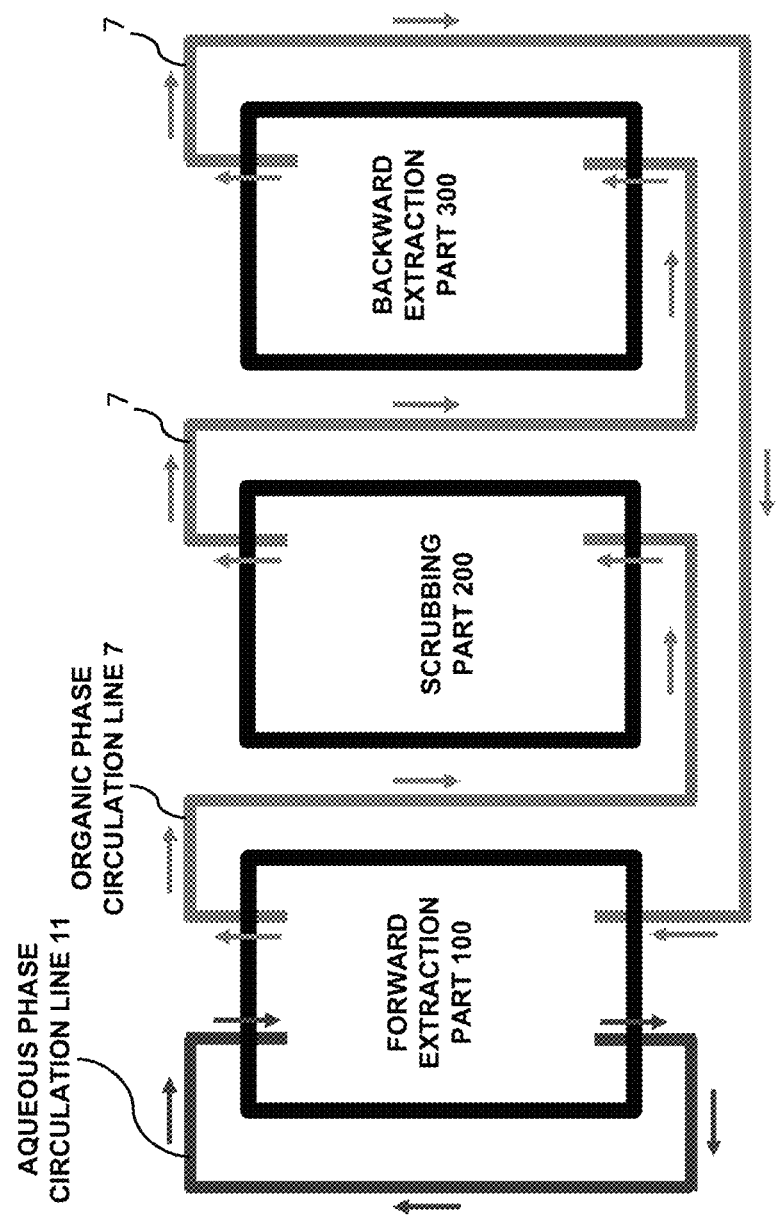

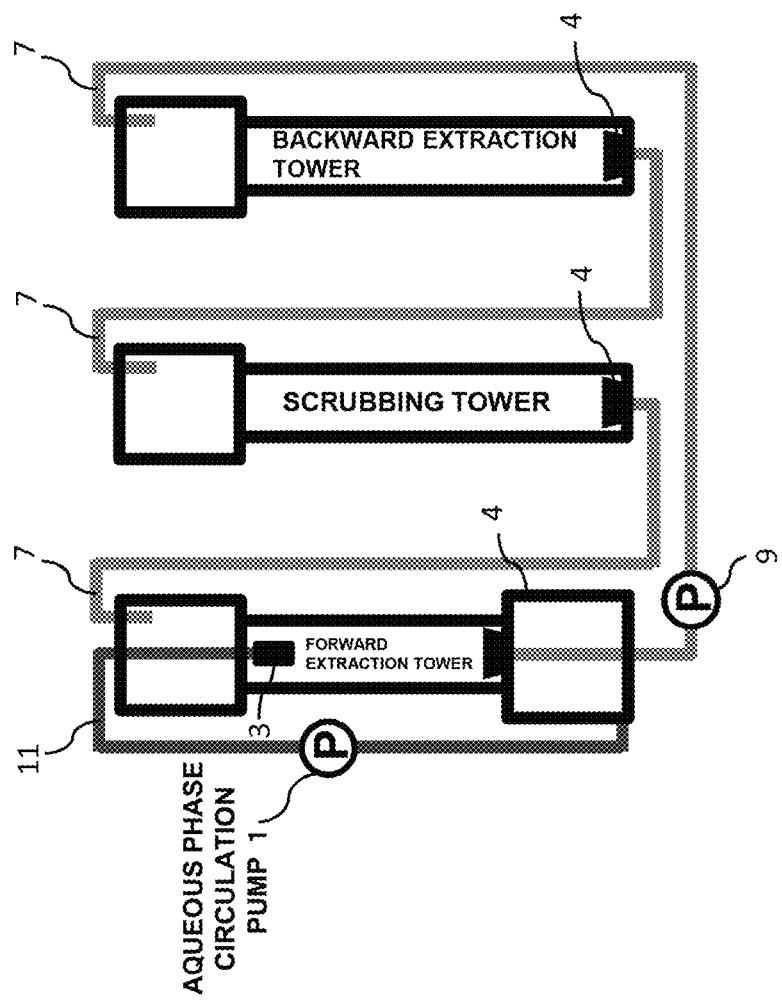

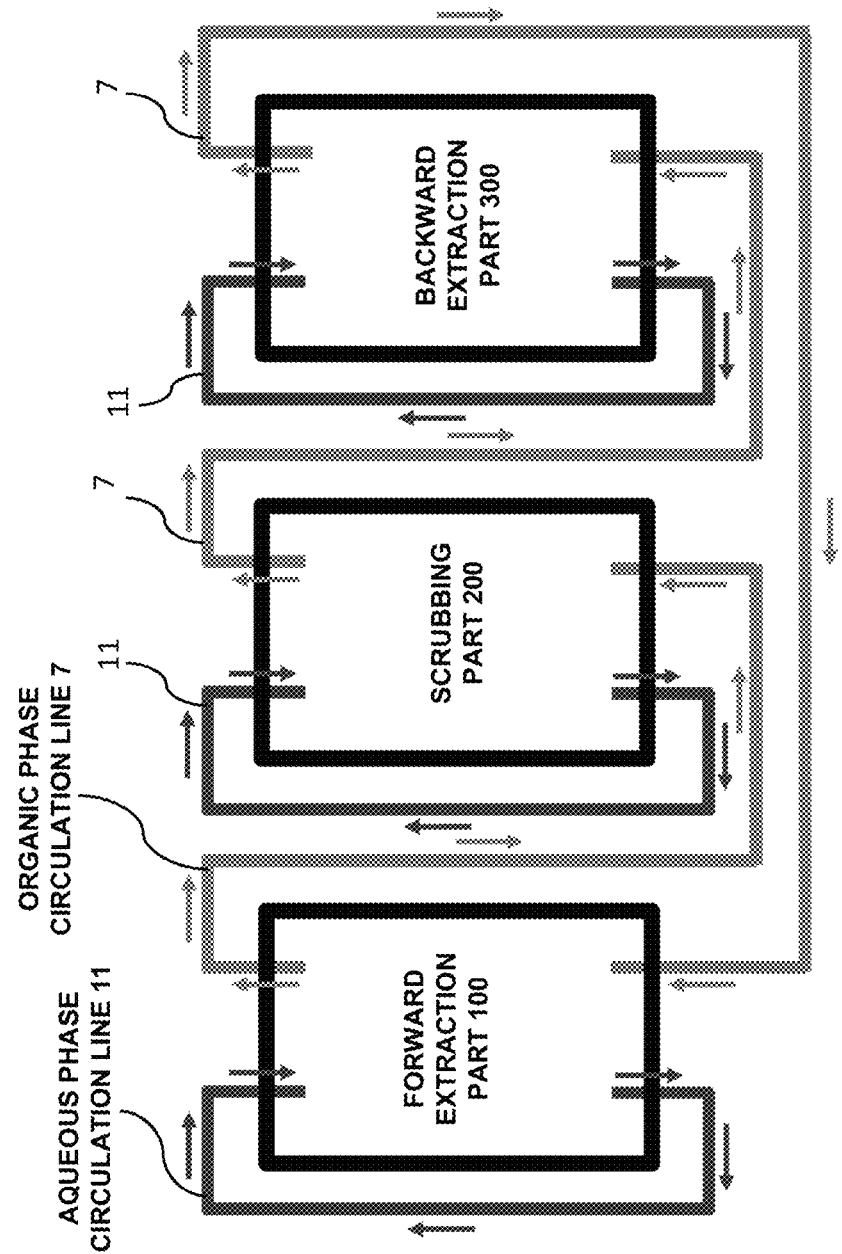

SWITCHING TYPE SUPPLY/DISCHARGE
AQUEOUS PHASE TANK WITH PARTITION 18

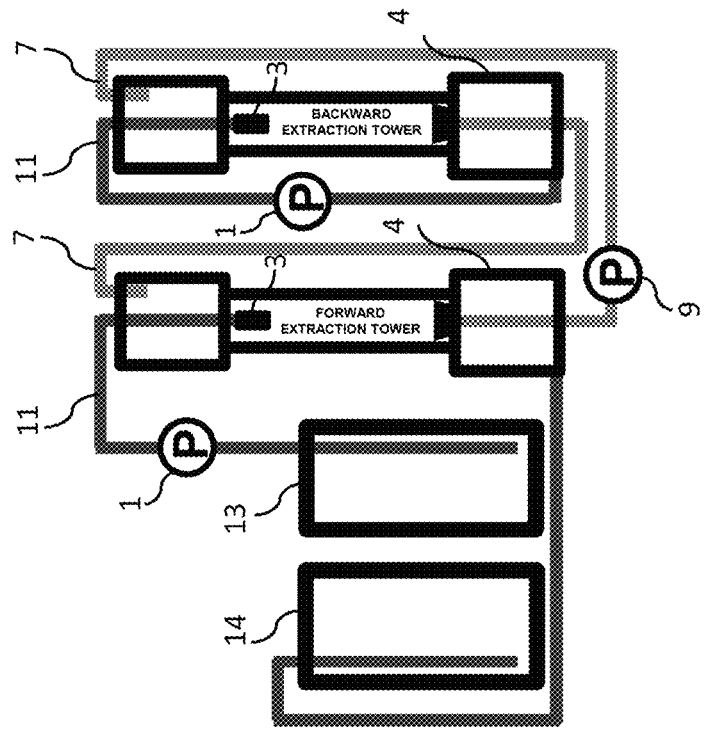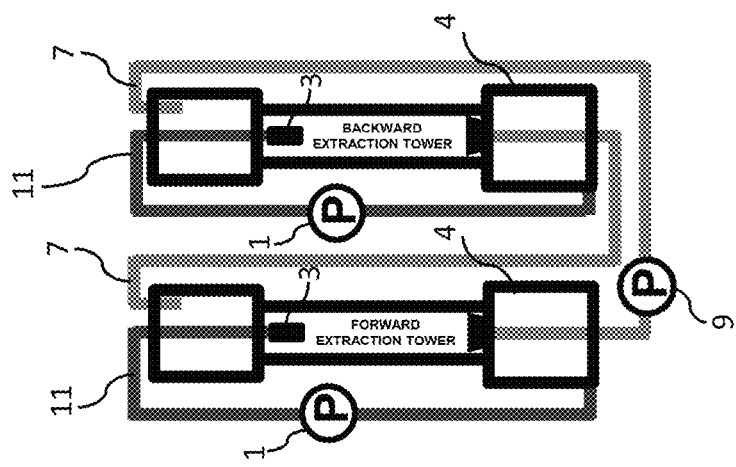

METHOD AND APPARATUS FOR PRODUCING SPECIFIC SUBSTANCES BY EXTRACTION AND SEPARATION IN A LIQUID-LIQUID SYSTEM

BACKGROUND OF THE INVENTION

The present invention relates to a method and an apparatus for simply and economically producing a specific substance selectively separated in an aqueous phase and/or an organic phase, utilizing the effect equivalent to multistages obtained by repeatedly performing liquid circulation without increasing the number of extraction containers (towers or tanks) in the extraction and separation in a liquid-liquid system.

By separating and concentrating target components (dissolved components, solid components, or floating droplet components), or separating and removing impurities from the target components, using the extraction and separation in a liquid-liquid system, high quality metal products, chemical products (ex. organic compounds), etc. can be obtained. The extraction and separation in the liquid-liquid system is a method of separating, refining, and concentrating metal ions, organic compounds, biopolymers, etc. according to the difference in distribution of substances between two liquid phases that do not mix with each other, and is widely used in the industrial field. In the extraction and separation in the liquid-liquid system, various chemical reactions such as complexation reactions, dehydration reactions, solvation reactions, ion exchange reactions, acid-base reactions, oxidation-reduction reactions, catalytic reactions, and self-organization reactions may be occurred, depending on components to be handled.

In the extraction and separation in the liquid-liquid system, the target component in the aqueous solution can be separated with higher accuracy by performing multistage extraction which repeats the extraction-unit operation. Usually, the multistage extraction is performed by arranging the required number of extraction containers (towers or tanks) and processing sequentially. At that time, the higher the separation required, the more containers (towers or tanks) are required.

On the other hand, an apparatus that industrially performs the extraction and separation in the liquid-liquid system is provided with at least two parts, a forward extraction part and a backward extraction part, in which the target component extracted in the organic phase of the forward extraction part is collected into the backward extraction liquid (the aqueous phase of the backward extraction part) in the backward extraction part. At the same time, the reset organic phase is sent to the forward extraction part to reuse. Further, a higher separation accuracy can be obtained by inserting a scrubbing part between the forward extraction part and the backward extraction part, if necessary.

In general, so-called multistage structuring in which multiple containers (towers or tanks) are arranged for each of the forward extraction part, the scrubbing part, and the backward extraction part, allows the target components to be separated and refined to the required purity. Usually, multistage structuring refers to a method of performing extraction processing by installing individually the required number of containers for each of the forward extraction part, the scrubbing part, and the backward extraction part (for convenience, hereinafter called as multistage by number of containers).

However, this multistage structuring increases the size and the complexity of the apparatus, increases all initial costs, operating costs and maintenance costs, and deteriorates operability. Labor costs also increase due to the need for monitoring and complicated adjustment work. In other words, the cost for obtaining products such as metal products or chemical products by the separation and the refining based on the extraction and separation in the liquid-liquid system is greatly increased from many aspects.

In the prior art, the forward extraction part, the scrubbing part, and the backward extraction part are usually configured to perform the necessary extraction and separation while each functioning independently. For example, after performing an operation of extracting the target component into the organic phase of the forward extraction part, the organic phase of the forward extraction part is sent to the scrubbing part. The scrubbing part scrubs the impurities extracted along with the target components, that is, components that are not desired to be extracted to the organic phase, into the aqueous phase, and separates and refines further the target components in the organic phase. And then the organic phase of the scrubbing part is sent to the backward extraction part to recover the separated and refined target components by back-extracting into the aqueous phase of the backward extraction part. Finally, the reset organic phase is sent to the forward extraction part to reuse.

In this way, the operation of sequentially sending the organic phase to the subsequent stage and the operation of returning the reset organic phase to the previous stage to reuse are repeated. As long as the organic phase functions satisfactorily, the organic phase can be continuously circulated and repeatedly used between each part of the forward extraction part, the scrubbing part, and the backward extraction part. Specifically, based on the valve switching operation and the on/off operation of the liquid sending device (a circulation pump, etc.), the organic phase is taken out every time the operation at each independently functioning part is finished. The organic phase is recirculated while being regenerated by repeating the work and operation of sequentially sending liquids using the circulation pump for circulating the liquid in the order of circulation from the forward extraction part to the scrubbing part, from the scrubbing part to the backward extraction part, and from the backward extraction part to the forward extraction part. (For example, Japanese Patent No. 3223132).

As for the aqueous phase, basically, there is no need to go back and forth between the three parts (the forward extraction part, the scrubbing part, and the backward extraction part). However, in order efficiently to recover the extraction residual liquid while scrubbing the organic phase, the supply liquid supplied as the object to be processed is drawn from between the forward extraction part and the scrubbing part, and merged with the scrubbing liquid flowing out from the scrubbing part, and introduced into the forward extraction part while mixed with the scrubbing liquid. Such mechanism is also generally well known.

BRIEF SUMMARY OF THE INVENTION

When it is desired to extract and separate a target component in the aqueous solution to a high degree, the multistage extraction in which an extraction-unit operation is repeated is indispensable. For example, in a conventional system configuration as disclosed in Japanese Patent No. 3223132, usually, a required number of containers (towers or tanks) for performing the extraction reaction are arranged to perform multistage extraction. However, the higher the separation required, the more containers (towers or tanks) must be installed. When industrially performing liquid-liquid extraction separation, more than 100 containers (towers or tanks) are required in some cases. As a result of intensive studies on how to perform multistage extraction without increasing the number of containers (towers or tanks), the following solution has been reached.

The present invention relates to a new system (referred to as multistage by synchronous liquid circulation) that utilizes the multistage effect caused by synchronously liquid circulation by integrating the forward extraction, the scrubbing, and the backward extraction. The present invention proposes a new concept of the multistage different from the conventional system (referred to as the multistage by number of containers) in which the required number of containers are individually installed for the forward extraction, the scrubbing, and the backward extraction. The present invention provides a method and an apparatus for producing a specific substance which is separated and refined in the aqueous phase and/or the organic phase, using the above new concept.

In the multistage extraction, after the aqueous solution containing the components to be extracted and separated is processed, the similar processing is repeated again. In this regard, we noticed that a similar multistage effect can be expected even if a plurality of containers are arranged and processed sequentially or even if the same container is used and repeatedly processed. Therefore, focusing on a system (mechanism) that integrates and operates the forward extraction part, the scrubbing part, and the backward extraction part in synchronism, and devising the operation of liquid circulation in the system, it became possible to perform the multistage extraction without increasing the number of the containers (towers or tanks).

In the multistage by synchronous liquid circulation, the conventional multistage process that has been left to the number of containers is realized by using liquid circulation. That is, in the system structure of the present invention in which the forward extraction part, the scrubbing part, and the backward extraction part are integrated and operated synchronously, the number of circulations of the aqueous solution to be processed in the forward extraction part corresponds to the number of stages in the prior art.

The present invention has been made based on the idea that it becomes more reasonable in terms of cost, simplicity of operation, and significant space saving by integrating the three parts of the forward extraction part, the scrubbing part, and the backward extraction part and linking them so that their roles proceed simultaneously, That is, the cost burden for liquid sending and the like is reduced, and it is not necessary to perform the adjustment work independently for each part, so that the operation can be simplified. Furthermore, since the number of containers (towers or tanks) does not increase when the number of stages is increased, significant space saving can be realized.

For example, Japanese Patent No. 5305382, No. 5565719, No. 5733691, No. 6483886, and No. 6488512 disclose an emulsion flow method for extracting and separating the specific substance, in which an aqueous phase and/or an organic phase are sprayed from a nozzle as fine droplets, thereby mixing the aqueous phase and the organic phase up to an emulsion, and simultaneously dissolving the emulsion by changing the structure of the container to extract and separate the specific substance. By circulating synchronously the organic phase while integrating the forward extraction part, the scrubbing part, and the backward extraction part using this method, the roles of the respective parts can be linked so as to proceed simultaneously. If this method is used, the mixing and separation of the aqueous phase and the organic phase can be continuously performed only by the liquid circulation. In addition, as a nozzle for generating fine droplets, a nozzle using a glass bead sintered plate as a porous body, a nozzle using a structure in which thin tubes or pores are aggregated, or the like can be used.

Specifically, the extraction/separation apparatus constructed as follows is used. The aqueous phase of the forward extraction part is circulated independently only in the forward extraction part, and at the same time, the organic phase of the forward extraction part is passed across the scrubbing part and the backward extraction part back to the forward extraction part. The effect equivalent to the multistage can be obtained by performing several times the independent circulation of the aqueous phase in the forward extraction part.

Further, in order to increase the volume of the aqueous phase that can be processed at a time (one batch of the aqueous phase to be processed with a fixed number of circulations), or to suppress the concentration of the target component and the coexisting component that progresses as the number of the processing (number of batches) is increased, an aqueous phase tank can be installed outside the body of the container (tower or tank) by connecting its tank to the aqueous phase entrance.

It should be noted that the aqueous phase tank outside of the main body of the container can be provided with a tank for storing the aqueous phase supplied into the container and a tank for storing the aqueous phase discharged from the container. In that case, a partition type tank may be used in which a partition is provided in one tank, and an aqueous phase supplied into the container and an aqueous phase discharged from the container are separately stored. In both the individual type and the partition type, the supply aqueous phase and the discharge aqueous phase are stored separately, so that they do not mix, and as a result, the effect of the multistage by synchronous liquid circulation can be expressed more efficiently.

Effects of the Invention

In the conventional multistage extraction, a higher degree of separation is realized by increasing the number of containers (towers or tanks), whereas in the method of the present invention, there is a feature in that an effect equivalent to increasing the number of containers (towers or tanks) can be obtained by increasing the number of circulation in a single container of the aqueous phase of the forward extraction part. For example, in the method and the apparatus of the present invention, it becomes possible to process using a very small number of containers (towers or tanks) of about 3 to 6 even against the separation target component which conventionally required 100 or more containers (towers or tanks) for the forward extraction part, the scrubbing part, and the backward extraction part.

The number of independent circulation of the aqueous phase in the forward extraction part in the multistage by synchronous liquid circulation corresponds to the number of containers in the multistage by number of containers. That is, by using the multistage by synchronous liquid circulation, the multistage extraction can be performed without increasing the number of containers (towers or tanks). On the other hand, when the aqueous phase to be processed is sent at the same flow rate, there is basically no difference in the length (total passage length when passing repeatedly) of the flow path through which the aqueous phase passes between the conventional multistage by number of containers and the multistage by synchronous liquid circulation. Therefore, the time required for processing (process speed) is equivalent. Since the aqueous phase to be processed by multistage by synchronous liquid circulation repeatedly passes only through the positive extraction part (basically composed of one container), a single circulation (one pass across one forward extraction container) by the multistage by synchronous liquid circulation is equivalent to passing a single container in the multistage by number of containers with many containers.

BRIEF DESCRIPTION OF THE SEVERAL DRAWINGS

FIG. 1 is a schematic diagram showing how to install a backward extraction tower on a liquid circulation line of an organic phase from a forward extraction tower.

FIG. 2 is a schematic diagram showing how to install a backward extraction tower and a scrubbing tower on the liquid circulation line of the organic phase from the forward extraction tower.

FIG. 3A is a schematic diagram showing the system in a case where an aqueous phase is circulated independently only in the forward extraction part.

FIG. 6 is a schematic diagram of an emulsion flow apparatus having the system structure shown in FIG. 5A.

FIG. 7 is a schematic diagram showing the system in the case where an aqueous phase is circulated independently in all parts.

FIG. 28A is a schematic diagram showing a structure of the liquid circulation system including a forward extraction part and a backward extraction part used in the experiment of Comparative Example 3 without an external aqueous phase tank.

FIG. 28B is a schematic diagram showing the structure of an external aqueous phase tank in the liquid circulation system including the forward extraction part and the backward extraction part used in the experiment of Comparative Example 3.

BEST MODE FOR CARRYING OUT THE INVENTION

Figure 3B:
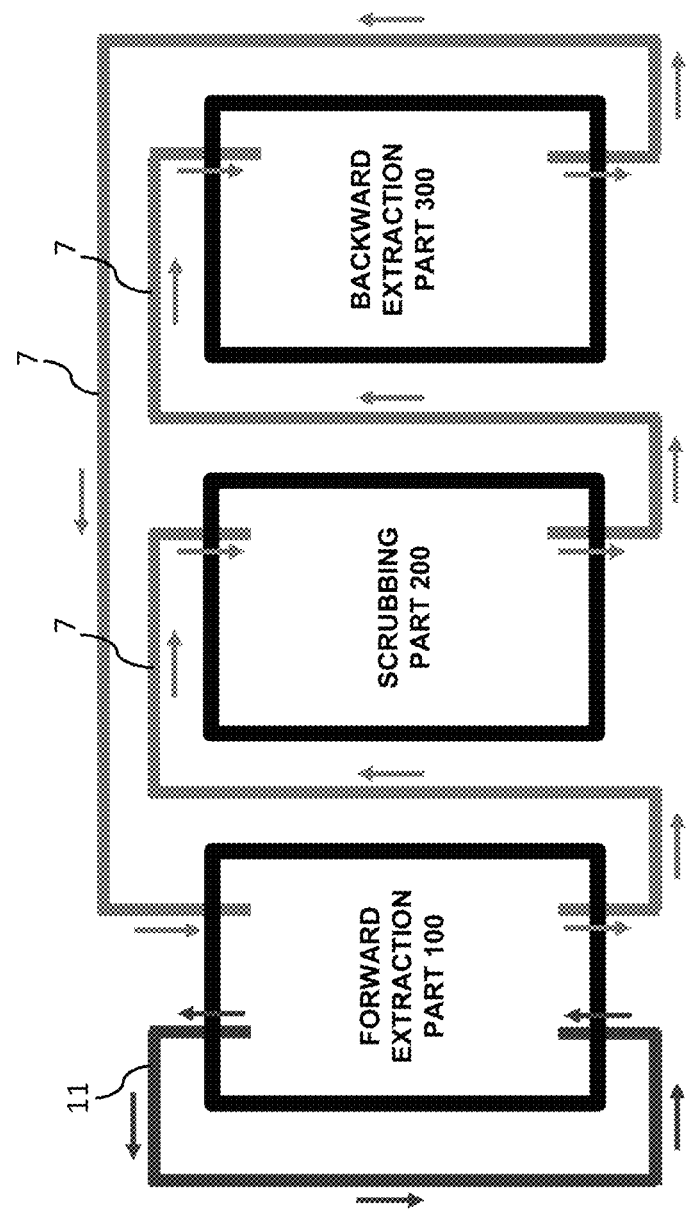
FIG. 3B is a schematic diagram showing another system structure in the case where the aqueous phase is circulated independently only in a forward extraction part.

First, the background of the present invention will be described with reference to FIG. 1 and FIG. 2 by taking as an example a system of the emulsion flow method. The system shown in these figures corresponds to the prior art, and a new system of the present invention for extracting and separating the specific substance will be described with reference to FIG. 3A and subsequent drawings.

As shown in FIG. 1, if a backward extraction tower is installed on the line that circulates the organic phase to the forward extraction tower, the forward extraction and the backward extraction can proceed simultaneously without increasing the burden of the liquid supply. That is, if a sealed container is used, the number of pumps does not increase. Further, since the forward extraction tower and the backward extraction tower are integrated and operated so as to function synchronously, the operation is simpler than the case where each tower is operated individually. Although it is possible to use an unsealed container in an emulsion flow method system in which the forward extraction and the backward extraction are integrated, the number of pumps increases. In addition, as a nozzle for generating fine droplets installed in the apparatus using an emulsion flow method, a structure using a glass bead sintered plate as a porous body, a structure in which thin tubes or fine holes are assembled, etc. are available.

In the backward extraction tower installed on the organic phase circulation line shown in FIG. 1, it is important that the reset organic phase is phase-separated and returned to the forward extraction tower again. The aqueous phase (the phase of the backward extraction liquid) does not need to be phase separated. Therefore, the backward extraction tower does not need to have an aqueous phase separating section. The installation of the aqueous phase separating section is not preferable in that the mixing efficiency of the aqueous phase and the organic phase is deteriorated by the installation of the aqueous phase separating section.

Further, when a scrubbing tower is inserted, it is preferable that the forward extraction tower, the scrubbing tower, and the backward extraction tower are integrated to operate each tower at the same time without increasing the liquid supply load as shown in FIG. 2. That is, if sealed containers are used, the forward extraction tower, the scrubbing tower, and the backward extraction tower can be operated simultaneously with only one aqueous phase pump and one organic phase pump (two in total). In this case as well, the scrubbing tower and the backward extraction tower do not need to have an aqueous phase separating section. When the aqueous phase separating section is installed, the mixing efficiency of the aqueous phase and the organic phase is deteriorated. Installation of a phase separating section is therefore not preferable. In addition, even in an emulsion flow system in which the forward extraction, the scrubbing, and the backward extraction are integrated, an unsealed container can be used, but the number of pumps increases.

In addition, the apparatus is not limited to the emulsion flow method, and as long as the apparatus is suitable for liquid circulation, as described above, the organic phase can be circulated while integrating the forward extraction, the scrubbing, and the backward extraction to function synchronously. Such an integration mechanism is not limited to a sealed container, but can be applied to an unsealed container (however, the number of pumps required is different). That is, by changing from a conventional liquid supply structure using overflow to a liquid supply structure using pressure action, even an apparatus that operates in an unsealed structure (the apparatus that is difficult to be sealed), it becomes easy to circulate. For example, in a mixer settler that mixes an aqueous phase and an organic phase by rotation of a stirring blade and performs phase separation by gravity separation, the liquid is conventionally supplied by liquid overflow, but it becomes possible to do the same as the apparatus using an emulsion flow method by adapting to the liquid circulation.

Referring to FIG. 3A. In this drawing, the pumps are not shown because the number of pumps differs between the sealed type and the unsealed type. The aqueous phase in the forward extraction part 100 is circulated independently only in the forward extraction part, and at the same time, the organic phase in the forward extraction part 100 is circulated so as to return again from the forward extraction part 100 to the same forward extraction part 100 through the scrubbing part 200 and the backward extraction part 300. In the prior art shown in FIG. 1 and FIG. 2, the aqueous phase introduced into the forward extraction tower corresponding to the forward extraction part 100 is continuously discharged from the forward extraction part 100 in a once-through way. On the other hand, the system shown in FIG. 3A is different from the prior art in that the aqueous phase in the forward extraction part 100 is repeatedly independent-circulated within the forward extraction part. The greatest feature of the present invention is that the independent circulation of the aqueous phase within a single container and the transverse circulation of the organic phase proceed simultaneously in conjunction with each other.

In this system (mechanism), the amount of the aqueous phase containing the component to be separated and refined that can be processed at one time is limited to the amount of the aqueous phase that can be installed in the forward extraction part 100. Therefore, if the amount of the aqueous phase that can be installed is considered as one batch, the method shown in FIG. 3A is not a continuous process as shown in FIG. 1 and FIG. 2, but a batch process. On the other hand, the processing in this system also has an aspect that can be said to be a continuous processing in that the forward extraction, the scrubbing, and the backward extraction are synchronously and sequentially processed.

When the aqueous phase is a heavy liquid phase and the organic phase is a light liquid phase, it is preferable to supply the liquid according to the direction indicated by the arrow in FIG. 3A so that the aqueous phase may be introduced from the top of the container and discharged from the bottom, and the organic phase may be introduced from below the container and discharged from above. This is because the liquid sending load can be reduced by using gravity and buoyancy, and that the mixing efficiency of the two liquid phases can be increased because the aqueous phase and the organic phase are supplied so as to face each other. On the other hand, when the aqueous phase is a light liquid phase and the organic phase is a heavy liquid phase, it is preferable to supply the liquid according to the direction indicated in FIG. 3B so that the aqueous phase may be introduced from the bottom of the container and discharged from above, and the organic phase may be introduced from above the container and discharged from below. The heavy liquid phase is a liquid phase having a specific gravity greater than that of the light liquid phase. When the heavy liquid phase and the light liquid phase coexist in a state of phase separation, the lower side becomes the heavy liquid phase and the upper side becomes the light liquid phase.

For the sake of convenience, in the drawings shown below, unless otherwise specified, the aqueous phase is expressed as a heavy liquid phase and the organic phase is expressed as a light liquid phase.

In the multistage by synchronous liquid circulation, the forward extraction part 100 basically has only one container (a tower or a tank), but in the scrubbing part 200 and the backward extraction part 300, a plurality of containers are arranged for each, if necessary. In particular, the number of containers in the scrubbing part 200 greatly affects the purity and recovery rate of a substance to be extracted and separated.

Figures 4A, 4B:
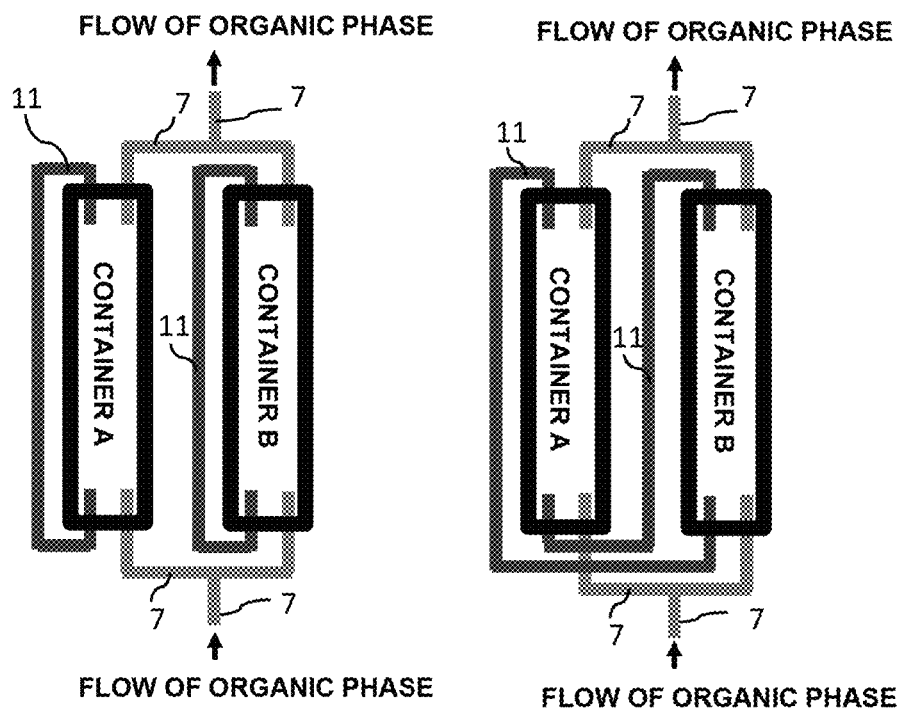
FIG. 4A is a schematic diagram of a separation type structure of the aqueous phase circulation when using an organic phase branch line.
FIG. 4B is a schematic diagram of a connection type structure of the aqueous phase circulation when using an organic phase branch line.

For the forward extraction part 100, the organic phase piping from the backward extraction part 300 to the forward extraction part 100 and the organic phase piping from the forward extraction part 100 to the scrubbing part 200 are branched, and a plurality of containers can be installed as the forward extraction part 100. Such an organic phase branch pipe is useful, for example, when it is desired to efficiently use the floor area by arranging the forward extraction part 100 in two or more locations. For the same reason, the same organic phase branch pipe can be applied to the scrubbing part 200 and/or the backward extraction part 300. As a method of circulating independently the aqueous phase in a single container when using the organic phase branch piping, the separation type aqueous phase circulation shown in FIG. 4A and the connection type aqueous phase circulation shown in FIG. 4B are possible. In these drawings, the pumps are not shown because the number of pumps differs between the sealed type and the unsealed type. The separation type aqueous phase circulation has an advantage that it is easy to maintain the volume balance of the aqueous phase and the organic phase in a plurality of containers. On the other hand, the connection type aqueous phase circulation has an advantage that aqueous phases discharged from a plurality of containers can be collected together.

Figure 5A:
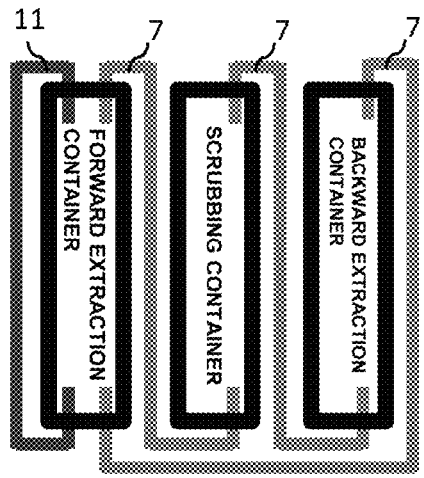
FIG. 5A is a schematic diagram when one container is installed in each of the forward extraction part, the scrubbing part, and the backward extraction part in FIG. 3A.

FIG. 5A shows an example of the simplest apparatus according to the present invention. This apparatus has a single container (tower or tank) for each of the forward extraction part 100, the scrubbing part 200, and the backward extraction part 300 shown in FIG. 3A. The pumps are not shown because the number of pumps differs between the sealed type and the unsealed type.

Figure 5B:
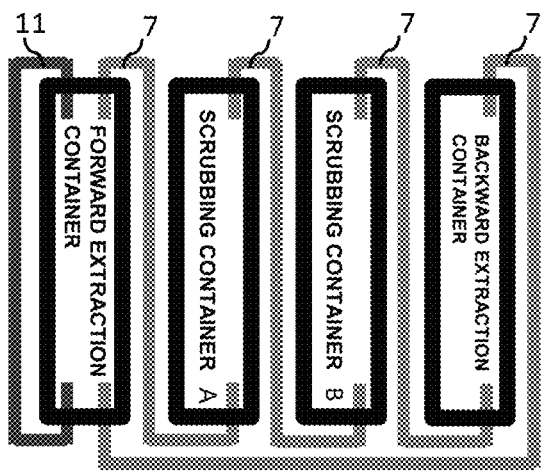
FIG. 5B is a schematic diagram when one container is installed in the forward extraction part, two in the scrubbing part, and one in the backward extraction part in FIG. 3A.
Figure 5C:
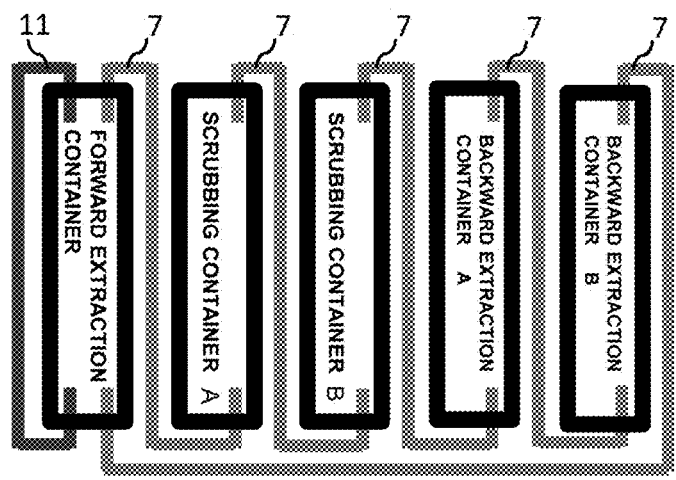
FIG. 5C is a schematic diagram when one container is installed in the forward extraction part, two in the scrubbing part, and two containers in the backward extraction part in FIG. 3A.
Figure 5D:
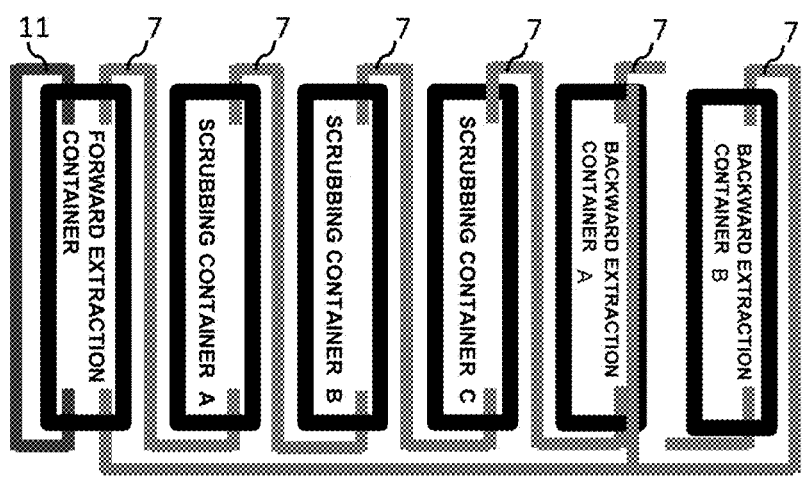
FIG. 5D is a schematic diagram in the case where one container is installed in the forward extraction part in FIG. 3A, three containers are installed in the scrubbing part, and two containers are installed in the backward extraction part.

For the scrubbing part 200 and the backward extraction part 300, a plurality of containers (towers or tanks) can be provided as necessary. As a typical example, FIG. 5A, FIG. 5B, FIG. 5C, and FIG. 5D show details of each part shown in FIG. 3A. In each drawing, the pumps are not shown because the number of pumps differs between the sealed type and the unsealed type. FIG. 5A shows the system having one forward extraction container, one scrubbing container, and one backward extraction container. FIG. 5B shows the system having one forward extraction container, and two scrubbing containers (A and B), and one backward extraction container. FIG. 5C shows the system having one forward extraction container, two scrubbing containers (A and B), and two backward extraction containers (A and B). FIG. 5D shows the system having one forward extraction container, three scrubbing containers (A, B, and C), and two backward extraction containers (A and B). However, FIG. 5A to FIG. 5D are not all of the system structure shown in FIG. 3A. The number of containers of the scrubbing part 200 and the backward extraction part 300 can be freely increased without limitation as necessary.

FIG. 6 shows an example in which the system shown in FIG. 5A is applied to the apparatus using an emulsion flow method. Here, the containers of the scrubbing tower and the backward extraction tower do not have an aqueous phase separating section. In the scrubbing tower and the backward extraction tower, the aqueous phase is not sent and is only confined in the tower. In the structure with an aqueous phase separating section, the aqueous phase retained in the above section cannot come into contact with the organic phase. The aqueous phase and the organic phase are not mixed efficiently. Therefore, the aqueous phase is efficiently mixed with the organic phase by eliminating the aqueous phase separating section. In the scrubbing tower and the backward extraction tower, the aqueous phase is neither discharged nor supplied during the operation of the apparatus, so that the aqueous phase does not need to be phase-separated.

In an apparatus using an emulsion flow method that operates only by sending liquid, a sealed container can be used for each tower. Therefore, as shown in FIG. 6, without increasing the number of pumps, that is, with only one aqueous phase pump and one organic phase pump, the scrubbing tower and the backward extraction tower can be operated simultaneously with the forward extraction tower. Even if a plurality of scrubbing containers and/or backward extraction containers are used, it is possible to operate by one organic phase pump up to a certain extent (ex. up to about 10 containers in total). In addition, since the number of pumps to be handled is small, the operation is simple, and since the pump is common to each tower, synchronization is high and a stable operation state can be maintained for a long time.

Although each tower of the apparatus using the emulsion flow method may be an unsealed container, it is more advantageous to use a sealed container in terms of the number of required pumps, simplicity of operation, and the like. On the other hand, if there is a risk that a large amount of gas is generated at once, a safety problem may occur when the sealed container is used. Even if the risk of rupture can be reduced by installing a safety valve (relief valve), the sealed container is not always preferable. In addition, there is also a disadvantage that the degree of freedom of the piping method is small due to the limitation of not changing the volume ratio of the aqueous phase and the organic phase in each tower due to a change in the internal pressure of the tower. Therefore, it is preferable to select a sealed type or a sealed type on a case-by-case basis.

It should be noted that the present invention is not limited to the apparatus using an emulsion flow method, and any apparatus suitable for liquid circulation can be used for the system structure shown in FIG. 3A or FIG. 3B. For example, the system structure shown in FIG. 3A or FIG. 3B can also be used for a liquid circulation-adaptive mixer settler.

Next, an outline of the system for circulating independently the aqueous phase not only in the forward extraction part 100 but also in the scrubbing part 200 and the backward extraction part 300 is shown as an example in FIG. 7. The pumps are not shown because the number of pumps differs between the sealed type and the unsealed type. When the aqueous phase is a heavy liquid phase and the organic phase is a light liquid phase, it is preferable to supply the liquid according to the direction indicated by the arrow in FIG. 7 so that the aqueous phase may be introduced from the top of the container and discharged from below, and the organic phase may be introduced from below the container and discharged from above.

Figure 8A:
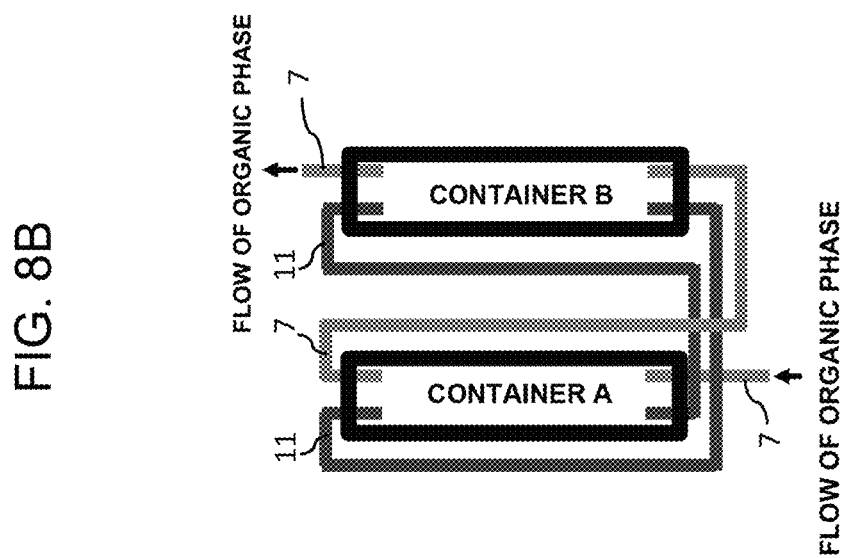
FIG. 8A is a schematic diagram of a separation type structure of the aqueous phase circulation in the case where a plurality of containers are installed in a scrubbing part and/or a backward extraction part.
Figure 8B:
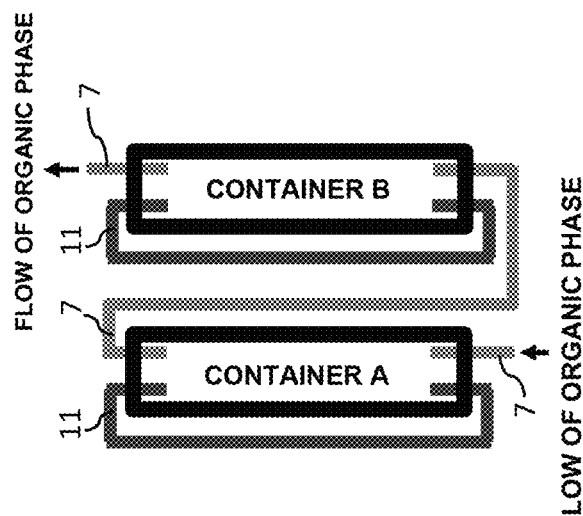
FIG. 8B is a schematic diagram of a connection type structure of the aqueous phase circulation when a plurality of containers are installed in the scrubbing part and/or the backward extraction part.

In the case where a plurality of containers are installed in each part in the scrubbing part 200 and/or the backward extraction part 300, the separation type aqueous phase circulation shown in FIG. 8A and the connection type aqueous phase circulation shown in FIG. 8B are applicable as a specific method of circulating independently the aqueous phase in a single container. The pumps are not shown because the number of pumps differs between the sealed type and the unsealed type. This is a piping structure similar to the separation type aqueous phase circulation and the connection type aqueous phase circulation shown in FIG. 4A and FIG. 4B respectively, and the respective advantages are common to the case of FIG. 4A and FIG. 4B.

When it is desired to increase the volume of the aqueous phase in the scrubbing part 200 and the backward extraction part 300, there is a limit to the container structure in which the aqueous phase can exist only in the two liquid phase mixing section (mixer section). Therefore, a container structure having a section where the aqueous phase separates and collects is required. There is a difference in structure between the emulsion flow apparatus where the aqueous phase after phase separation is collected in a state separated from the organic phase and the mixer settler where the aqueous phase and organic phase after phase separation coexist through the interface. But in any apparatus, a container structure in which the aqueous phase separates and collects is required. On the other hand, when the container has the section where the aqueous phase separates and collects (an aqueous phase separating section), if only the organic phase is circulated transversely, a large amount of the aqueous phase is left without contacting the organic phase. By using the system for circulating independently the aqueous phase also in the scrubbing part 200 and the backward extraction part 300 as shown in FIG. 7, it is possible to prevent that the aqueous phase does not come into contact with the organic phase, and stay in the aqueous phase separating section.

The circulation of the aqueous phase in the scrubbing part 200 or the backward extraction part 300 is different from the circulation of the aqueous phase in the forward extraction part 100. The effect of the multistage by synchronous liquid circulation is small. If there is no difference between the mixing states of the aqueous phase and the organic phase, there is no clear difference caused by the multistage by synchronous liquid circulation depending on whether or not to perform the independent liquid circulation in the scrubbing section 200 and/or the backward extraction section 300. In order for the effect of the multistage by synchronous liquid circulation to appear, the organic phase must be reset to the state in which most of the components contained in the organic phase to be extracted and separated have been removed. Precisely, in which 70% or more of the components that are most likely to remain in the organic phase among all the components to be extracted and separated (the elements that are most easily extracted into the organic phase) have been removed or back-extracted. However, since the organic phase thus reset is not introduced into the scrubbing part 200 and the backward extraction part 300, it is considered that the effect of the multistage by synchronous liquid circulation is not clear.

For FIG. 7, as with FIG. 3A or FIG. 3B, basically one forward extraction container (except for the case where the organic phase flow path is branched), one or more scrubbing containers and one or more backward extraction containers can be installed. That is, also in the system structure shown in FIG. 7, the number of containers and the arrangement similar to that shown in FIG. 5A, FIG. 5B, FIG. 5C, and FIG. 5D are utilized. The present invention is not limited to these examples, and the number of scrubbing containers and the backward extraction containers can be freely set as necessary.

Figure 9:
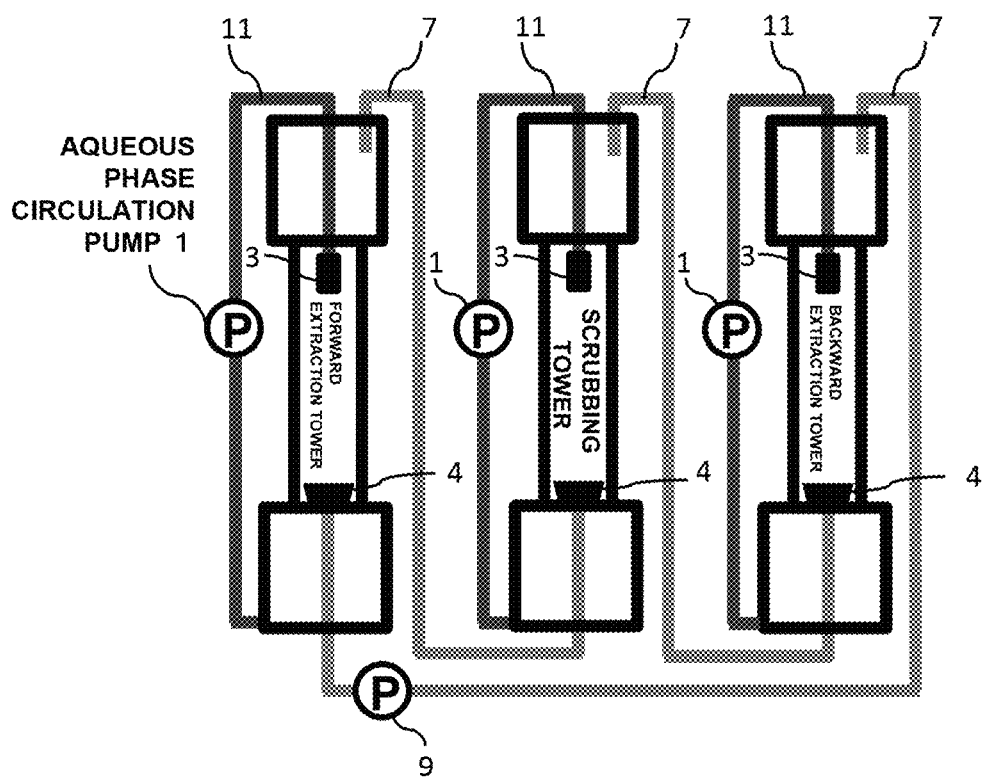
FIG. 9 is a schematic diagram of an emulsion flow apparatus in which one container (tower) is installed in each part of FIG. 7.

FIG. 9 shows a system in which the system structure shown in FIG. 7 (the simplest structure in FIG. 7) with one forward extraction container, one scrubbing container, and one backward extraction container is applied to the apparatus using an emulsion flow method. A sealed container is used in FIG. 9, and thus the number of organic phase pumps is only one even if the scrubbing container and the backward extraction container are installed. In this case, even if a plurality of scrubbing containers and/or backward extraction containers are used, it is possible to operate by one organic phase pump up to a certain extent (ex. up to about 10 containers in total).

Although not shown in FIG. 9, each of the forward extraction container (forward extraction tower), the scrubbing container (scrubbing tower), and the backward extraction container (backward extraction tower) has an aqueous phase outlet and an organic phase outlet. Components to be separated and refined are recovered from these outlets. When the aqueous phase is a heavy liquid phase and the organic phase is a light liquid phase, the aqueous phase outlet is installed at the lower part of the container, and the organic phase outlet is installed at the upper part of the container. On the other hand, when the aqueous phase is a light liquid phase and the organic phase is a heavy liquid phase, the aqueous phase outlet is installed at the top of the container, and the organic phase outlet is installed at the bottom of the container.

Further, referring to FIG. 9 as an example, the synchronous operation of the forward extraction, the scrubbing, and the backward extraction will be explained with respect to a preferable operation method. First, when the organic phase circulation pump is operated, the spray of organic phase droplets starts from the organic phase spray nozzle of each tower in the order of the main extraction tower, the scrubbing tower, and the backward extraction tower. While spraying the organic phase droplets in the three towers, when the emulsion-mixed area reaches the aqueous phase spray nozzle, the aqueous phase circulation pumps installed in the respective towers are simultaneously operated. Through such a series of operations, stable emulsion mixing in the two liquid phase mixing section and clear phase separation in the aqueous phase separating section and the organic phase separating section in all of the forward extraction tower, the scrubbing tower, and the backward extraction tower are led to a state of simultaneous progress.

It should be noted that the present invention is not limited to the apparatus using an emulsion flow method, and any apparatus suitable for liquid circulation can be applicable to the system shown in FIG. 7. For example, the system shown in FIG. 7 can also be used for a liquid circulation-adaptive mixer settler. The same is true when the aqueous phase is a light liquid phase and the organic phase is a heavy liquid phase.

Figure 10:
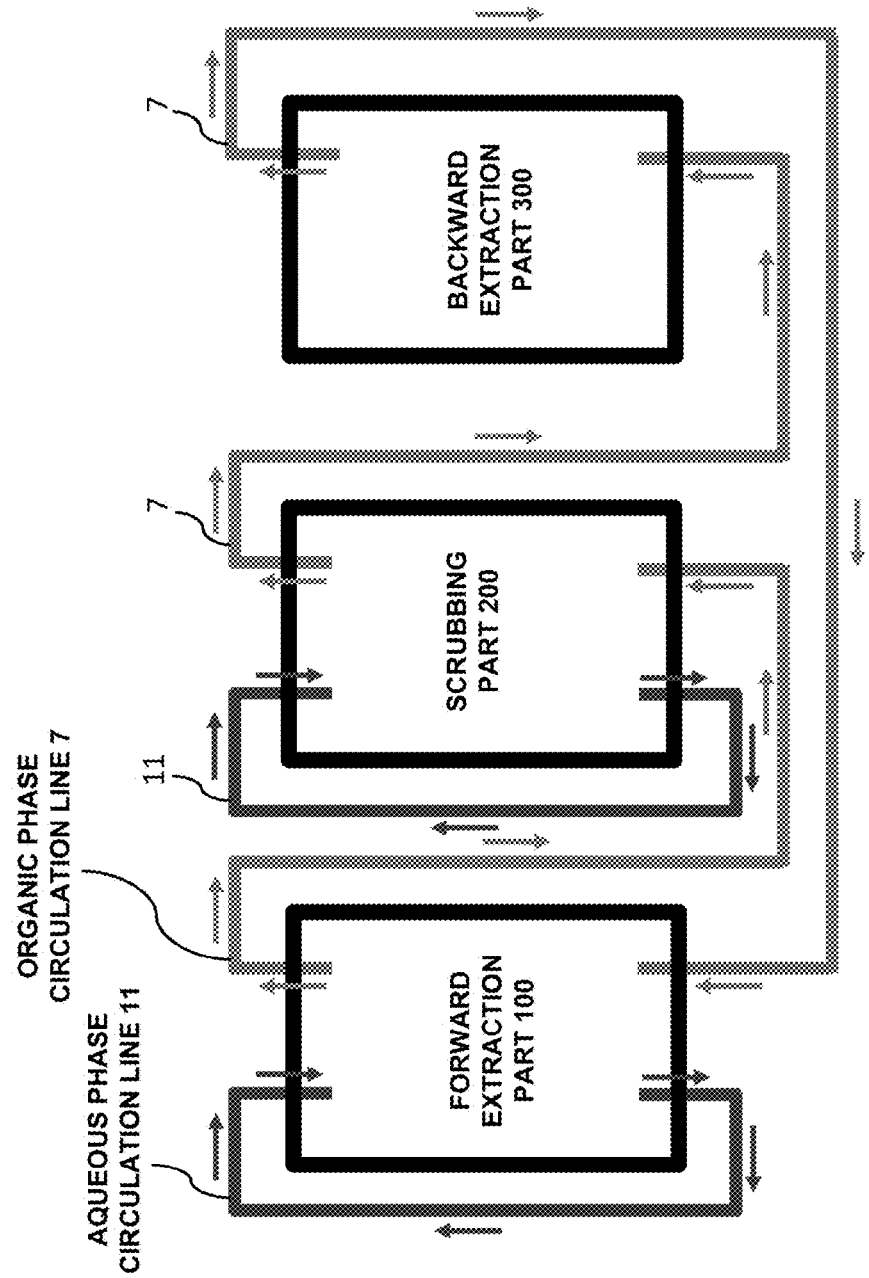
FIG. 10 is a schematic diagram showing the system in the case where an aqueous phase is circulated independently in each of the forward extraction part and the scrubbing part.

Further, FIG. 10 shows an outline of a structure in which the aqueous phase is circulated independently in each of the forward extraction part 100 and the scrubbing part 200, and the aqueous phase is not circulated independently in the backward extraction part 300 (sealed). The pumps are not shown because the number of pumps differs between the sealed type and the unsealed type. When the aqueous phase is a heavy liquid phase and the organic phase is a light liquid phase, it is preferable to supply the liquid according to the direction indicated by the arrow in FIG. 10 so that the aqueous phase (heavy liquid phase) may be introduced from the top of the container and discharged from the bottom, and the organic phase (light liquid phase) may be introduced from below the container and discharged from above.

The system shown in FIG. 10 is effective when the volume increase of the aqueous phase is required in the scrubbing part 200 and is not required in the backward extraction part 300. When it is desired to increase the volume of the aqueous phase that can be introduced into the scrubbing part 200, it is necessary to provide a container structure (aqueous phase separating section) in which the aqueous phases are separated and collected to the scrubbing part 200. In the case where the aqueous phase separating section is provided, since only a large amount of aqueous phase in the scrubbing part 200 does not come into contact with the organic phase just by the transverse circulation of the organic phase, it is necessary to circulate independently the aqueous phase in the scrubbing part 200.

For FIG. 10, as with FIG. 3A, FIG. 3B and FIG. 7, basically one forward extraction container (except for the case where the organic phase flow path is branched), one or more scrubbing containers and one or more backward extraction containers can be installed. That is, also in the system structure shown in FIG. 10, the number of containers and the arrangement similar to that shown in FIG. 5A, FIG. 5B, FIG. 5C, and FIG. 5D are utilized. The present invention is not limited to these examples, and the number of scrubbing containers and the backward extraction containers can be freely set as necessary.

Figure 11:
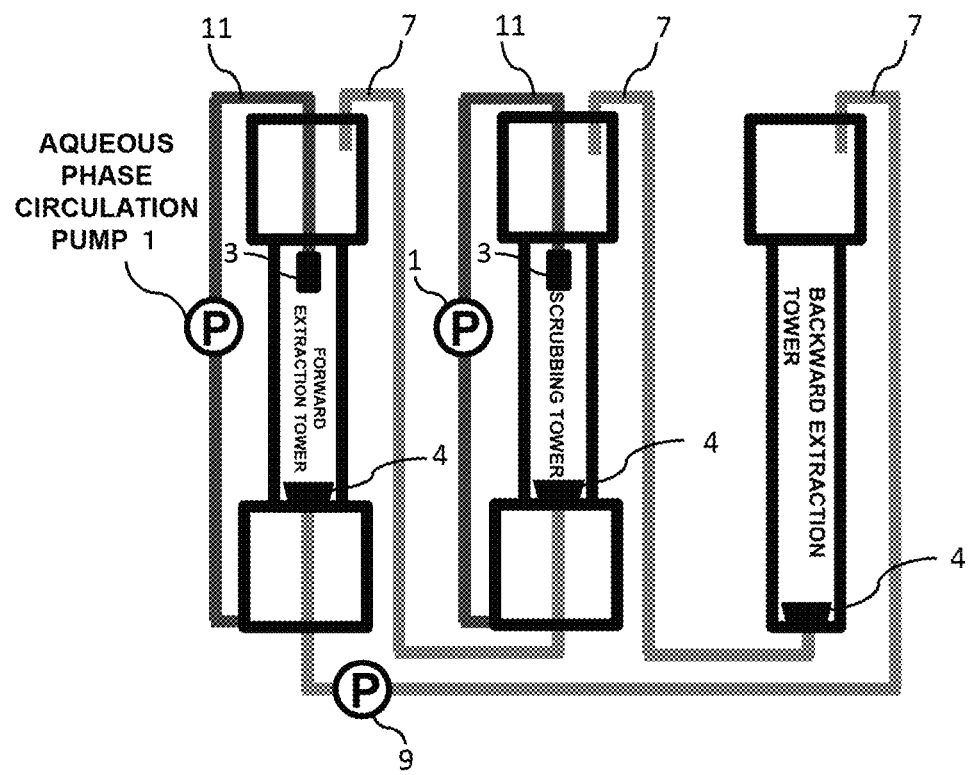
FIG. 11 is a schematic diagram of an emulsion flow apparatus in which one container (tower) is installed in each part of FIG. 10.

FIG. 11 shows a structure (the simplest structure in FIG. 10) in which the structure of FIG. 10 is applied to an emulsion flow method apparatus, and one forward extraction tower, one scrubbing tower, and one backward extraction tower are arranged. When it is desired to minimize the volume of the aqueous phase in the backward extraction unit 300, the system as shown in FIG. 11 is effective. FIG. 11 shows a case where a sealed container is used, and the number of pumps for the organic phase is only one even if the scrubbing container and the backward extraction container are added. In this case, even if a plurality of scrubbing containers and/or backward extraction containers are used, it is possible to operate by one organic phase pump up to a certain extent (ex. up to about 10 containers in total).

It should be noted that the present invention is not limited to the apparatus using an emulsion flow method, and any apparatus suitable for liquid circulation can be applicable to the system shown in FIG. 10. For example, the system shown in FIG. 10 can also be used for a liquid circulation-adaptive mixer settler. The same is true when the aqueous phase is a light liquid phase and the organic phase is a heavy liquid phase.

Figure 12:
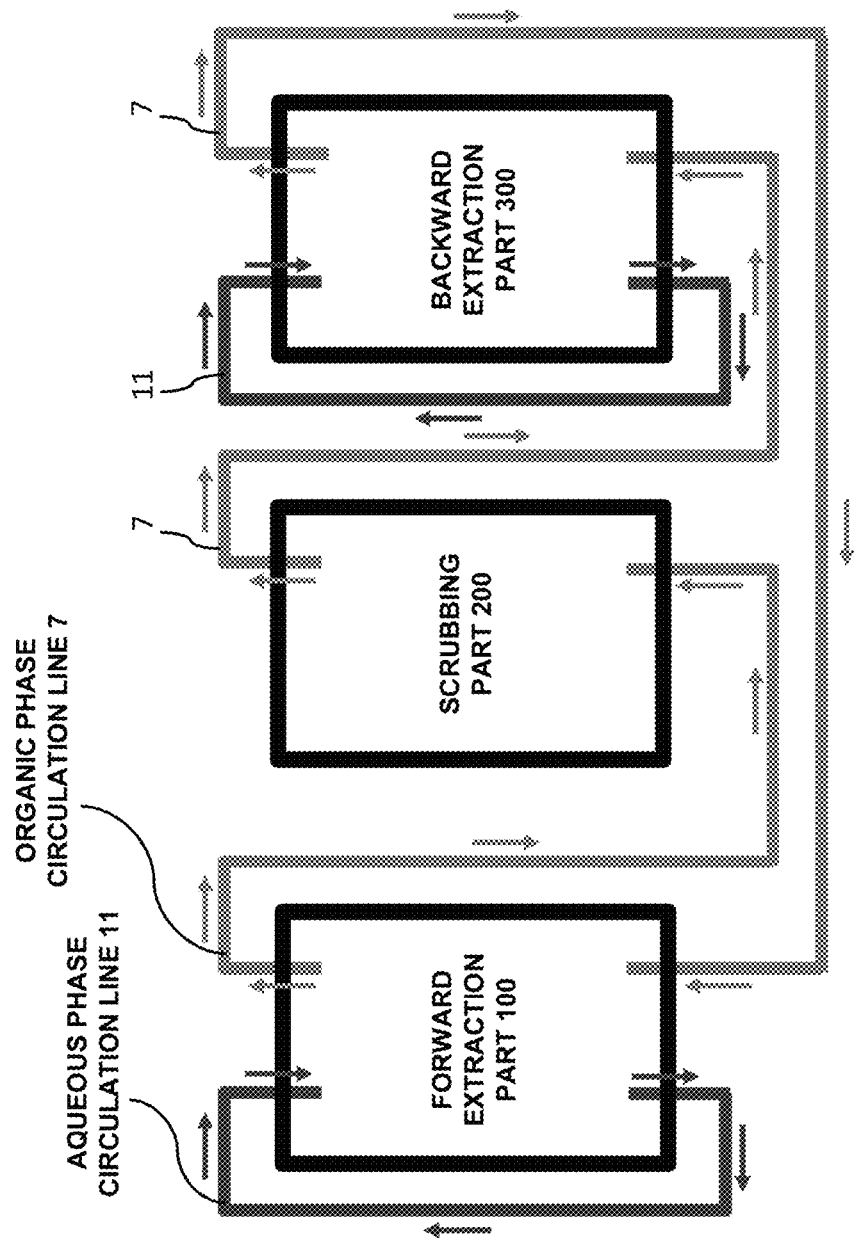
FIG. 12 is a schematic diagram showing the system in the case where an aqueous phase is circulated independently in each of the forward extraction part and the backward extraction part.

The system in which the aqueous phase is circulated independently in each of the forward extraction part 100 and the backward extraction part 300, and the aqueous phase is not circulated independently in the scrubbing part 200 is also possible, and the outline of such a system is shown in FIG. 12. In FIG. 12, the pumps are not shown because the number of pumps differs between the sealed type and the unsealed type. When the aqueous phase is a heavy liquid phase and the organic phase is a light liquid phase, it is preferable to supply the liquid according to the direction indicated by the arrow in FIG. 12 so that the aqueous phase (heavy liquid phase) may be introduced from the top of the container and discharged from the bottom, and the organic phase (light liquid phase) may be introduced from below the container and discharged from above, as in FIG. 3A, FIG. 7 and FIG. 10.

The system shown in FIG. 12 is effective when the volume increase of the aqueous phase is required in the backward extraction part 300 and is not required in the scrubbing part 200. When it is desired to increase the volume of the aqueous phase that can be introduced into the backward extraction part 300, it is necessary to provide a container structure (aqueous phase separating section) in which the aqueous phases are separated and collected to the backward extraction part 300. In the case where the aqueous phase separating section is provided, since only a large amount of aqueous phase in the backward extraction part 300 does not come into contact with the organic phase just by the transverse circulation of the organic phase, it is necessary to circulate independently the aqueous phase in the backward extraction part 300.

For FIG. 12, as with FIG. 3A, FIG. 3B, FIG. 7 and FIG. 10, basically one forward extraction container (except for the case where the organic phase flow path is branched), one or more scrubbing containers and one or more backward extraction containers can be installed. That is, also in the system structure shown in FIG. 12, the number of containers and the arrangement similar to that shown in FIG. 5A, FIG. 5B, FIG. 5C, and FIG. 5D are utilized. The present invention is not limited to these examples, and the number of scrubbing containers and the backward extraction containers can be freely set as necessary.

Figure 13:
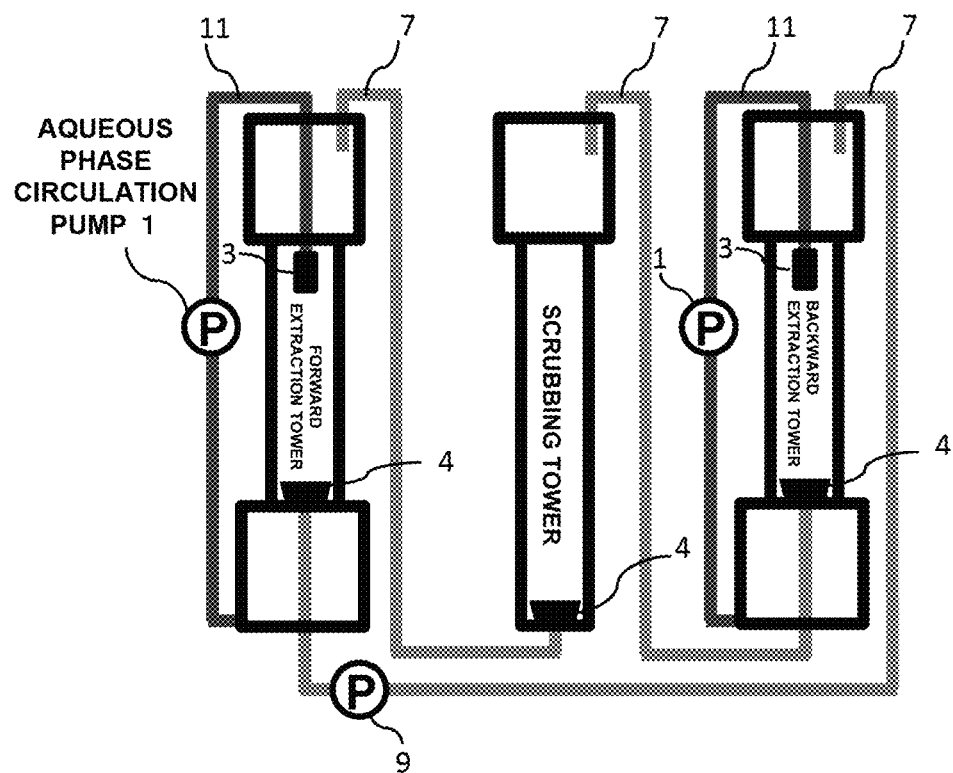
FIG. 13 is a schematic diagram of an emulsion flow apparatus in which one container (tower) is installed in each part of FIG. 12

FIG. 13 shows a structure (the simplest structure in FIG. 12) in which the structure of FIG. 12 is applied to an emulsion flow method apparatus, and one forward extraction tower, one scrubbing tower, and one backward extraction tower are arranged. When it is desired to minimize the volume of the aqueous phase in the scrubbing part 200, the system as shown in FIG. 13 is effective. FIG. 13 shows a case where a sealed container is used, and the number of pumps for the organic phase is only one even if the scrubbing container and the backward extraction container are added. In this case, even if a plurality of scrubbing containers and/or backward extraction containers are used, it is possible to operate by one organic phase pump up to a certain extent (ex. up to about 10 containers in total).

It should be noted that the present invention is not limited to the apparatus using an emulsion flow method, and any apparatus suitable for liquid circulation can be applicable to the system shown in FIG. 7. For example, the system shown in FIG. 7 can also be used for a liquid circulation-adaptive mixer settler. The same is true when the aqueous phase is a light liquid phase and the organic phase is a heavy liquid phase.

Figure 14A:
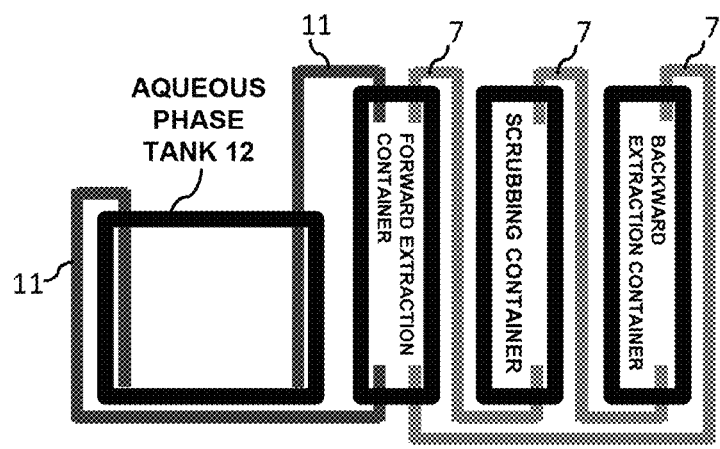
FIG. 14A is a schematic diagram showing an example of the system structure in which an aqueous phase tank is installed outside the main body of the forward extraction container.

When the aqueous phase is circulated within one container, an aqueous phase tank connected to the inlet/outlet of the aqueous phase to the container is installed outside the container body, By circulating the aqueous phase in the tank and the aqueous phase in the container together, the volume (volume of aqueous phase of one batch processed at fixed number of circulations) of a certain amount of aqueous phase (supply liquid to be processed) that can be processed at a time can be freely increased. For example, in the system shown in FIG. 5A, which is the simplest structure of FIG. 3A, an example in which an aqueous phase tank for a forward extraction container is installed outside the main body of the forward extraction container is shown in FIG. 14A. The pumps are not shown because the number of pumps differs between the sealed type and the unsealed type. FIG. 14A schematically shows the system in which by installing an aqueous phase tank outside the main body of the forward extraction container, the liquid circulation is performed together with the aqueous phase in the forward extraction container, and the aqueous phase is not circulated independently in the scrubbing container and the backward extraction container.

Such an aqueous phase tank outside the container body can be installed in an arbitrary number at an installable arbitrary position with respect to all of the systems shown in FIG. 3A, FIG. 7, FIG. 10, and FIG. 12. The same applies when the aqueous phase is a light liquid phase and the organic phase is a heavy liquid phase. In other words, for all the containers in which the aqueous phase is circulated independently, an arbitrary one of the containers can be freely selected, and the aqueous phase tank can be installed there.

Figure 14B:
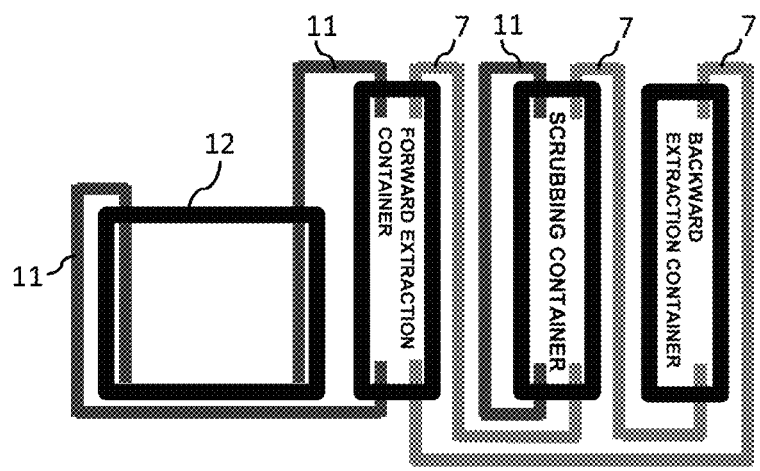
FIG. 14B is a schematic diagram showing another example of the system structure in which the aqueous phase tank is installed outside the main body of the forward extraction container.
Figure 14C:
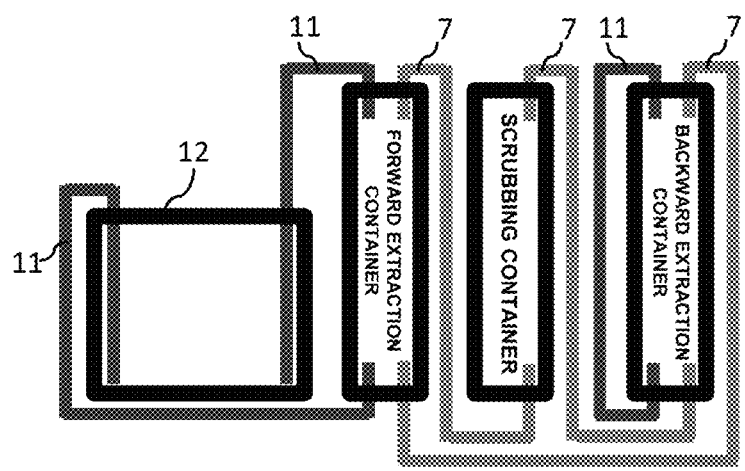
FIG. 14C is a schematic diagram showing still another example of the system structure in which the aqueous phase tank is installed outside the main body of the forward extraction container.
Figure 14D:
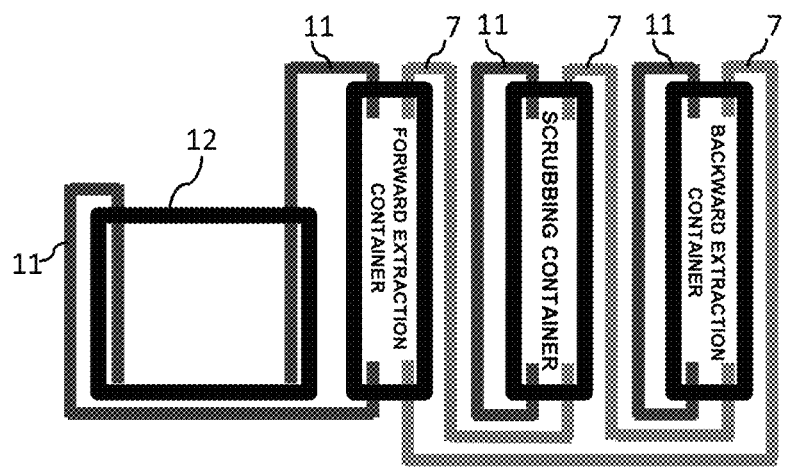
FIG. 14D is a schematic diagram showing still another example of the system structure in which the aqueous phase tank is installed outside the main body of the forward extraction container.

For example, an example in which one forward extraction container, one scrubbing container, and one backward extraction container are provided is described below. In addition to FIG. 14A, an example of the system in which an aqueous phase tank is provided only outside a body of the forward extraction container is shown in each of FIG. 14B, FIG. 14C and FIG. 14D. The pumps are not shown because the number of pumps differs between the sealed type and the unsealed type. Here, FIG. 14B schematically shows the system in which by installing an aqueous phase tank outside the main body of the forward extraction container, the liquid circulation is performed together with the aqueous phase in the forward extraction container, the aqueous phase is circulated independently in the scrubbing container without installing a aqueous phase tank, and the aqueous phase is not circulated independently in the backward extraction container. FIG. 14C schematically shows the system in which by installing an aqueous phase tank outside the main body of the forward extraction container, the liquid circulation is performed together with the aqueous phase in the forward extraction container, the aqueous phase is circulated independently in the backward extraction container without installing the aqueous phase tank, and the aqueous phase is not circulated independently in the scrubbing container. And FIG. 14D schematically shows the system in which by installing an aqueous phase tank outside the main body of the forward extraction container, the liquid circulation is performed together with the aqueous phase in the forward extraction container, the aqueous phase is circulated independently in the scrubbing container and the backward extraction container without installing the aqueous phase tank.

In FIG. 14A, the aqueous phase is not circulated independently in a single container except for the main extraction container. However, in FIG. 14B, the aqueous phase is circulated independently in a single container without installing the aqueous phase tank in the scrubbing container. In FIG. 14C, in the backward extraction container in addition to the forward extraction container, the aqueous phase is circulated independently in a single container without installing the aqueous phase tank. In FIG. 14D, in both the scrubbing container and the backward extraction container in addition to the forward extraction container, the aqueous phase is circulated independently in a single container without installing the aqueous phase tank.

Figure 14E:
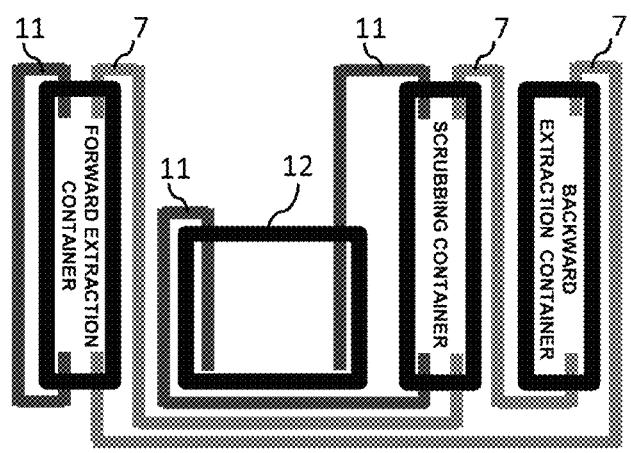
FIG. 14E is a schematic diagram showing an example of the system structure in which the aqueous phase tank is installed outside the main body of the scrubbing container.
Figure 14F:
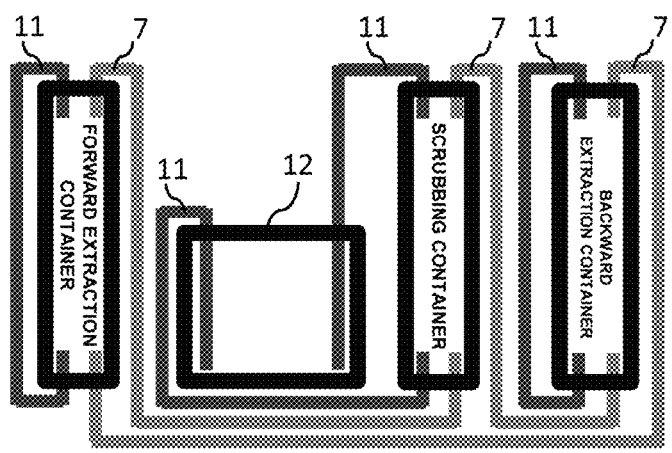
FIG. 14F is a schematic diagram showing another example of the system structure in which the aqueous phase tank is installed outside the main body of the scrubbing container.

An example of the system in which an aqueous phase tank is provided only outside the body of the scrubbing container is shown in each of FIG. 14E and FIG. 14F. In each drawing, the pumps are not shown because the number of pumps differs between the sealed type and the unsealed type. FIG. 14E schematically shows the system in which an aqueous phase tank is provided outside the main body of the scrubbing container, the aqueous phase in the tank is circulated together with the aqueous phase in the scrubbing container, the aqueous phase in the forward extraction container is circulated independently in the same container without installing a aqueous phase tank, and the aqueous phase in the backward extraction container is not circulated independently. FIG. 14F schematically shows the system in which an aqueous phase tank is provided outside the main body of the scrubbing container, the aqueous phase in the tank is circulated together with the aqueous phase in the scrubbing container, and the aqueous phase in the forward extraction container and the backward extraction container is circulated independently in the respective container without installing the aqueous phase tank.

Figure 14G:
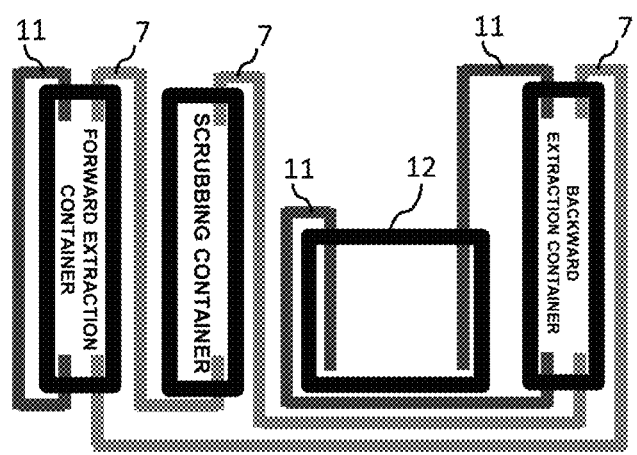
FIG. 14G is a schematic diagram showing an example of the system in which the aqueous phase tank is installed outside the main body of the backward extraction container.
Figure 14H:
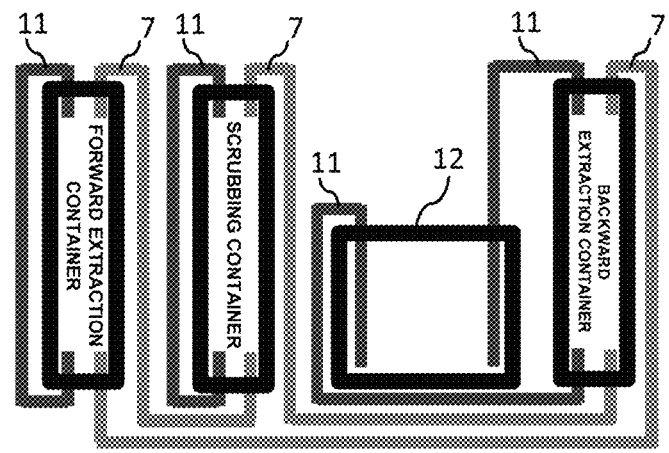
FIG. 14H is a schematic diagram showing another example of the system structure in which the aqueous phase tank is installed outside the main body of the backward extraction container.

In FIG. 14E, the aqueous phase is circulated only in the forward extraction container without installing the aqueous phase tank except the scrubbing container. However, in FIG. 14F, the aqueous phase is circulated independently in each of the forward extraction container and the backward extraction container without installing the aqueous phase tank except the scrubbing container. An example of the system in which an aqueous phase tank is provided only outside a body of the backward extraction container is shown in each of FIG. 14G and FIG. 14H. In each drawing, the pumps are not shown because the number of pumps differs between the sealed type and the unsealed type. FIG. 14G schematically shows the system in which by an aqueous phase tank is installed outside the main body of the backward extraction container, the aqueous phase in the tank is circulated together with the aqueous phase in the backward extraction container, the aqueous phase in the forward extraction container is circulated independently in the same part without installing the aqueous phase tank, and the aqueous phase in the scrubbing container is not circulated independently. FIG. 14H schematically shows the system in which an aqueous phase tank is installed outside the main body of the backward extraction container, the aqueous phase in the tank is circulated together with the aqueous phase in the backward extraction container, the aqueous phases in the forward extraction container and the scrubbing container is circulated independently in the respective part without installing the aqueous phase tank.

In FIG. 14G, the aqueous phase is circulated independently in only the forward extraction container without installing the aqueous phase tank except the backward extraction container. And in FIG. 14H, the aqueous phase is circulated independently in the forward extraction container and the scrubbing container without installing the aqueous phase tank except the backward extraction container.

Figure 14I:
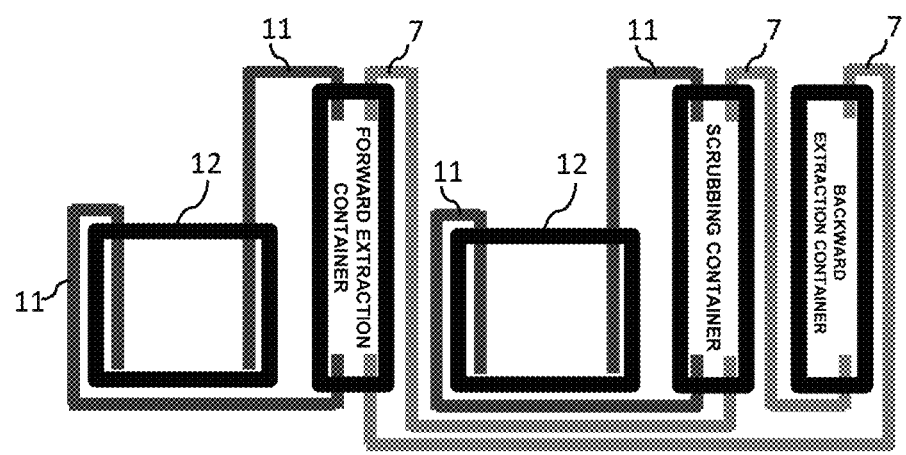
FIG. 14I is a schematic diagram showing an example of the system structure in which one aqueous phase tank is installed outside each of the main body of the forward extraction container and the scrubbing container.
Figure 14J:
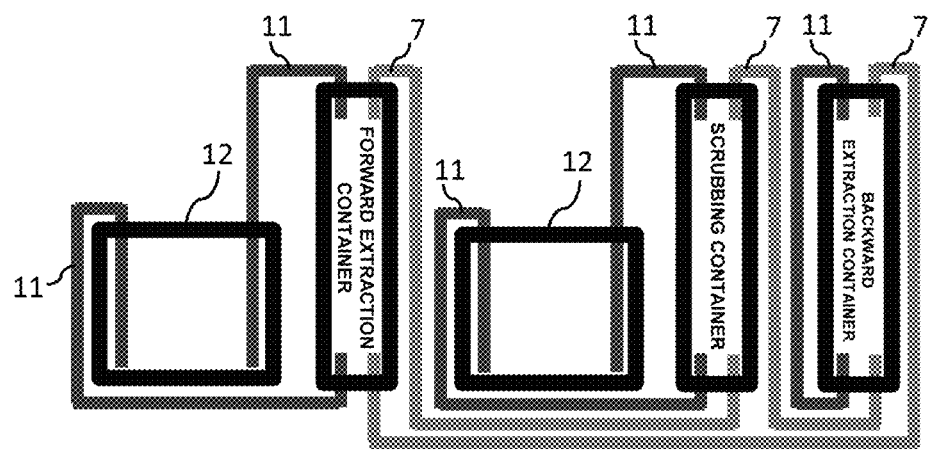
FIG. 14J is a schematic diagram showing another example of the system structure in which one aqueous phase tank is installed outside each of the main body of the forward extraction container and the scrubbing container.

An example of the system in which an individual aqueous phase tank is provided outside a body of each of the forward extraction container and the scrubbing container is shown in FIG. 14I and FIG. 14J. In each drawing, the pumps are not shown because the number of pumps differs between the sealed type and the unsealed type. FIG. 14I schematically shows the system in which an aqueous phase tank is installed outside the main body of each of the forward extraction container and the scrubbing container, the aqueous phases in their tanks are circulated respectively together with the aqueous phase in each of the forward extraction container and the scrubbing container, the aqueous phase in the backward extraction container is not circulated independently. FIG. 14J schematically shows the system in which an aqueous phase tank is installed outside the main body of each of the forward extraction container and the scrubbing container, the aqueous phases in their tanks are circulated respectively together with the aqueous phase in each of the forward extraction container and the scrubbing container, the aqueous phase in the backward extraction container is circulated independently in the same container without installing the aqueous phase tank.

In FIG. 14I, the aqueous phase is not circulated independently in the backward extraction container, but in FIG. 14J, the aqueous phase is circulated independently in the backward extraction container without installing the aqueous phase tank.

Figure 14K:
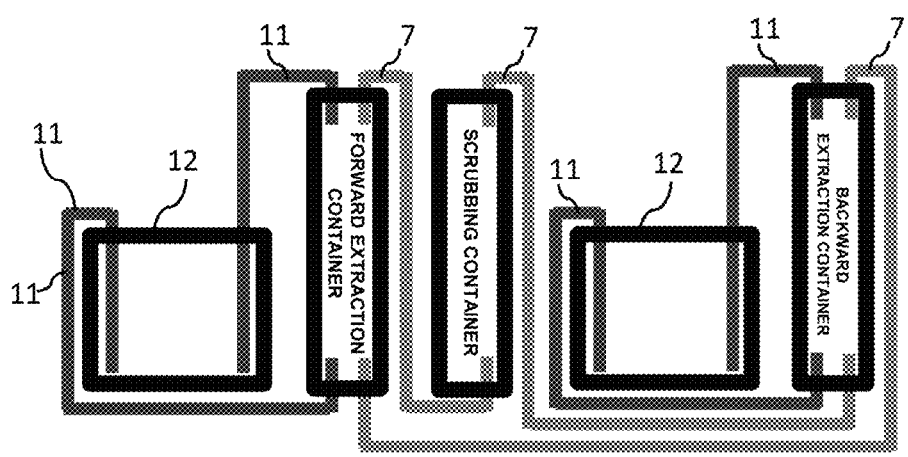
FIG. 14K is a schematic diagram showing an example of the system structure in which one aqueous phase tank is installed outside each of the main body of the forward extraction container and the backward extraction container.
Figure 14L:
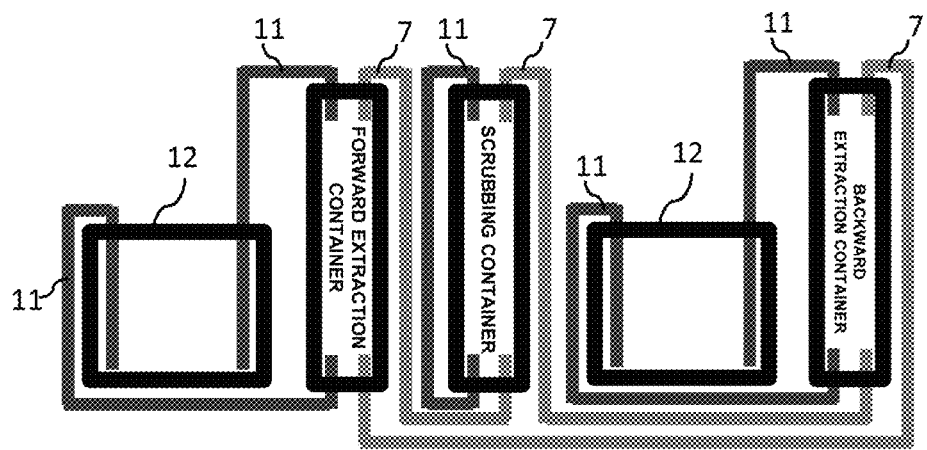
FIG. 14L is a schematic diagram showing another example of the system structure in which one aqueous phase tank is installed outside each of the main body of the forward extraction container and the backward extraction container.

An example of the system in which an individual aqueous phase tank is provided outside a body of each of the forward extraction container and the backward extraction container is shown in FIG. 14K and FIG. 14L. In each drawing, the pumps are not shown because the number of pumps differs between the sealed type and the unsealed type. FIG. 14K schematically shows the system in which an aqueous phase tank is installed outside the main body of each of the forward extraction container and the backward extraction container, the aqueous phases in their tanks are circulated respectively together with the aqueous phase in each of the forward extraction container and the backward extraction container, the aqueous phase in the scrubbing container is not circulated independently in the same container. FIG. 14L schematically shows the system in which an aqueous phase tank is installed outside the main body of each of the forward extraction container and the backward extraction container, the aqueous phases in their tanks are circulated respectively together with the aqueous phase in each of the forward extraction container and the backward extraction container, the scrubbing container is not provided with such an aqueous tank and the aqueous phase in the scrubbing container is circulated independently in the same container.

In FIG. 14K, the aqueous phase is not circulated independently in the scrubbing container, but in FIG. 14L, the aqueous phase is circulated independently in the scrubbing container without installing the aqueous phase tank.

Figure 14M:
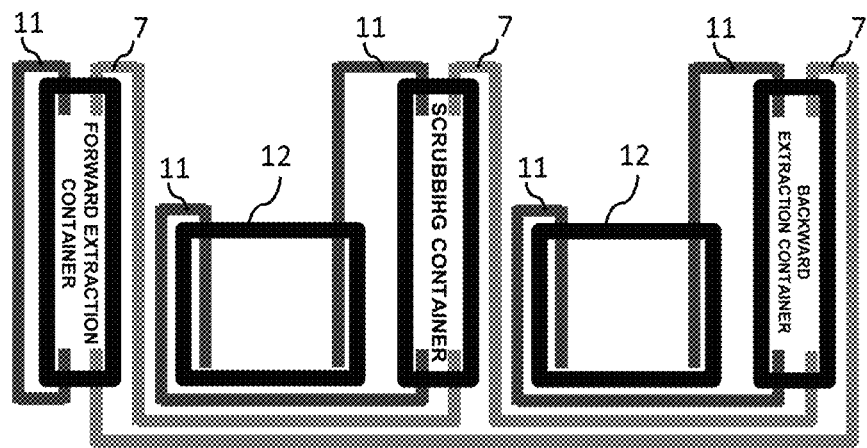
FIG. 14M is a schematic diagram showing an example of the system structure in which one aqueous phase tank is installed outside each of the main body of the scrubbing container and the backward extraction container.

An example of the system in which an individual aqueous phase tank is provided outside a body of each of the scrubbing container and the backward extraction container is shown in FIG. 14M. The pumps are not shown because the number of pumps differs between the sealed type and the unsealed type. FIG. 14M schematically shows the system in which by installing an aqueous phase tank outside the main body of each of the scrubbing container and the backward extraction container, the liquid circulation is performed respectively together with the aqueous phase in each container, the aqueous phase is circulated independently in the forward extraction container without installing the aqueous phase tank.

Figure 14N:
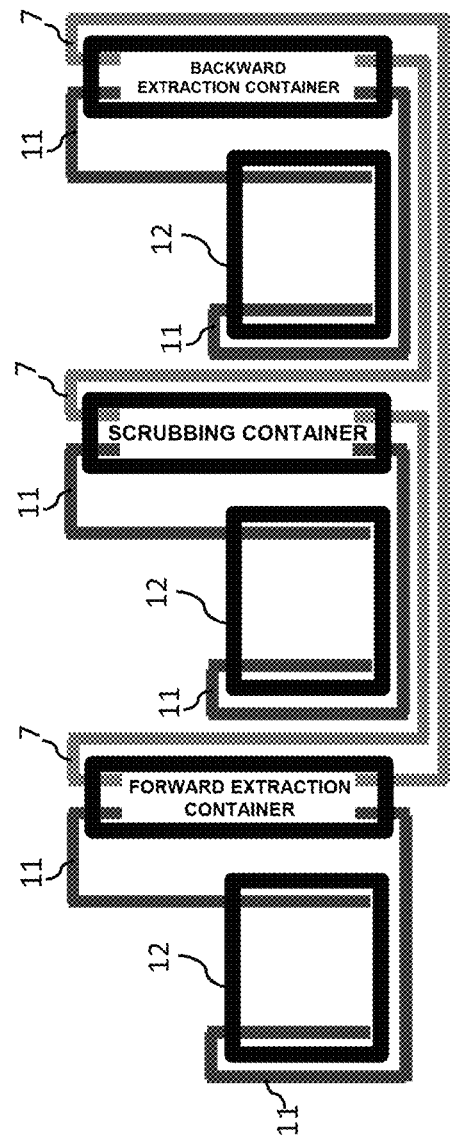
FIG. 14N is a schematic diagram showing an example of the system structure in which one aqueous phase tank is installed outside each of the forward extraction container, the scrubbing container, and the backward extraction container.

Finally, an example of the system in which an individual aqueous phase tank is provided outside a body of each of the forward extraction container, the scrubbing container and the backward extraction container is shown in FIG. 14N. The pumps are not shown because the number of pumps differs between the sealed type and the unsealed type. FIG. 14N schematically shows the system in which by installing an aqueous phase tank outside the main body of each of the forward extraction container, scrubbing container and the backward extraction container, the liquid circulation is performed respectively together with the aqueous phase in each container. In FIG. 14M, the aqueous phase is circulated independently in the forward extraction container without installing the aqueous phase tank. Further, in FIG. 14N, the aqueous phase is circulated independently in each container by installing the aqueous phase tank in each of the forward extraction container, the scrubbing container, and the backward extraction container.

FIG. 14A and FIG. 14B are compared. Since the scrubbing container and the backward extraction container in FIG. 14A do not have the structure to circulate independently in a single container, they do not basically have the section (aqueous phase separating section) where the separated aqueous phases collect. Therefore, the volume of the aqueous phase in the scrubbing container and the backward extraction container is kept to a minimum. On the other hand, FIG. 14B shows the structure in which the aqueous phase is circulated independently in the scrubbing container. Such a container structure is used when an aqueous phase separating section is provided in the scrubbing container. Namely, in a container structure having an aqueous phase separating section, it is necessary to circulating independently the aqueous phase in a single container in order to efficiently bring the aqueous phase retained in the aqueous phase separating section into contact with the organic phase. By providing the aqueous phase separating section in the container, a larger amount of aqueous phase can be stored as compared with the container having no aqueous phase separating section. That is, the structure shown in FIG. 14B is used when it is desired to increase the volume of the aqueous phase to be filled in the scrubbing container in comparison with FIG. 14A.

Similarly, FIG. 14C is used when it is desired to increase the volume of the aqueous phase filled in the backward extraction container in comparison with FIG. 14A. FIG. 14D is used when it is desired to secure a larger aqueous phase volume for both the scrubbing container and the backward extraction container.

Also, as shown in FIG. 14E to FIG. 14N, an aqueous phase tank can be installed outside the container body for the scrubbing container and/or the backward extraction container. As shown in FIG. 14E, FIG. 14F, FIG. 14G, FIG. 14H, and FIG. 14M, the forward extraction container is not provided with an aqueous phase tank outside the container body in some cases.

By installing an aqueous phase tank outside the container body, the volume of the aqueous phase that can be handled can be freely increased for the scrubbing container and/or the backward extraction container. The reason is mainly to suppress the concentration of components in the scrubbing container and/or the backward extraction container, which progresses each time the number of treatments (the number of batches) in the forward extraction container is repeated. In fact, by installing a tank outside the container body for the scrubbing container and/or the backward extraction container, even if the number of treatments (the number of batches) in the forward extraction container increases, the number of changes of the scrubbing liquid in the scrubbing container and/or the backward extraction liquid in the backward extraction container can be suppressed.

As for the scrubbing container and the backward extraction container, a plurality of containers may be provided as necessary. Therefore, the aqueous phase tank attached to the container and outside the main body of the container can be installed with the same number as the number of containers as the upper limit. In addition, in the closed type apparatus, even if a plurality of scrubbing containers and/or backward extraction containers are used, it is possible to operate by one organic phase pump up to a certain extent (ex. up to about 10 containers in total). Also, the number of pumps for the aqueous phase does not increase even when the aqueous phase tank is installed.

Figure 15A:
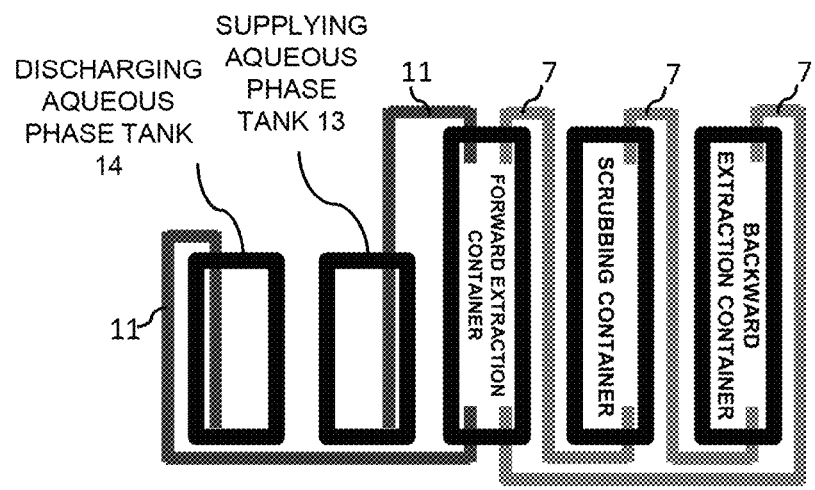
FIG. 15A is a schematic diagram showing an example of the system structure in which the aqueous phase tank shown in FIG. 14A is individually installed on the supply side and the discharge side of the aqueous phase.
Figure 15B:
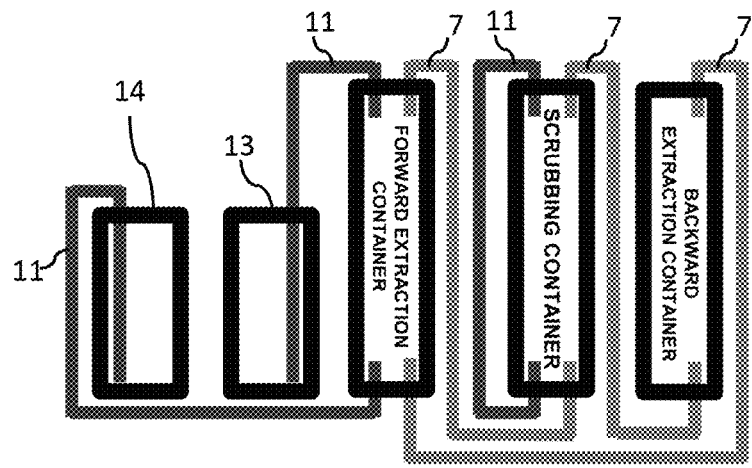
FIG. 15B is a schematic diagram showing an example of the system structure in which the aqueous phase tank shown in FIG. 14B is individually installed on the supply side and the discharge side of the aqueous phase.
Figure 15C:
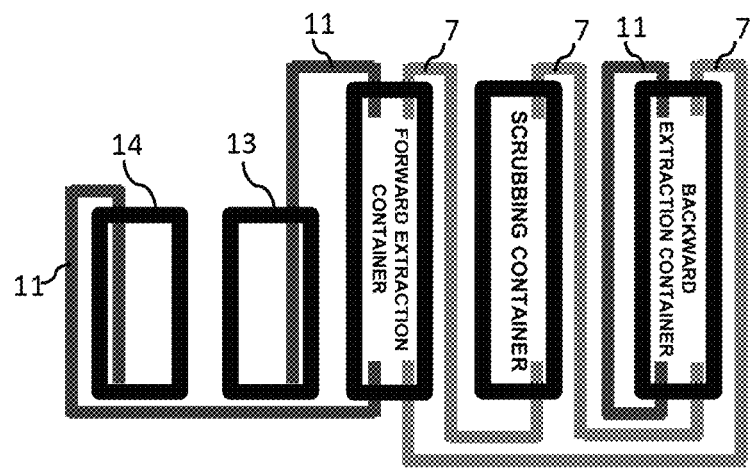
FIG. 15C is a schematic diagram showing an example of the system structure in which the aqueous phase tank shown in FIG. 14C is individually installed on the supply side and the discharge side of the aqueous phase.
Figure 15D:
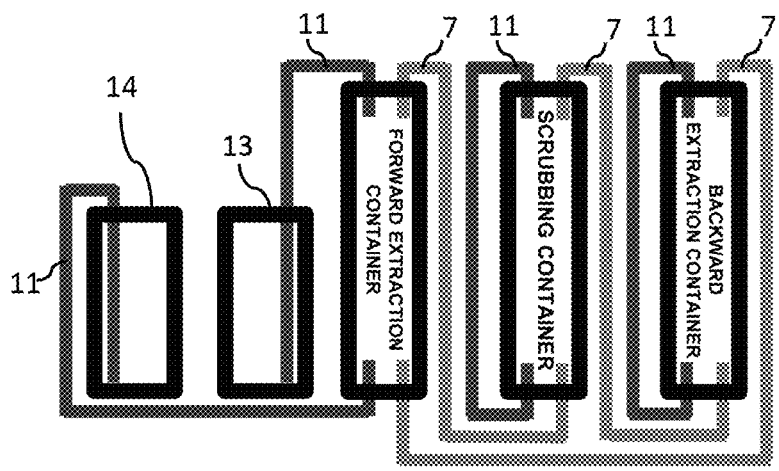
FIG. 15D is a schematic diagram showing an example of the system structure in which the aqueous phase tank shown in FIG. 14D is individually installed on the supply side and the discharge side of the aqueous phase.
Figure 15E:
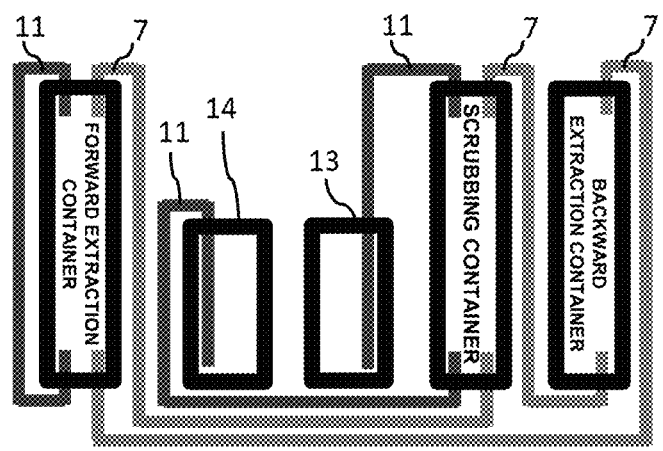
FIG. 15E is a schematic diagram showing an example of the system structure in which the aqueous phase tank shown in FIG. 14E is individually installed on the supply side and the discharge side of the aqueous phase.
Figure 15F:
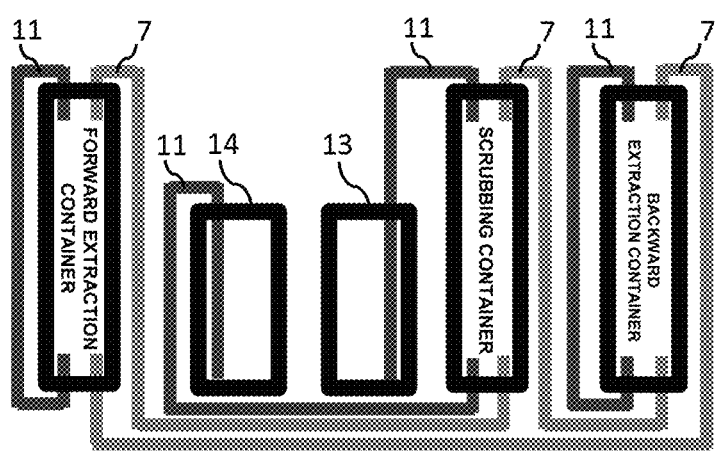
FIG. 15F is a schematic diagram showing an example of the system structure in which the aqueous phase tank shown in FIG. 14F is individually installed on the supply side and the discharge side of the aqueous phase.
Figure 15G:
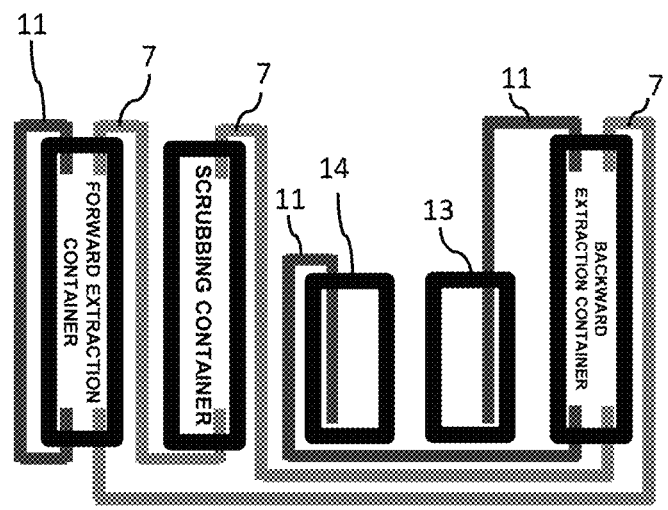
FIG. 15G is a schematic diagram showing an example of the system structure in which the aqueous phase tank shown in FIG. 14G is individually installed on the supply side and the discharge side of the aqueous phase.
Figure 15H:
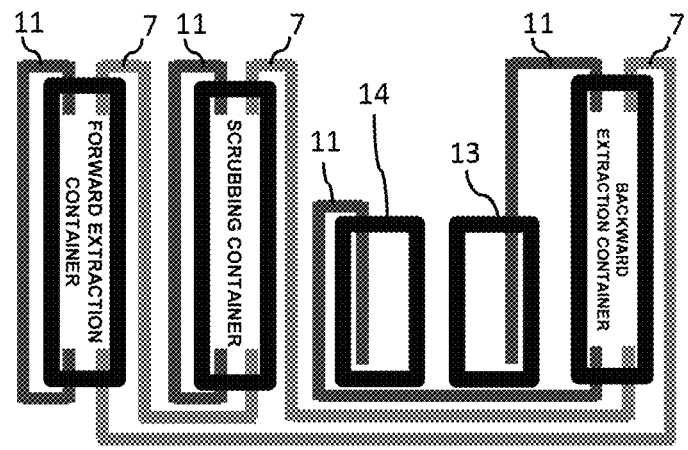
FIG. 15H is a schematic diagram showing an example of the system structure in which the aqueous phase tank shown in FIG. 14H is individually installed on the supply side and the discharge side of the aqueous phase.
Figure 15I:
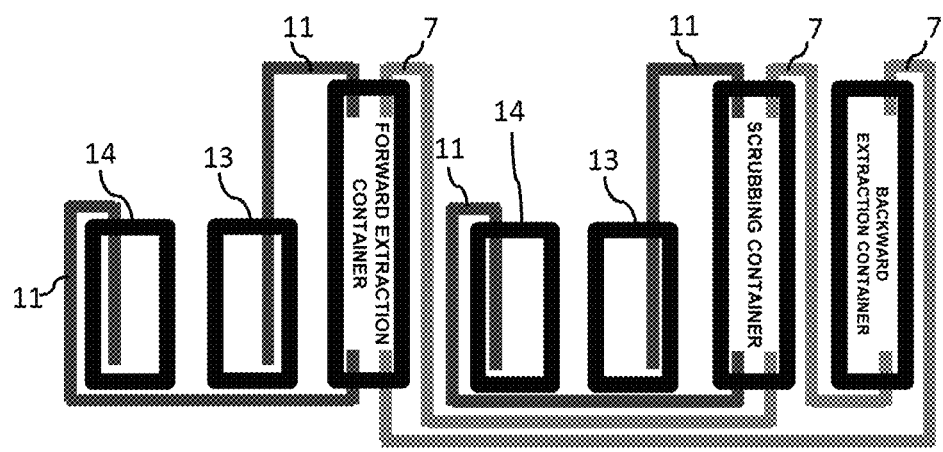
FIG. 15I is a schematic diagram showing an example of the system structure in which the aqueous phase tank shown in FIG. 14I is individually installed on the supply side and the discharge side.
Figure 15J:
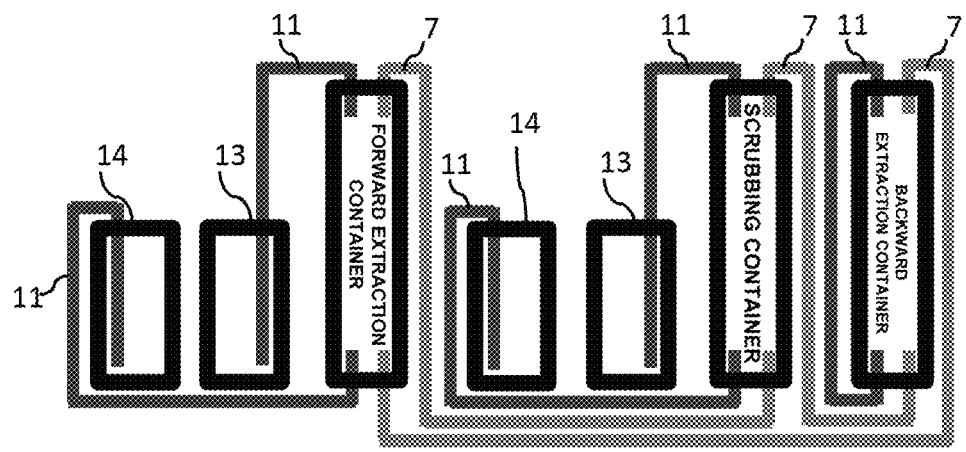
FIG. 15J is a schematic diagram showing an example of the system structure in which the aqueous phase tank shown in FIG. 14J is individually installed on the supply side and the discharge side of the aqueous phase.
Figure 15K:
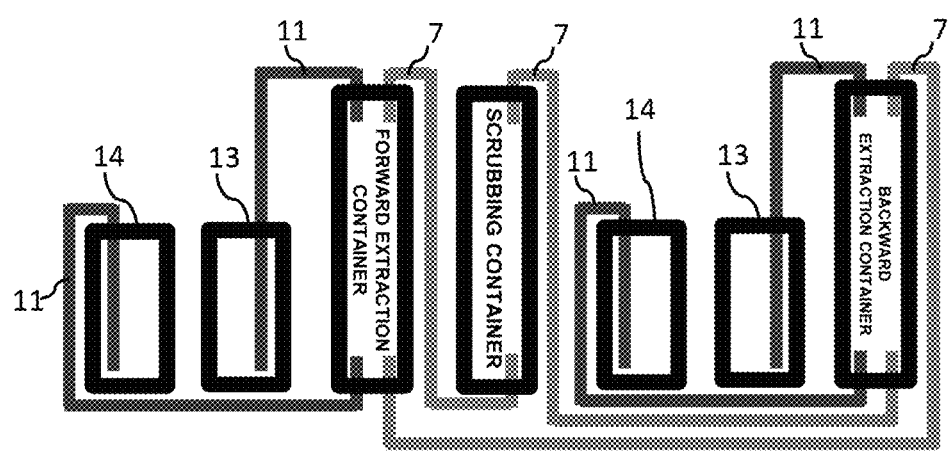
FIG. 15K is a schematic diagram showing an example of the system structure in which the aqueous phase tank shown in FIG. 14K is individually installed on the supply side and the discharge side of the aqueous phase.
Figure 15L:
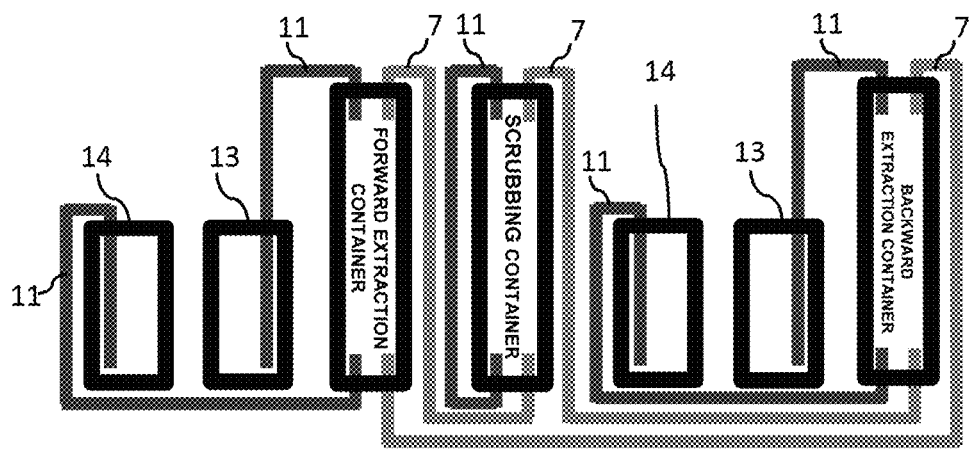
FIG. 15L is a schematic diagram showing an example of the system structure in which the aqueous phase tank shown in FIG. 14L is individually installed on the supply side and the discharge side of the aqueous phase.
Figure 15M:
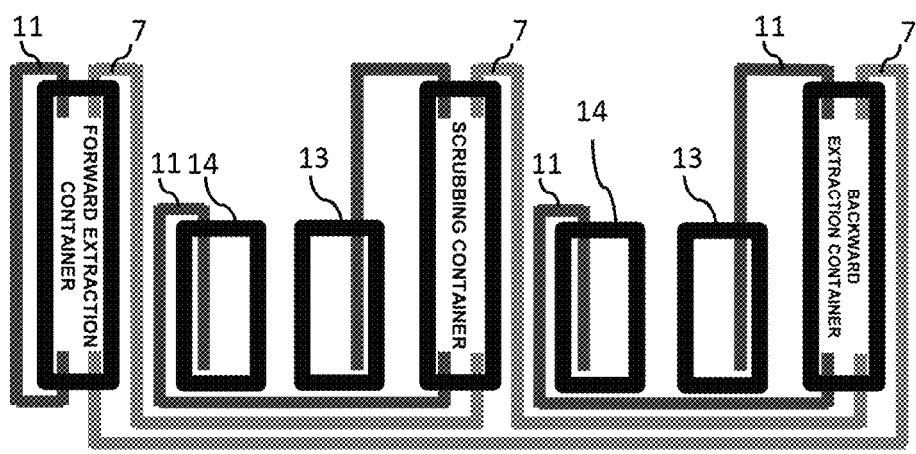
FIG. 15M is a schematic diagram showing an example of the system structure in which the aqueous phase tank shown in FIG. 14M is individually installed on the supply side and the discharge side of the aqueous phase.
Figure 15N:
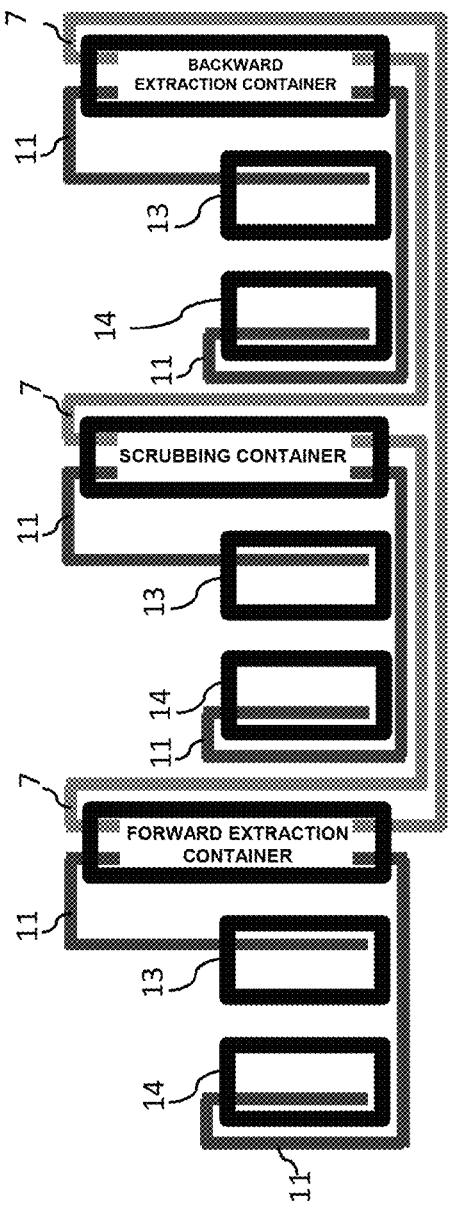
FIG. 15N is a schematic diagram showing an example of the system structure in which the aqueous phase tank shown in FIG. 14N is individually installed on the supply side and the discharge side of the aqueous phase.

Further, as for the aqueous phase tank provided outside the container body, a tank for storing an aqueous phase supplied into the container (supply aqueous phase tank) and a tank for storing an aqueous phase discharged from the container (discharge aqueous phase tank) can be installed individually. For example, in the case where one forward extraction container, one scrubbing container, and one backward extraction container are installed, the system configuration is as shown in FIG. 15A to FIG. 15N. In each drawing, the pumps are not shown because the number of pumps differs between the sealed type and the unsealed type. FIG. 15A to FIG. 15N show the system in a case where the aqueous phase tanks shown in FIG. 14A to FIG. 14N are separately installed for the supply side aqueous phase and the discharge side aqueous. Thus, the supply side aqueous phase and the discharge side aqueous phase are not mixed by separately storing them, and the effect of the multistage by synchronous liquid circulation is more efficiently exhibited.

Figure 16A:
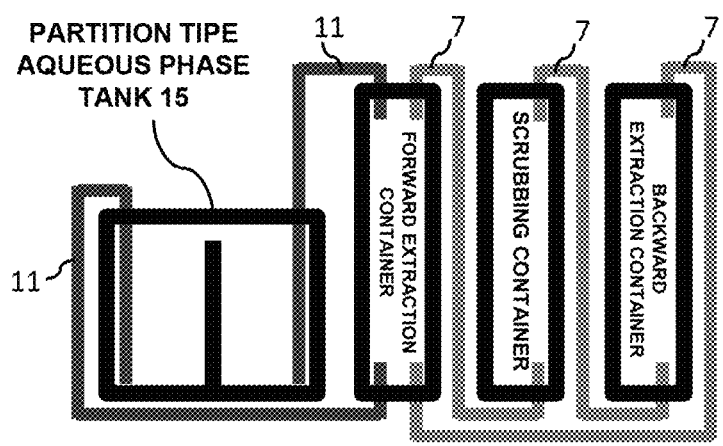
FIG. 16A is a schematic diagram showing the structure in which the aqueous phase tank shown in FIG. 14A is changed to a partition type aqueous phase tank.
Figure 16B:
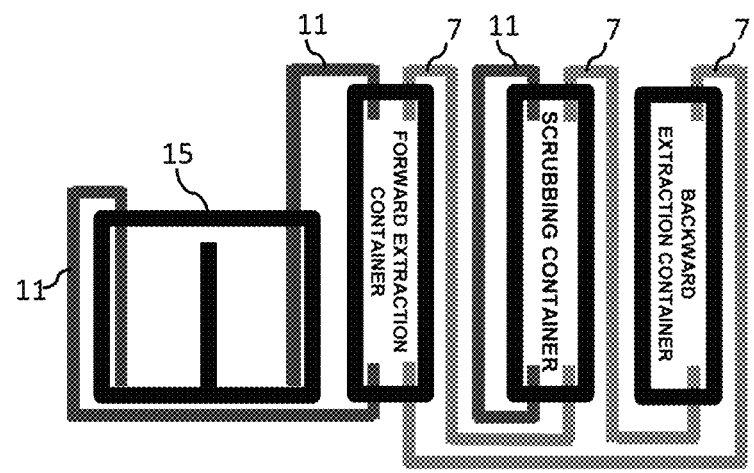
FIG. 16B is a schematic diagram showing the structure in which the aqueous phase tank shown in FIG. 14B is changed to a partition type aqueous phase tank.
Figure 16C:
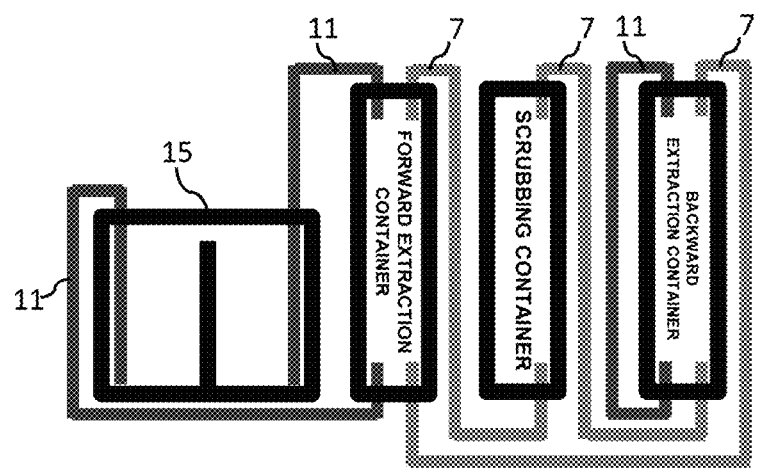
FIG. 16C is a schematic diagram showing the structure in which the aqueous phase tank shown in FIG. 14C is changed to a partition type aqueous phase tank.
Figure 16D:
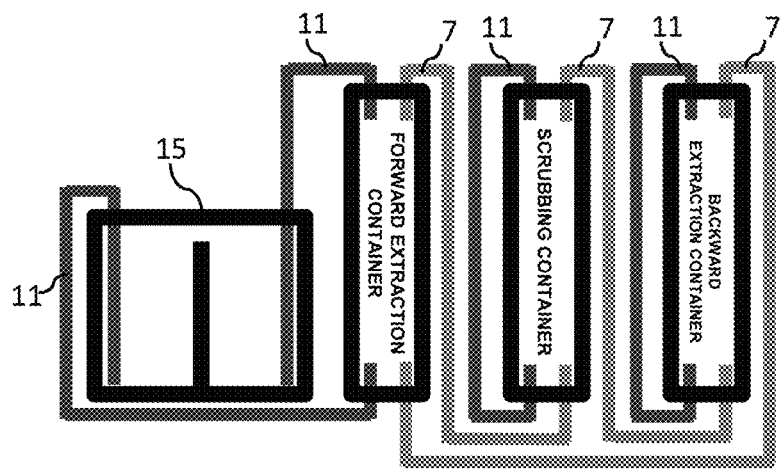
FIG. 16D is a schematic diagram showing the structure in which the aqueous phase tank shown in FIG. 14D is changed to a partition type aqueous phase tank.
Figure 16E:
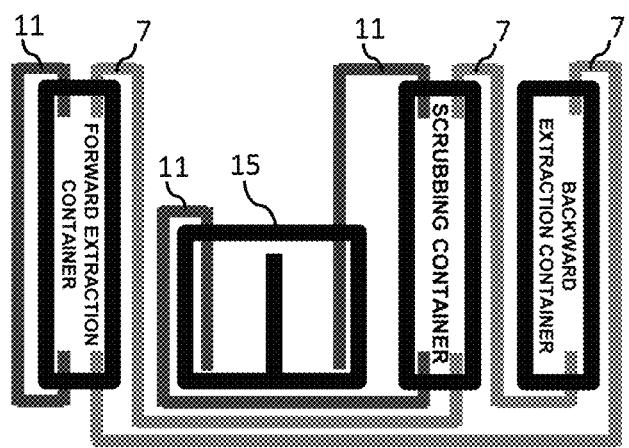
FIG. 16E is a schematic diagram showing the structure in which the aqueous phase tank shown in FIG. 14E is changed to a partition type aqueous phase tank.
Figure 16F:
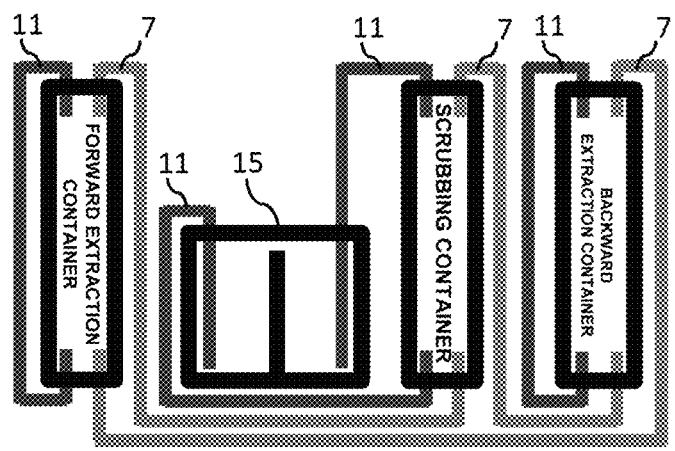
FIG. 16F is a schematic diagram showing the structure in which the aqueous phase tank shown in FIG. 14F is changed to a partition type aqueous phase tank.
Figure 16G:
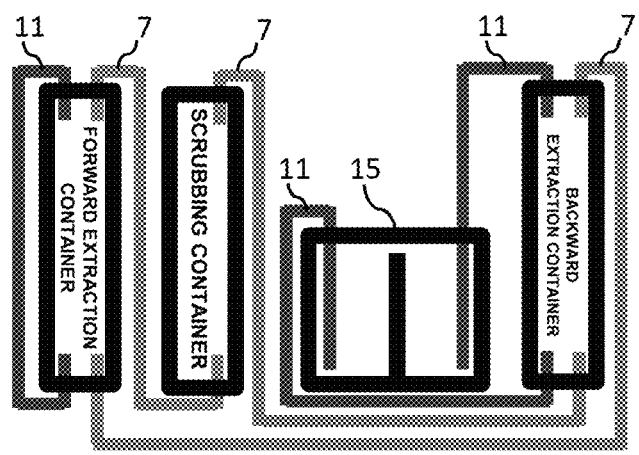
FIG. 16G is a schematic diagram showing the structure in which the aqueous phase tank shown in FIG. 14G is changed to a partition type aqueous phase tank.
Figure 16H:
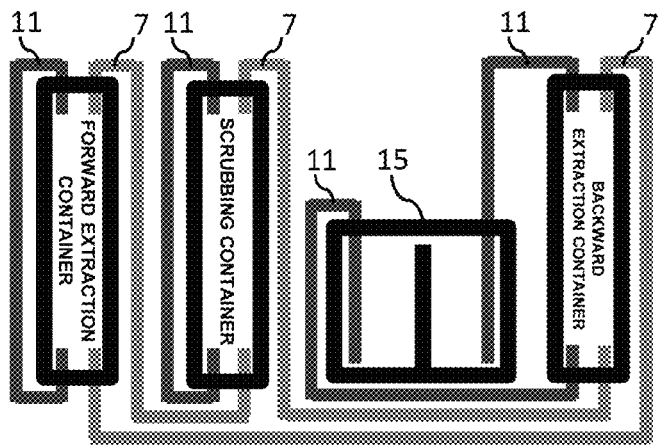
FIG. 16H is a schematic diagram showing the structure in which the aqueous phase tank shown in FIG. 14H is changed to a partition type aqueous phase tank.
Figure 16I:
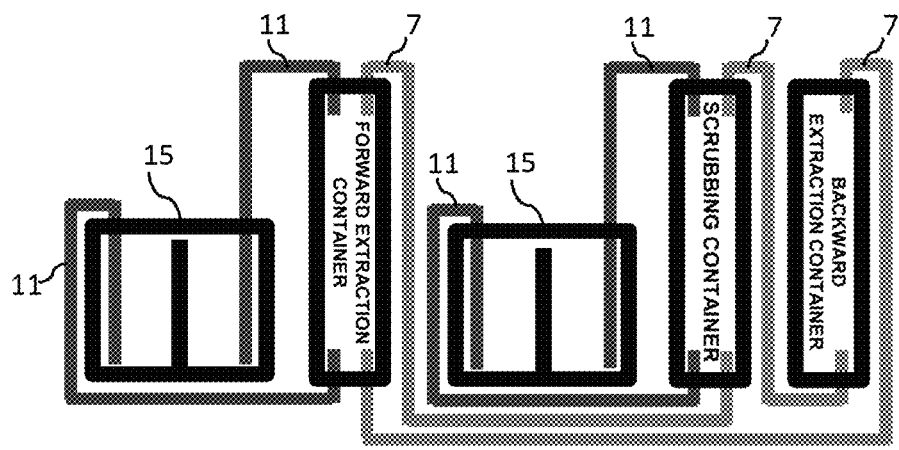
FIG. 16I is a schematic diagram showing the structure in which the aqueous phase tank shown in FIG. 14I is changed to a partition type aqueous phase tank.
Figure 16J:
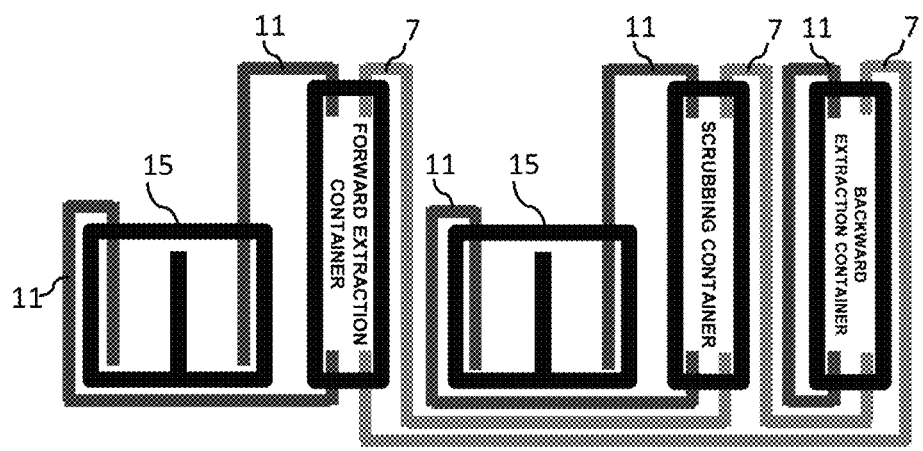
FIG. 16J is a schematic diagram showing the structure in which the aqueous phase tank shown in FIG. 14J is changed to a partition type aqueous phase tank.
Figure 16K:
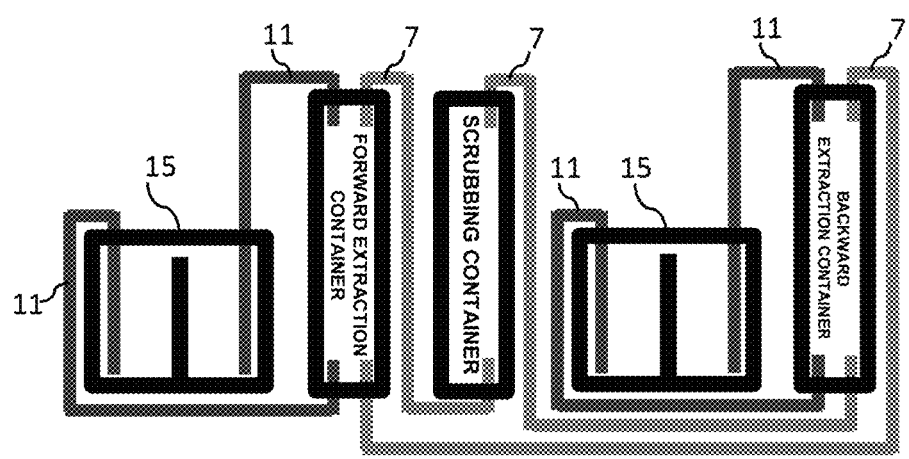
FIG. 16K is a schematic diagram showing the structure in which the aqueous phase tank shown in FIG. 14K is changed to a partition type aqueous phase tank.
Figure 16L:
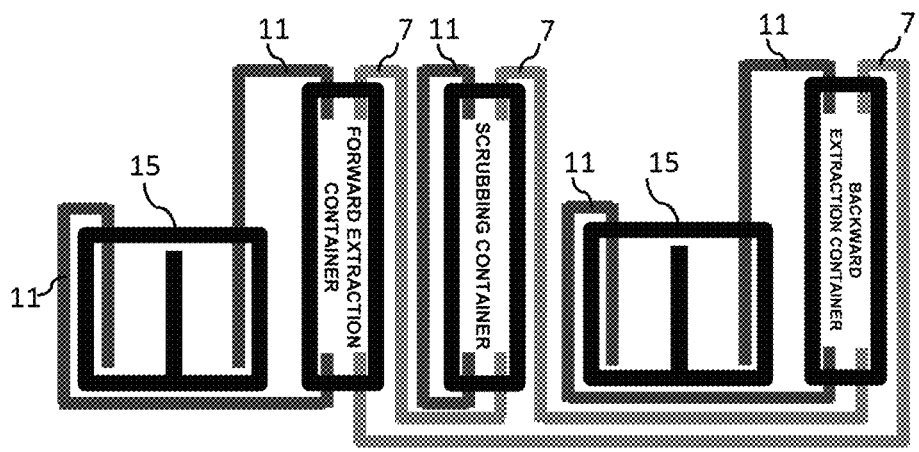
FIG. 16L is a schematic diagram showing the structure in which the aqueous phase tank shown in FIG. 14L is changed to a partition type aqueous phase tank.
Figure 16M:
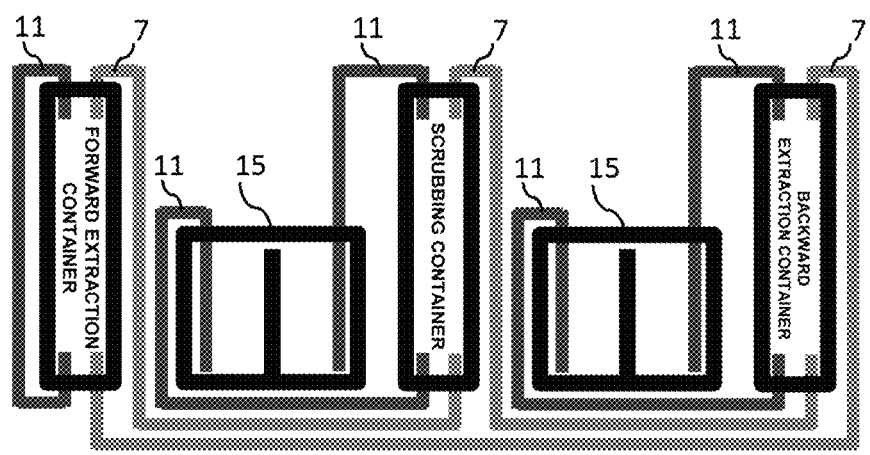
FIG. 16M is a schematic diagram showing the structure in which the aqueous phase tank shown in FIG. 14M is changed to a partition type aqueous phase tank.
Figure 16N:
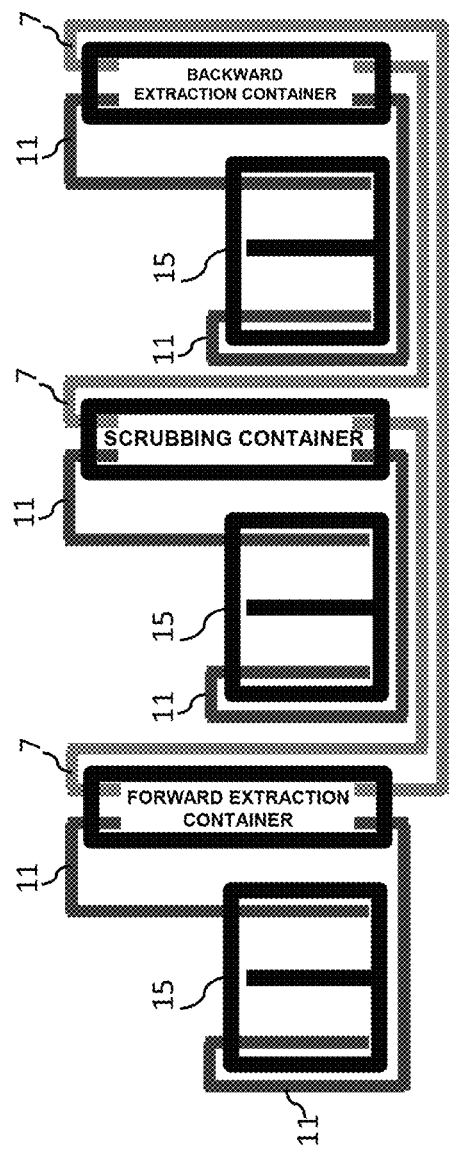
FIG. 16N is a schematic diagram showing the structure in which the aqueous phase tank shown in FIG. 14N is changed to a partition type aqueous phase tank.

By dividing one tank into two sections by a partition without separately installing the aqueous phase tank on the supply side and the discharge side, the aqueous phase supplied to the container and the aqueous phase discharged from the same container can be stored separately. For example, in the case where there is one forward extraction container, one scrubbing container, and one backward extraction container, the configurations shown in FIG. 16A to FIG. 16N can be taken. In each drawing, the pumps are not shown because the number of pumps differs between the sealed type and the unsealed type. FIG. 16A to FIG. 16N show the system in a case where the aqueous phase tank shown in FIG. 14A to FIG. 14N is changed to a partition type aqueous phase tank.

When either the individual type or the partition type is used, the supply aqueous phase and the discharge aqueous phase are stored separately, so that both phases are not mixed. As a result, the effect of the multistage by synchronous liquid circulation is more efficiently exhibited than in the case where the supply aqueous phase and the discharge aqueous phase are mixed. Also, in the case where the supply aqueous phase and the discharge aqueous phase are separately stored, a plurality of scrubbing containers and/or a plurality of backward extraction containers may be provided as necessary. Therefore, in the case of the individual type, the number of the aqueous phase tanks attached outside the main body of the container can be set to an upper limit of twice the number of the containers. Further, in the case of the partition type, the number of the tanks can be set up to the same number as the number of containers.

Regarding the container in which the aqueous phase is circulated independently in its single container, when the supply aqueous phase and the discharge aqueous phase are separately stored, it is necessary to repeatedly and independently circulate the aqueous phase in the container while alternately switching without distinction between the individual type and the partition type. The switching of the flow path at that time may be performed manually, but can be easily automated by using electronic control. For example, the flow path can be switched by an electronically controlled solenoid valve.

Figure 17:
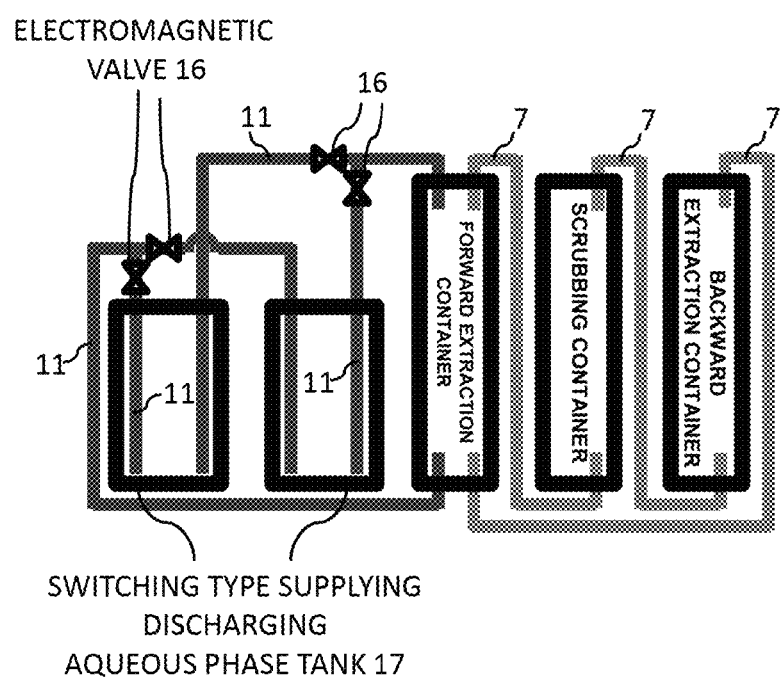
FIG. 17 is a schematic view showing the structure in which a solenoid valve is applied to the apparatus in which the aqueous phase tank is individually installed as shown in FIG. 15A.
Figure 18:
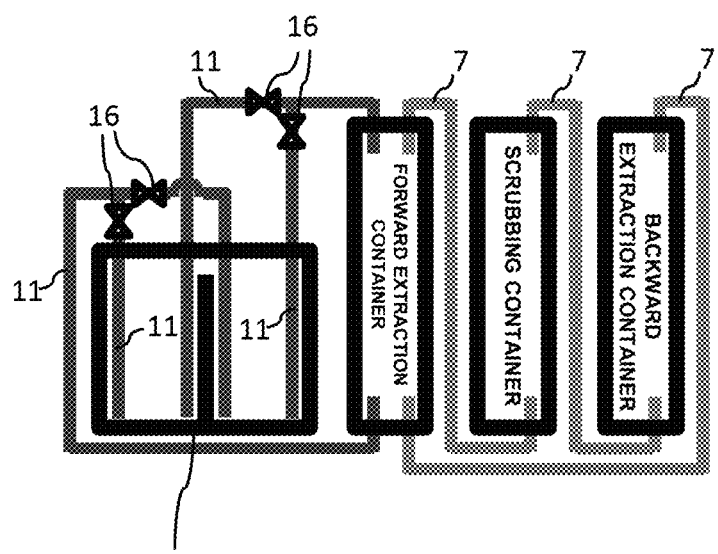
FIG. 18 is a schematic diagram showing the structure in which a solenoid valve is applied to the apparatus in which the partition type aqueous phase tank shown in FIG. 16A is installed.

FIG. 17 shows an example in which a solenoid valve is applied to a system shown in FIG. 15A in which aqueous phase tanks for the supply and the discharge (individual type) are separately installed. In FIG. 17, the pumps are not shown because the number of pumps differs between the sealed type and the unsealed type. FIG. 18 shows an example in which a solenoid valve is applied to the system shown in FIG. 16A in which an aqueous phase tank with a partition (partition type) is installed. In FIG. 18, the pumps are not shown because the number of pumps differs between the sealed type and the unsealed type.

Hereinafter, specific embodiments of a method of producing a specific substance which is separated and refined using the present invention will be described with reference to embodiments, but the present invention is not limited to the following embodiments.

Embodiment 1

Separation of Thulium Tm (III) and Lutetium Lu (III)

Thulium Tm (III) of atomic number 69 and Lutetium Lu (III) of atomic number 71, which are lanthanoid series heavy rare earth elements was extracted and separated. In this embodiment, an emulsion flow apparatus with sealed containers, which has the structure shown in FIG. 15D is used as an example of the device of the present invention. Since these elements have similar atomic numbers (69 and 71) and their chemical properties are very similar, a high degree of separation cannot be achieved without multistage extraction.

Generally, a phosphoric acid-based extractant having a high selective separation ability for the element group is used for the extraction and separation of the heavy rare earth element group. Specifically, the organic solution in which 2-ethylhexyl phosphonate (registered trademark: PC-88A), which is one of the phosphoric acid-based extractants is dissolved in a diluting solvent (registered trademark: ShellSol D70) containing alkane as a main component, is often used as the organic phase. In this embodiment, Tm (III) and Lu (III) were extracted and separated from the nitric acid aqueous solution of pH 0.9 using ShellSol D70 in which PC-88A was dissolved at the concentration of 0.01 M (mol $dm^{-3}$).

First, prior to the experiment using the emulsion flow apparatus, a batch experiment was performed, in which Tm (III) and Lu (III) were extracted and separated from the nitric acid aqueous solution at pH 0.9 using ShellSol D70 organic solution containing PC-88A at a concentration of 0.01 M. Specifically, 2.5 mL each of the aqueous phase and the organic phase was put into a test tube with a stopper, and shaken at 180 times/minute for 20 minutes with a vertical shaker to allow extraction equilibrium. Then, centrifugation was performed using a centrifuge until two liquid phases were sufficiently separated. The region where the distribution ratio (value obtained by dividing the concentration of the target substance in the organic phase by the concentration of the target substance in the aqueous phase) did not change with respect to the shaking time was regarded as a region where the extraction equilibrium was obtained.

As a result, under these conditions, the distribution ratio of Lu (III) was 0.475, and the distribution ratio of Tm (III) was 0.078. Further, the separation coefficient of Lu (III) with respect to Tm (III) was 6.1. The separation coefficient (=6.1) is a value obtained by dividing the distribution ratio of Lu (III) by the distribution ratio of Tm (III). In addition, by using 1 M (mol dm$^{-3}$) nitric acid aqueous solution, the total amount of Lu (III) and Tm (III) contained in the organic phase (0.01 M PC-88A/ShellSol D70) could be back-extracted. There, the aqueous nitric acid solution at pH 0.9 was used as the aqueous phase in the forward extraction and the scrubbing, and 1M aqueous nitric acid solution was used as the aqueous phase in the backward extraction.

The system shown in FIG. 15D is composed of one forward extraction container, one scrubbing container, and one backward extraction container. In the experiment of this example, three emulsion flow containers (towers) having the same shape and the same volume (480 mL) were used. And, the same type nozzles as the three aqueous phase spray nozzles and the organic phase spray nozzles attached to the above container are used also for the forward extraction container, the scrubbing container, and the backward extraction container. The aqueous phase spray nozzle is manufactured by using a 0.3 mm diameter polypropylene tube with one end closed and 15 perforations. On the other hand, the organic phase spray nozzle is formed of a glass bead sintered plate having a droplet spray surface with many perforations of which the diameter (pore size) is 0.04 mm to 0.05 mm.

The volume of each of the aqueous phase tanks installed in the forward extraction tower, the scrubbing tower, and the backward extraction tower is 265 mL. The volume of the aqueous phase tanks (supply liquid to be processed) installed on the supply side of the aqueous phase tank attached to the outside of the main extraction tower is also 265 mL. On the other hand, the volume of the organic phase tanks installed in the forward extraction tower, the scrubbing tower, and the backward extraction tower is 245 mL each. In this state, the liquid-liquid interface in the two liquid phase mixing section (the portion where the aqueous phase and the organic phase are emulsion-mixed) of each tower is located at a position that is exactly half the volume of the two liquid phase mixing section. The volume ratio of the aqueous phase to the organic phase in the mixing section was adjusted to 1:1.

In the extraction and separation experiment of Tm (III) and Lu (III) using the above-described apparatus, the organic phase circulated across the forward extraction tower, the scrubbing tower, and the backward extraction tower is ShellSol D70 solution containing 0.01 M PC-88A, which is common to three towers. On the other hand, the aqueous phase of the forward extraction tower and the scrubbing tower is the nitric acid aqueous solution adjusted to pH 0.9, and the same one is installed in both towers. The aqueous phase of the backward extraction tower is 1 M aqueous nitric acid solution which is installed only in the backward extraction tower. In addition, in the supply aqueous phase tank attached to the forward extraction tower, the nitric acid aqueous solution (pH 0.9) containing Tm (III) and Lu (III) is provided as the supply liquid. The discharge aqueous phase tank is empty. The aqueous phase (supply aqueous solution) of the supply aqueous phase tank is supplied to the forward extraction tower, processed, and then discharged to the discharge aqueous phase tank. The aqueous phase is circulated independently only in the forward extraction tower. On the other hand, the aqueous phase of the scrubbing tower and the backward extraction tower is circulated independently in each tower without passing through the aqueous phase tank.

Each of the supply liquid (aqueous phase circulated into the forward extraction container), the scrubbing liquid (aqueous phase circulated in the scrubbing container), and the backward extraction liquid (aqueous phase circulated in the backward extraction container) to be processed was sent at a flow rate of 20 mL/min. The nitric acid solution (blank liquid) having the same pH as the supply liquid is provided in the aqueous phase of each of the main extraction tower and the scrubbing tower. On the other hand, the organic phase circulating across the forward extraction container, the scrubbing container and the backward extraction container was sent at a flow rate of 40 mL/min.

Figure 19:
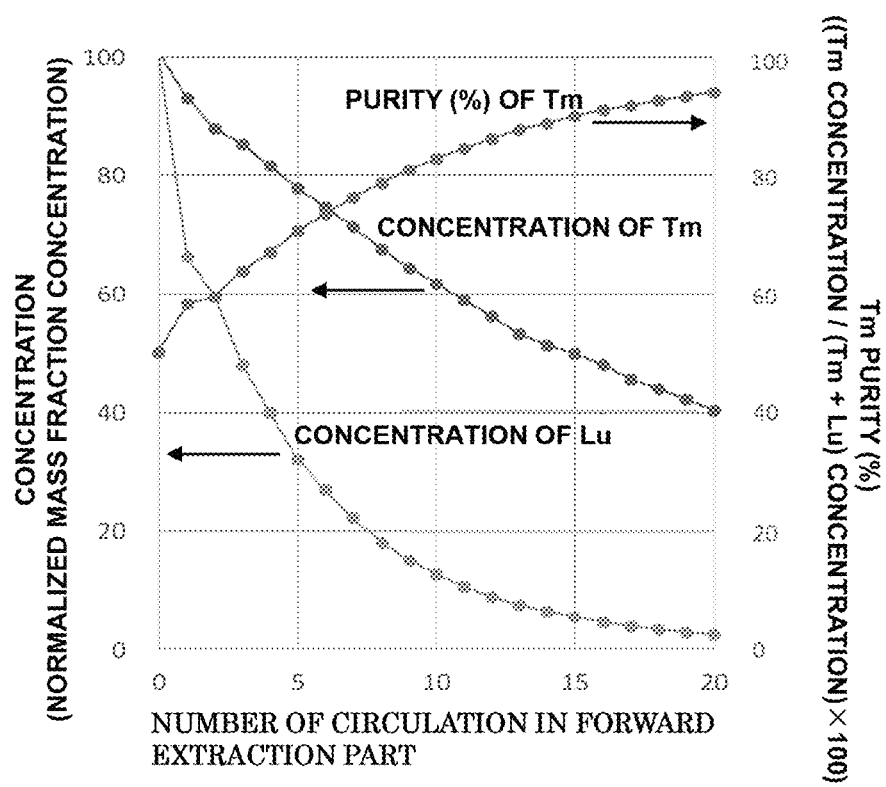
FIG. 19 is a graph showing the relationship between the number of circulations of the aqueous phase in the forward extraction part and the Tm, Lu concentration and Tm purity when the system has one scrubbing tower.

FIG. 19 shows the result of Tm (III) and Lu (III) extracted and separated from the nitric acid solution of pH 0.9 by using the organic solution in which PC-88A is dissolved in ShellSol D70 at a concentration of 0.01 M. The system of the emulsion flow apparatus shown in FIG. 15D is used to extract and separate them. The horizontal axis indicates the number of independent circulations of the aqueous phase in the forward extraction part 100 (forward extraction tower and the aqueous phase tank attached to the forward extraction tower), and is referred to as the number of circulations in FIG. 19. In the case of the present embodiment in which an external supply aqueous phase tank and an discharge aqueous phase tank are installed, at the time when the entire amount of the aqueous phase in the supply aqueous phase tank is processed and emptied, and the discharge aqueous phase tank is filled, the number of independent circulation in a single container is counted as one. The supply side and the discharge side are switched every time one cycle is completed. The number of the cycle repeated is the number of circulation. The left side of the vertical axis shows the concentrations of Tm (III) and Lu (III) in the aqueous phase in the forward extraction tower, and the mass fraction concentrations (wt %, ppm, etc.) standardized with the initial concentration of each being 100. Therefore, when the number of circulations is 0, both the Tm (III) concentration and the Lu (III) concentration are set to 100. The right side of the vertical axis indicates the purity (%) of Tm (III) in the aqueous phase in the forward extraction tower. The aqueous phase on the discharge side was sampled every circulation, and the concentration of each element was measured by an inductively coupled plasma mass spectrometer (ICP-MS).

When the number of circulations is 20, the purity of Tm (III) in the aqueous phase of the forward extraction tower reaches 95%, and the recovery rate of Tm (III) at that time (remaining rate in the aqueous phase of the forward extraction tower) is 40%. Lu (III), which is the element that is more likely to be distributed into the organic phase, hardly remained in the aqueous phase of the forward extraction part 100 (forward extraction tower and the aqueous phase tank attached to the forward extraction tower). At the same time, in the aqueous phase of the scrubbing tower, Tm (III) with the purity of 90% is recovered at a recovery rate of 18%, and when added to 40% of the recovery in the forward extraction tower, the recovery rate of high purity Tm (III) was 58%. On the other hand, in the backward extraction tower, Lu (III) having the purity of 72% was recovered at a recovery rate of 92%.

The separation coefficient between Tm (III) and Lu (III) is 6.1. Usually, about 20 towers (20 stages) is required in total of the forward extraction tower, the scrubbing tower and the backward extraction tower in order to purify Tm (III) to about 95%. But according to the multistage by synchronous liquid circulation shown in this example, separation performance equivalent to 20 towers was able to be realized with only 3 towers.

When the supply liquid is sent at the same flow rate, the length (total passage length when passing repeatedly) of the flow path through which the supply liquid passes does not differ between the conventional multistage by number of containers and the multistage by synchronous liquid circulation. Therefore, the time required for processing (process speed) was comparable.

Figure 20:
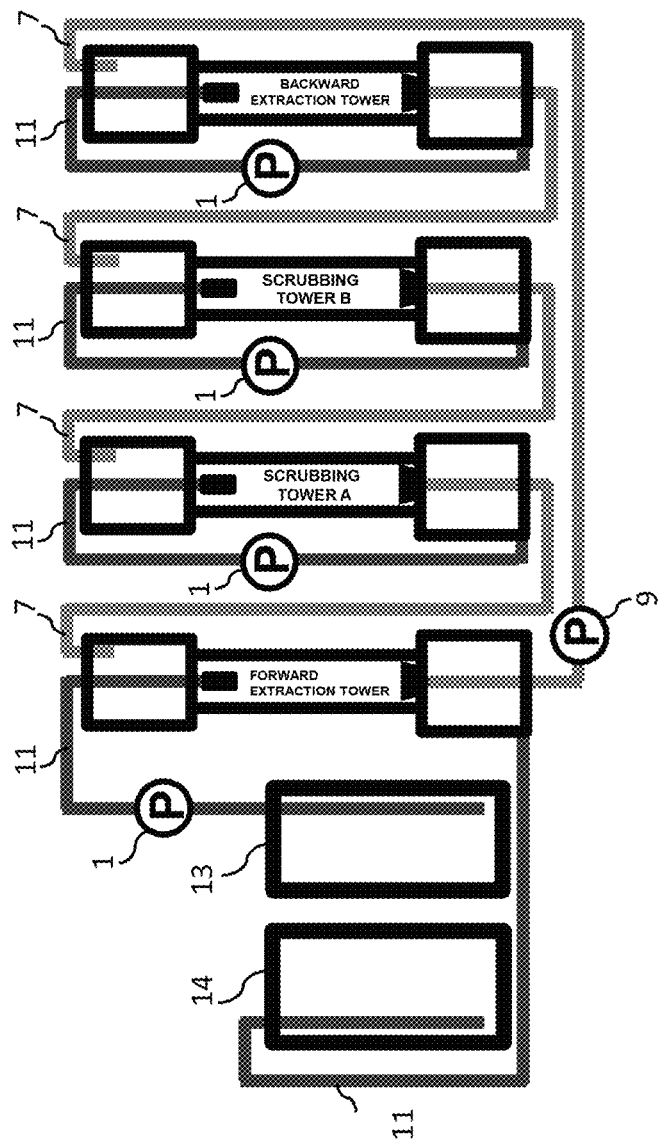
FIG. 20 is a schematic diagram showing an example of the system in which two scrubbing towers used in the experiment of Embodiment 1 are installed.

On the other hand, in the system in which each of the forward extraction tower, the scrubbing tower, and the backward extraction tower is composed of one tower, the purity of the element on the remaining side of the aqueous phase (the side that easily remains in the aqueous phase) was improved by increasing the number of circulations, but the recovery was deteriorated. Therefore, there is a problem that the purity of the element on the organic phase moving side (the side that easily moves to the organic phase) is low. Therefore, a system provided with two scrubbing towers was studied and compared with the case where one scrubbing tower was used. FIG. 20 shows a system in which two scrubbing towers used in the experiment are installed. As in the case of the single scrubbing tower described above, this is an emulsion flow system comprising a closed container, and the supply aqueous tank and the discharge aqueous tank are installed individually as in FIG. 15D. The pH of the aqueous phase of the forward extraction part 100 and the pH of the aqueous phases of the scrubbing towers A and B were all set to the same value.

Figure 21:
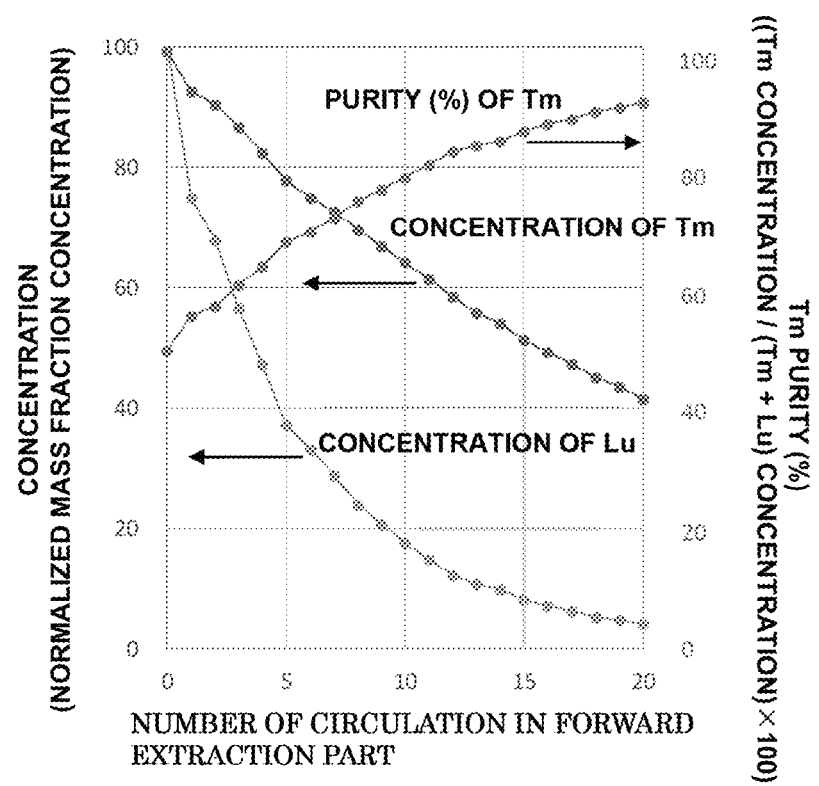
FIG. 21 is a graph showing the relationship between the number of circulation of the aqueous phase in the forward extraction part and the Tm, Lu concentration and Tm purity when the system has two scrubbing towers.

FIG. 21 shows the experimental results when two scrubbing towers were used. As can be seen from the comparison between FIG. 19 and FIG. 21, the concentration of Tm (III) (the recovery rate of Tm (III)) in the aqueous phase of the forward extraction tower 100 and the concentration of Lu (III) (the residual ratio of Lu (III)) and the purity of Tm (III) showed almost no difference between the one scrubbing tower and the two scrubbing towers. In other words, Tm (III) on the remaining side of the aqueous phase (the side that is likely to remain in the aqueous phase) is recovered with the purity of 95% in the aqueous phase of the forward extraction part 100, regardless of the number of scrubbing towers. The element Lu (III) on the organic phase moving side (the side that easily moves to the organic phase) hardly remained in the aqueous phase of the forward extraction part 100 in any case.

On the other hand, as the results of measuring the concentration of each element in the aqueous phases of the scrubbing tower and the backward extraction tower after finishing the circulation of the aqueous phase 20 times in the forward extraction part 100, it was found that the recovery rate of Tm (III) was increased and the purity of Lu (III) is improved as a whole by increasing the scrubbing tower to two towers.

Specifically, when the number of scrubbing towers is one, 18% of Tm (III) was recovered with the purity of 90% in the aqueous phase of the scrubbing tower, and 91% of Lu(III) was recovered with the purity of 72% in the aqueous phase of the backward extraction tower. When two scrubbing towers are used, 16% of Tm (III) is recovered with the purity of 89% in the aqueous phase of the scrubbing tower A, and 13% of Tm (III) was recovered with the purity of 86% in the aqueous phase of the scrubbing tower B. In the aqueous phase of the backward extraction tower, 87% of Lu (III) was recovered with the purity of 78%. That is, by changing the scrubbing tower from one to two, the overall recovery of Tm (III) was increased from 58% (40% for forward extraction and 18% for scrubbing) to 69% (40% for forward extraction, 16% for clean A, and 13% for clean B) while maintaining the purity of the aqueous phase of the forward extraction part 100 at 95%, and the purity of Lu (III) recovered in the aqueous phase of the backward extraction tower was improved from 72% to 78%. By further increasing the number of scrubbing towers, the overall recovery of Tm (III) and the purity of Lu (III) were further improved.

If it is desired to separate and recover the two elements to be separated with the highest possible purity and the highest possible recovery rate without waste, for example, it is necessary to treat again the aqueous phase of the scrubbing tower in which the element (Tm (III) in this embodiment) on the remaining side of the aqueous phase is recovered with a lower purity than the forward extraction tower. At this time, it is preferable that the aqueous phase can be introduced into the same multistage by synchronous liquid circulation system again without adjusting the pH (without adding acid or base). Since the pH of the forward extraction part 100 and the scrubbing part 200 are the same in the multistage system by synchronous liquid circulation shown in the present embodiment, the same processing is performed again on the aqueous phase of the scrubbing part 200 without adjusting the pH (ie. the aqueous phase of the scrubbing part 200 can be directly introduced as the supply liquid).

On the other hand, if the element (Tm (III) in this embodiment) on the remaining aqueous phase recovered in the aqueous phase (backward extraction liquid) of the backward extraction tower is to be separated and recovered again by the same processing, it is necessary to add a large amount of base and adjust the pH to the same pH as the aqueous phase of the forward extraction part 100 (the same pH as the supply liquid) in order to neutralize the high concentration of acid contained in the backward extraction liquid. From the viewpoint of eliminating waste of such chemicals (bases, etc.) and work (pH adjustment work by neutralization), it is preferable to make the ratio of the element on the aqueous phase remaining side recovered in the aqueous phase (backward extraction liquid) of the backward extraction tower as small as possible.

Actually, when one scrubbing tower was used, Tm (III) sent to the aqueous phase of the backward extraction tower was 36%. But when the two scrubbing towers are used, it was reduced to 25%. The transfer rate (loss rate) of Tm (III) into the backward extraction tower aqueous phase is further decreased by further increasing the number of scrubbing tower.

In addition, when it is desired to further increase the scrubbing efficiency (in this example, when it is desired to increase the purity of Lu (III) which is more easily extracted into the organic phase) by the same system and the same liquid circulation operation, it is not always optimal to make the pH of the forward extraction part 100 and the scrubbing part 200 the same value. For example, when an acidic extractant such as PC-88A (acid-dissociation type extractant) is used, the higher scrubbing efficiency can be obtained by making the pH of the scrubbing part 200 smaller than that of the forward extraction part 100.

Embodiment 2

Separation of Erbium Er (III) and Ytterbium Yb (III)

Also for the extraction and separation of Erbium Er (III) with atomic number 68 and Ytterbium Yb (III) with atomic number 70, which are also heavy lanthanide series rare earth elements, extraction and separation experiments were performed in connection with the one scrubbing tower and the two scrubbing towers. These elements are also difficult to separate due to their close atomic numbers (68 and 70) and very similar chemical properties. In addition, the conditions such as the used extractant and its concentration, the dilution solvent, the pH of the supply liquid, and the apparatus used in the multistage by synchronous liquid circulation, the conditions of the aqueous phase in each tower, the flow rates of the aqueous phase and the organic phase during the experiment are the same as the experiment of the extraction and separation experiment in Embodiment 1.

A batch experiment was also performed on Er (III) and Yb (III), in which these elements was extracted and separated from the aqueous nitric acid solution at pH 0.9 to ShellSol D70 using PC-88A (0.01 M). Under these conditions, the distribution ratio of Yb (III) was 0.265, the distribution ratio of Er (III) was 0.022, and the separation coefficient of Yb (III) to Er (III) was 12. The separation coefficient (=12) is a value obtained by dividing the distribution ratio of Yb (III) by the distribution ratio of Er (III). Further, by using 1 M aqueous nitric acid solution, the total amount of Yb (III) and Er (III) contained in the organic phase (0.01 M PC-88A/ShellSol D70) could be back-extracted. Here, the aqueous phase in the forward extraction and the scrubbing was nitric acid aqueous solution of pH 0.9, and the aqueous phase in the backward extraction was 1M aqueous nitric acid solution.

Figure 22:
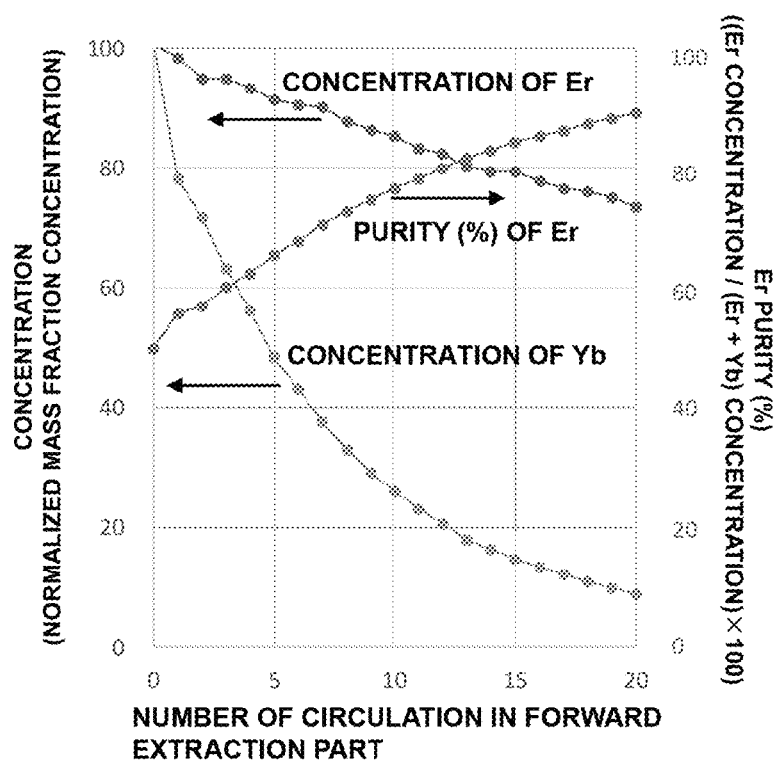
FIG. 22 is a graph showing the relationship between the number of circulations of the aqueous phase in the forward extraction part and the Er, Yb concentration and Er purity when the system has one scrubbing tower.
Figure 23:
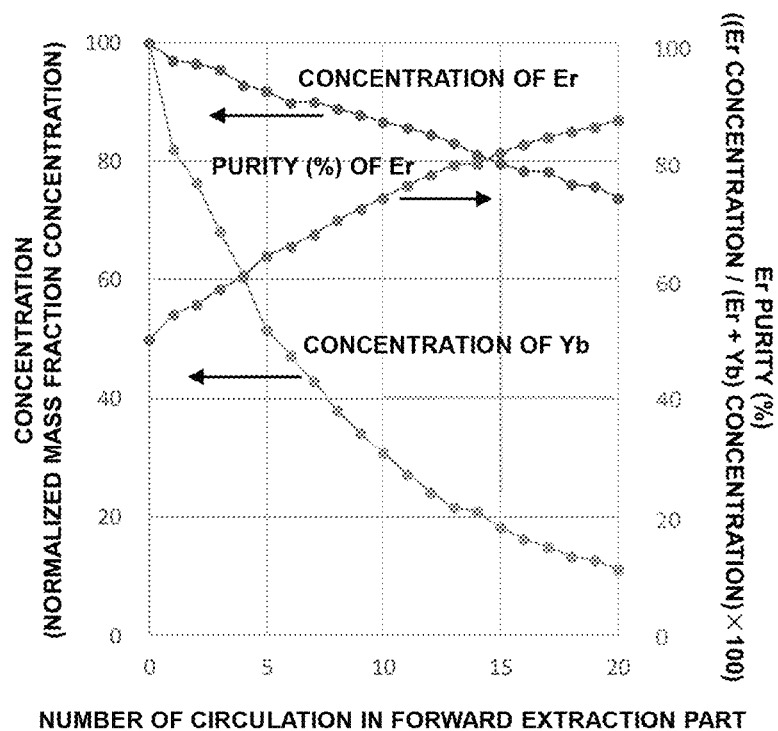
FIG. 23 is a graph showing the relationship between the number of circulations of the aqueous phase in the forward extraction part and the Er, Yb concentration and Er purity when the system has two scrubbing towers.

FIG. 22 and FIG. 23 show the concentrations of two elements (Er, Yb) in the aqueous phase of the forward extraction part 100 and the purity of the element (Er) on the remaining side of the aqueous phase. FIG. 22 shows the result obtained in case of the use of the one scrubbing tower and FIG. 23 shows that of the two scrubbing towers. As shown in these figures, the concentration of Er (III) (recovery rate of Er (III)), the concentration of Yb (III) (residual rate of Yb (III)) and the purity of Er (III) showed almost no difference between the one scrubbing tower and the two scrubbing towers. That is, as for Er (III) on the remaining side of the aqueous phase, 74% of the whole was recovered with the purity of 89% in the aqueous phase of the forward extraction unit 100 by the number of circulations of 20 times, regardless of the difference in the number of scrubbing towers. In each case, only about 10% of Yb (III), which is an element that is easily distributed to the organic phase, remained in the aqueous phase of the forward extraction part 100.

When the scrubbing tower was a single tower, after the circulation of the aqueous phase in the forward extraction part 100 was completed 20 times, 13% of Er (III) was recovered with the purity of 67% in the aqueous phase of the scrubbing tower, and 80% of Yb (III) was recovered with the purity of 88% in the aqueous phase of the backward extraction tower. On the other hand, when there are two scrubbing towers, 12% of Er (III) is recovered with the purity of 68% in the aqueous phase of scrubbing tower A, and 7% of Er (III) is recovered with the purity of 53% in the aqueous phase of scrubbing tower B. And 72% of Yb (III) was recovered with the purity of 94% in the aqueous phase of the backward extraction tower. In other words, by changing the scrubbing tower from one to two, the recovery rate of Er (III) was improved from 87% (the total of 74% for the forward extraction and 13% for the scrubbing) to 93% (74% for the forward extraction, 12% for the scrubbing A and 7% for the scrubbing B) in total while maintaining 89% of the purity in the aqueous phase of the forward extraction part 100. Further, the purity of Yb (III) recovered in the aqueous phase of the backward extraction tower was improved from 88% to 94%.

In addition, the loss of the element (Er) on the remaining side of the aqueous phase to the aqueous phase (backward extraction liquid) in the backward extraction tower is 11% in the case of one scrubbing tower, and 5% in the case of two scrubbing towers. Namely, the loss was reduced to less than half by the addition of a scrubbing tower.

Embodiment 3

Separation of Holmium Ho (III) and Lutetium Lu (III)

As the mutual separation between heavy rare earth elements, a case where the separation coefficient is relatively large was also examined. With respect to the extraction and separation of holmium Ho (III) having an atomic number of 67 and lutetium Lu (III) having an atomic number of 71, an extraction and separation experiment was performed on the use of the one scrubbing tower and that of the two scrubbing towers. These elements are somewhat apart in atomic number (67 and 71) and thus are not very difficult to separate. In addition, the conditions such as the extractant used and its concentration, the dilution solvent, the pH of the supply liquid, etc., the apparatus used as the multistage by synchronous liquid circulation, the conditions of the aqueous phase in each tower, and the flow rates of the aqueous phase, and the organic phase during the experiment were the same as the experiment of the extraction and separation in Embodiment 1 and Embodiment 2.

A batch experiment was also performed on Ho(III) and Lu(III), in which these elements was extracted and separated from the aqueous nitric acid solution at pH 0.9 to ShellSol D70 using PC-88A (0.01 M). Under these conditions, the distribution ratio of Lu (III) was 0.475, the distribution ratio of Ho (III) was 0.0084, and the separation coefficient of Lu (III) relative to Ho (III) was 57. The separation coefficient (=57) is a value obtained by dividing the distribution ratio of Lu (III) by the distribution ratio of Ho (III). In addition, by using 1 M aqueous nitric acid solution, the total amount of Lu (III) and Ho (III) contained in the organic phase (0.01 M PC-88A/ShellSol D70) could be back extracted. Here, the aqueous phase in the forward extraction and the scrubbing was the nitric acid aqueous solution of pH 0.9, and the aqueous phase in the backward extraction was 1M aqueous nitric acid solution.

Figure 24:
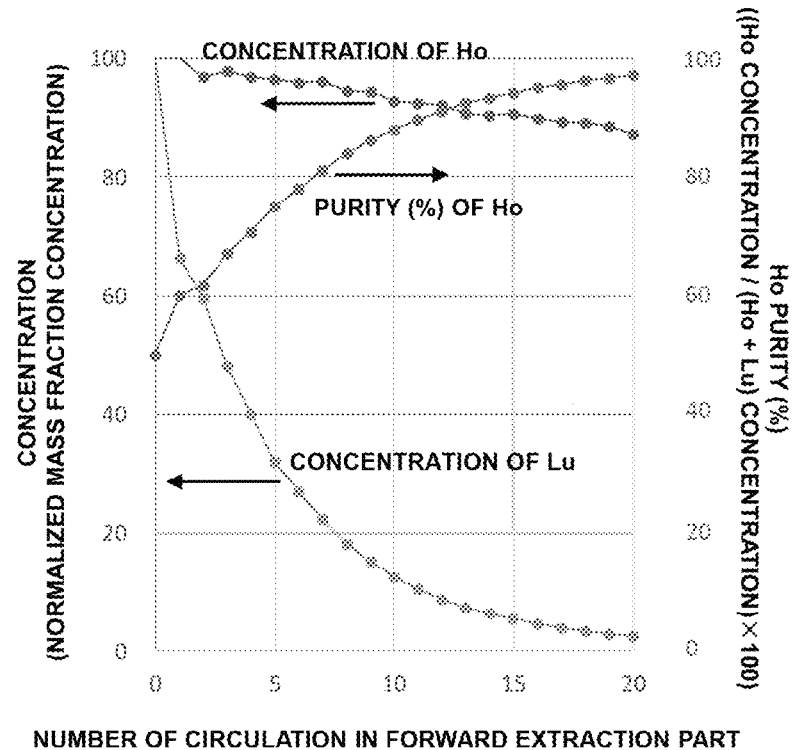
FIG. 24 is a graph showing the relationship between the number of circulations of the aqueous phase in the forward extraction part and the Ho, Lu concentration and Ho purity when the system has one scrubbing tower.
Figure 25:
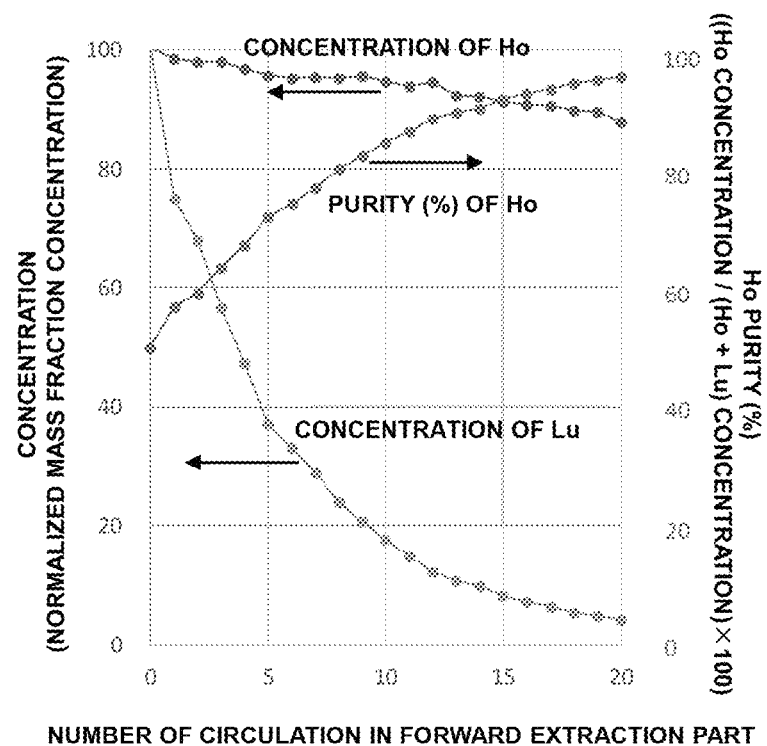
FIG. 25 is a graph showing the relationship between the number of circulations of the aqueous phase in the forward extraction part and the concentrations of Ho, Lu and Ho purity when the system has two scrubbing towers.

FIG. 24 and FIG. 25 show the concentrations of two elements (Ho, Lu) in the aqueous phase of the forward extraction part 100 and the purity of the element (Ho) on the remaining side of the aqueous phase. FIG. 24 shows the result obtained in case of one scrubbing tower and FIG. 25 that of two scrubbing towers. As shown in these figures, the concentration of Ho (III) (recovery rate of Ho (III)), the concentration of Lu (III) (residual rate of Lu (III)) and the purity of Ho (III) showed almost no difference between the one scrubbing tower and the two scrubbing towers. That is, as for Ho (III) on the remaining side of the aqueous phase, 87% of the whole was recovered with the purity of 97% in the aqueous phase of the forward extraction unit 100 by the number of circulations of 20 times, regardless of the difference in the number of scrubbing towers. In each case, only about 10% of Lu (III), which is an element that is easily distributed to the organic phase, remained in the aqueous phase of the forward extraction part 100.

When the scrubbing tower was a single tower, after the circulation of the aqueous phase in the forward extraction part 100 was completed 20 times, 7% of Ho (III) was recovered with the purity of 77% in the aqueous phase of the scrubbing tower, and 91% of Lu (III) was recovered with the purity of 96% in the aqueous phase of the backward extraction tower. On the other hand, when there are two scrubbing towers, 7% of Ho (III) is recovered with the purity of 74% in the aqueous phase of scrubbing tower A, and 3% of Ho (III) is recovered with the purity of 54% in the aqueous phase of scrubbing tower B. And 87% of Lu (III) was recovered with the purity of 99% in the aqueous phase of the backward extraction tower. In other words, by changing the scrubbing tower from one to two, the recovery rate of Er (III) was improved from 94% (the total of 87% for forward extraction and 7% for scrubbing) to 97% (87% for forward extraction, 7% for clean A and 3% for clean B) in total while maintaining 97% of the purity in the aqueous phase of the forward extraction part 100. Further, the purity of Lu (III) recovered in the aqueous phase of the backward extraction tower was improved from 96% to 99%.

In addition, the transfer rate (loss rate) of the element (Ho) on the remaining side of the aqueous phase to the aqueous phase (backward extraction liquid) in the backward extraction tower is 4% in the case of one scrubbing tower, and 1.3% in the case of two scrubbing towers. Namely, the transfer rate was reduced to one third by the addition of the scrubbing tower.

Embodiment 4

Effect of circulation number of aqueous phase in forward extraction part

In Embodiments 1 to 3, the effect of the number of circulations of the aqueous phase of the forward extraction part 100 (the forward extraction tower and the aqueous phase tank attached to the tower) on the extraction and separation of Tm and Lu, Er and Yb, and Ho and Lu was explained. Not only in these embodiments, but it was also found that a similar effect is exerted on any arbitrary combination of the 14 lanthanoid elements (all lanthanoid elements except radioactive Pm). Specifically, using the standard aqueous solution (nitric acid aqueous solution) containing 14 lanthanoid elements, the experiments similar to the method described in Embodiments 1 to 3 was performed. In these experiments, the discharge side aqueous phase was collected at each circulation, and the concentrations of all lanthanoid elements (14 elements) therein were measured.

Based on the obtained experimental results, two lanthanoid elements were arbitrarily selected, and the relationship between the number of circulations and the separation/recovery of the aqueous phase in the forward extraction part 100 was examined for 20 combinations. For convenience, hereinafter, the selected lanthanoid elements (denoted by the symbol Ln) will be denoted as Ln1 and Ln2, and the one with the larger distribution ratio will be referred to as Ln2 (the distribution ratio is Ln1<Ln2).

The following was found by increasing the number of circulations.
1) In the forward extraction tower, the purity of Ln1 is improved while the recovery rate of Ln1 is reduced.
2) In the scrubbing tower, both the purity of Ln1 and the recovery rate of Ln1 are improved.
3) In the backward extraction tower, the recovery rate of Ln2 can be increased, but the purity of Ln2 decreases.
Even if the number of scrubbing towers and/or backward extraction towers were increased, the tendency in each of the towers (the scrubbing tower and the backward extraction tower) shown in the above item 2 and item 3 was the same. For example, when two scrubbing towers (scrubbing tower A and scrubbing tower B) are installed, both the purity of Ln1 and the recovery rate of Ln1 in both of the scrubbing towers A and B were improved by increasing the number of circulations.

Embodiment 5

Effect of Number of Scrubbing Towers

Effects of the number of scrubbing towers were examined for 20 combinations of arbitrary lanthanoid elements in the same manner as in Embodiment 4. In Embodiments 1 to 3, effects of increasing the number of scrubbing towers on the extraction and separation of Tm and Lu, Er and Yb, and Ho and Lu were described, but are not limited to these embodiments. The same effect was obtained for any arbitrary combination of the 14 lanthanoid elements. That is, the following was found by increasing the number of scrubbing towers.
1) The overall recovery of Ln1 is increased.
2) The purity of Ln2 in the backward extraction tower is improved.
3) The transfer rate (loss rate) of Ln1 to the back extract decreases.

Item 1 means that Ln1 can be recovered not only in the forward extraction tower but also in the scrubbing tower, so that the overall recovery rate of Ln1 increases. Note that, as shown in Example 4, the existence of the scrubbing tower is extremely important in that the greater the number of circulations, the better both the purity of Ln1 and the recovery rate of Ln1.

As a result of the detailed study of the changes in element concentrations in the scrubbing towers, it was seen that there is a common point in changes in the concentration and purity of each element in the aqueous phase of any scrubbing tower regardless of the number of installed scrubbing towers. That is, by increasing the number of circulations, both the purity and the recovery rate were always unilaterally improved with respect to Ln1, but there was the number of circulations at which the concentration peaked in Ln2, and the concentration of Ln2 was decreased unilaterally when beyond the peak. In response to this, the purity of Ln1 sharply increased around the time when the Ln2 concentration exceeded the peak.

In other words, the advantage of the scrubbing tower that both the purity and the recovery rate of Ln1 are improved by increasing the number of circulations is a phenomenon common to all the scrubbing towers. The effect of increasing the number of washing towers becomes more pronounced as the number of circulations increases. In particular, the sharp improvement in the purity of Ln1 resulting from the number of circulations at which the concentration of Ln2 exceeds the peak is notable.

Item 2 means that the purity of Ln2 in the backward extraction tower can be raised by inserting the scrubbing tower. More precisely, it is possible to improve the decrease in the purity of Ln2 accompanying an increase in the number of circulations when recovering the entire amount of Ln2. As shown in Embodiment 4, when the number of circulations is increased, the recovery rate of Ln2 in the backward extraction tower can be increased, but its purity decreases. However, it was found that the decrease in Ln2 purity at that time could be narrowed by increasing the number of scrubbing towers. The fact that the decrease in the Ln2 purity can be reduced means that the transfer (loss) of Ln1 to the backward extraction liquid as described in item 3 can be reduced.

As described above, it was found that it is possible to achieve both high refining and high recovery for both Ln1 and Ln2 by providing the scrubbing tower, and the purity and the recovery of both elements can be freely improved by increasing the number of scrubbing towers. In other words, the number of scrubbing towers can be set according to the target purity and recovery rate.

Embodiment 6

Influence of the magnitude of the distribution ratio of the individual substances to be separated.

In the multistage by synchronous liquid circulation, as in the conventional multistage by number of containers, the number of stages (the number of circulations in the multistage by synchronous liquid circulation) required to obtain the target separation accuracy (degree of purity and recovery rate) is only the separation coefficient between the substances to be separated. However, it was also found that it depends on the value of the distribution ratio of the substance to be separated. In industrial applications, it is important to understand how to set the value of the distribution ratio in order to obtain the desired separation accuracy.

The point that the higher the separation coefficient, the higher the purity and the higher the recovery rate can be obtained with the same number of circulations is the same as that, for the same number of containers in the conventional multistage by number of containers, the higher the separation coefficient, the higher the purity and the higher the recovery rate. On the other hand, it was found that the effect of the value of the distribution ratio of each substance to be separated on the extraction and separation was not necessarily the same as that of the conventional multistage by number of containers.

Even if the extraction conditions such as the concentration of the extractant and the pH of the aqueous phase are changed, the separation coefficient does not change in many cases, but the value of the distribution ratio of each substance itself changes greatly. Therefore, it is necessary to know in advance how large a distribution ratio should be set to achieve a desired separation accuracy. Therefore, the present inventors have intensively studied the influence of the magnitude of the distribution ratio of each substance to be separated.

As a result, the following was found.
1) When it is desired to achieve both high purity and high recovery, the value of the distribution ratio is preferably smaller (the recovery can be higher if the purity is the same).
2) On the other hand, the smaller the value of the distribution ratio, the more the number of circulations is required to obtain the desired purity.

Therefore, when it is desired to obtain a high-purity product in a short time (with a small number of circulations) even if the recovery rate may be sacrificed, the value of the distribution ratio may be set to a relatively large value. Conversely, when it is desired to obtain a high-purity product with a high recovery rate without wasting even if a certain amount of time is spent, the value of the distribution ratio may be set smaller.

As described above, when it is desired to recover the target substance with high purity without waste, it is preferable to set the distribution ratio to a smaller value. This is not only a feature of the multistage by synchronous liquid circulation, but also a difference from conventional multistage by number of containers.

In the case of acidic extractants (Extractant in which acid anion generated by acid dissociation coordinates with metal ion) which are the most widely used industrially, the extraction proceeds by ion exchange between metal ions (mostly cations) and hydrogen ions. So the concentration of hydrogen ions distributed to the aqueous phase by ion exchange also increases when the concentration of metal ions in the aqueous solution to be processed is high. In other words, the higher the metal concentration in the organic phase, the higher the hydrogen ion concentration in the aqueous phase. Therefore, the pH of the aqueous phase fluctuates greatly before and after the extraction of the metal ions (the pH drops significantly). The greater the set pH, the more such pH fluctuations in the aqueous phase will be pronounced. On the other hand, an acidic extractant can obtain a larger distribution ratio at a higher pH, and therefore, the relatively high pH is often selected as an extraction condition while coping with the above-described pH fluctuation. That is, it is necessary to take measures such as frequently adding a base for pH adjustment or using the buffer solution to alleviate pH fluctuation. Since the condition with a small distribution ratio is preferable in the multistage by synchronous liquid circulation of the present invention, a low pH (high hydrogen ion concentration) can be selected as the extraction condition. Under low pH conditions, pH fluctuations before and after extraction of metal ions are small, so that measures such as pH adjustment are often unnecessary.

The fact that the condition with a small distribution ratio is preferable means that the extractant having a low extraction ability can be sufficiently used if it has a large separation coefficient. Therefore, a high use value is produced even for the extractant that has not been noticed until now because of its low extraction ability.

Embodiment 7

Difference between when the discharge aqueous phase and the supply aqueous phase are mixed and when not mixed.

FIG. 14A to FIG. 14N, FIG. 15A to FIG. 15N, and FIG. 16A to FIG. 16N show three types of external aqueous phase tanks. For the various types of installed systems, experiments were conducted by installing an emulsion flow apparatus as the forward extraction container, the scrubbing container, and the backward extraction container.

FIG. 14A to FIG. 14N show an example in which an aqueous phase tank in which the discharge aqueous phase and the supply aqueous phase are mixed is installed. FIG. 15A to FIG. 15N and FIG. 16A to FIG. 16N show examples in which the aqueous phase tank in which the discharge aqueous phase and the supply aqueous phase are not mixed is installed. The aqueous phase may be circulated independently in a single container without installing the aqueous phase tank, or may not be circulated. In this regard, when using an emulsion flow container having an aqueous phase separating section, the independent circulation of the aqueous phase in a single container was performed regardless of the presence or absence of the external aqueous phase tank so that the aqueous phase in the aqueous phase separating section may stay and may not occur insufficient contact with the organic phase.

When an aqueous phase tank is installed in the forward extraction part 100, the structure in which the discharge aqueous phase and the supply aqueous phase are not mixed exhibited the effect of the multistage by synchronous liquid circulation more remarkably. Specifically, about between the systems shown in FIG. 14A, FIG. 15A and FIG. 16A, between FIG. 14B, FIG. 15B and FIG. 16B, between FIG. 14C, FIG. 15C and FIG. 16C, between FIG. 14D, FIG. 15D and FIG. 16D, between FIG. 14I, FIG. 15I and FIG. 16I, between FIG. 14J, FIG. 15J and FIG. 16J, between FIG. 14K, FIG. 15K and FIG. 16K, between FIG. 14L, FIG. 15L and FIG. 16L, and FIG. 14N, FIG. 15N and FIG. 16N, there was a difference between the system where the supply aqueous phase and the discharge aqueous phase was mixed (the systems shown in FIG. 14A to FIG. 14N) and the systems where not mixed (the systems shown in FIG. 15A to FIG. 15N and the systems shown in FIG. 16A to FIG. 16N). That is, in the system shown in FIG. 14A to FIG. 14N in which the supply aqueous phase and the discharge aqueous phase are mixed, the number of circulations (circulation times) of the aqueous phase of the forward extraction part 100 is required more. On the other hand, when the discharge aqueous phase and the supply aqueous phase were not mixed, there was no difference between two individual type tanks (the system shown in FIG. 15A to FIG. 15N) and one partition type tank (the system shown in FIG. 16A to FIG. 16N).

On the other hand, when the aqueous phase tank is not installed in the forward extraction part 100, but the aqueous phase tank is installed in the scrubbing part 200 and/or the backward extraction part 300, there was no significant difference whether the discharge aqueous phase and the supply aqueous phase are mixed or not. Specifically, no significant difference was found between the systems shown in FIG. 14E, FIG. 15E and FIG. 16E, between FIG. 14F, FIG. 15F and FIG. 16F, between FIG. 14G, FIG. 15G and FIG. 16G, between FIG. 14H, FIG. 15H and FIG. 16H, and between FIG. 14M, FIG. 15M and FIG. 16M.

Embodiment 8

Automatic switching between discharge side and supply side of an external aqueous phase tank by a solenoid valve.

The system that automatically switches the supply side and the discharge side alternately by a solenoid valve was able to operate properly, even if it is a separate type (two separate type tanks shown in FIG. 17) where the supply aqueous phase tank and the discharge aqueous phase tank are separated. And it was able to operate properly, even in the case of the partition type (one partition plate type tank shown in FIG. 18) in which the supply aqueous phase tank and the discharge aqueous phase tank is united. Although there is no significant difference in performance between the individual type and the partition type, the partition type had a slight advantage in the processing speed, because it can reduce the length of the flow path in the forward extraction part 100. On the other hand, the partition type aqueous phase tank is inevitably large in size. Therefore, when it is desired to use the floor area efficiently, the individual type tank which can flexibly arrange is superior to the partition type tank.

Comparative Example 1

Liquid Circulation System Only in One Tower (or Tank)

Figure 26B:
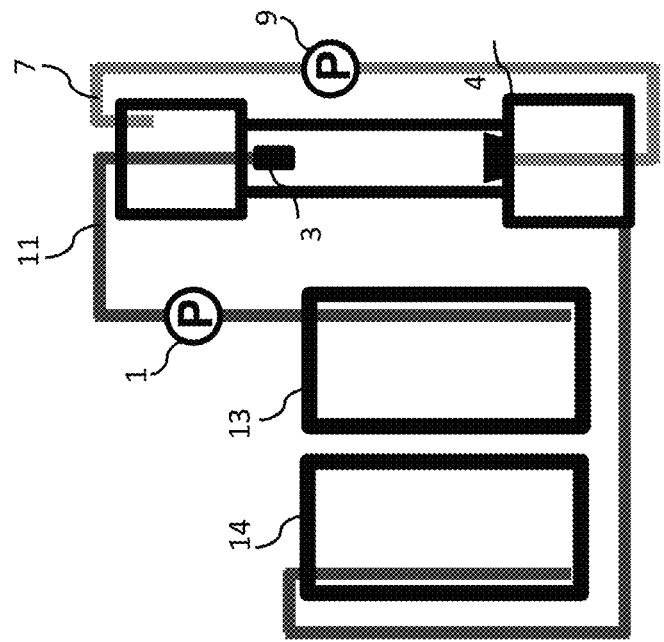
FIG. 26B is a schematic diagram showing the structure of the liquid circulation system using only one tower used in the experiment of Comparative Example 1 with an external aqueous phase tank.
Figure 26A:
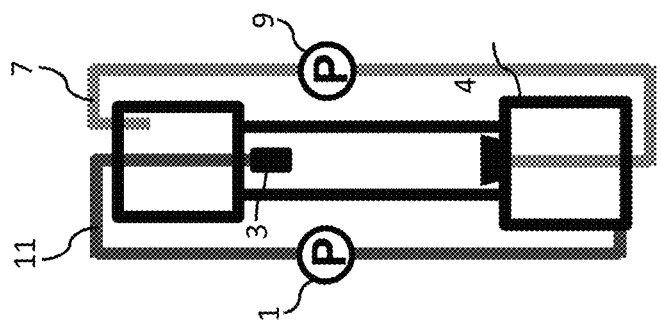
FIG. 26A is a schematic diagram showing a structure of the liquid circulation system using only one tower used in the experiment of Comparative Example 1 without an external aqueous phase tank.

As Comparative Example 1, the relationship between the distribution ratio of lanthanoid elements and the number of circulations when the aqueous phase and the organic phase are circulated independently in a single container (tower or tank) was studied for each of the forward extraction, the scrubbing, and the backward extraction. As a result of conducting an experiment using the system of the emulsion flow method shown in FIG. 26A and FIG. 26B, the effect of the multistage by synchronous liquid circulation did not appear in any of the forward extraction, the scrubbing and the backward extraction. The distribution ratio and the separation coefficient of the target substance finally coincided with the values at the time of the extraction equilibrium obtained by a batch experiment. The results were the same regardless of the presence or absence of an external aqueous phase tank.

Also, by increasing the number of circulations of the aqueous phase and/or the organic phase, the distribution ratio gradually increased or the separation coefficient increased. However, this phenomenon gradually approaches the extraction equilibrium by increasing the number of circulations, and actually did not exceed the value at the time of extraction equilibrium in the batch experiment. An apparatus that performs industrially a continuous extraction process often does not reach chemical equilibrium (extraction equilibrium) under normal operating conditions. Therefore, when the extraction speed of the substance to be separated is different, the separation coefficient may be apparently small. For example, in such a case, the value of the separation coefficient gradually increases as the aqueous phase and the organic phase are repeatedly circulated. For this reason, this is easily illusioned with the multistage effect by the liquid circulation (actually, the multistage effect does not exist).

Comparative Example 2

Figure 27B:
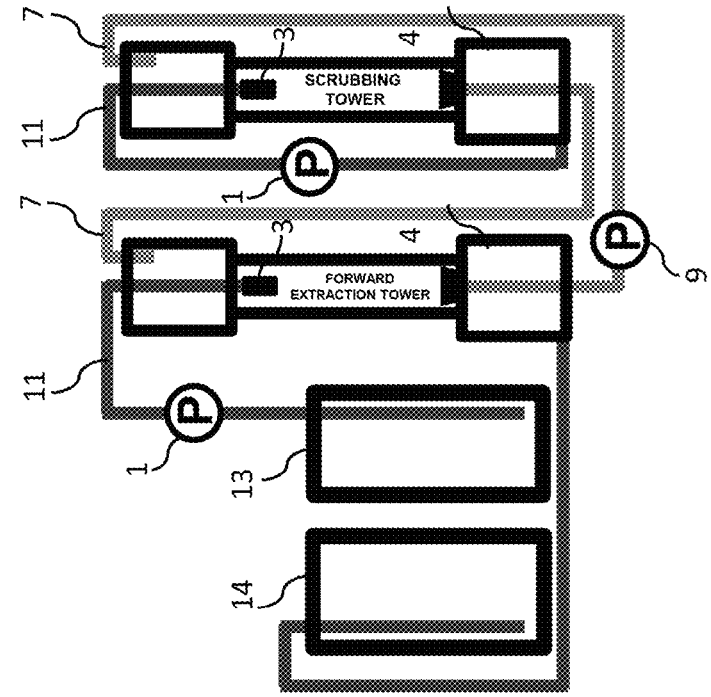
FIG. 27B is a schematic diagram showing the structure of an external aqueous phase tank in the liquid circulation system including the forward extraction part and the scrubbing part used in the experiment of Comparative Example 2.
Figure 27A:
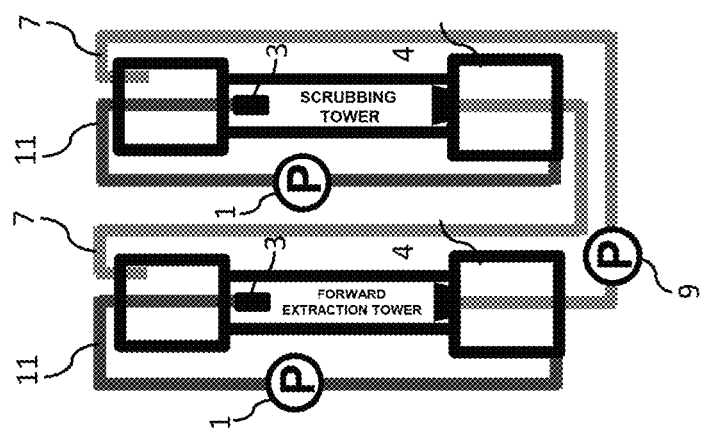
FIG. 27A is a schematic diagram showing the structure of the liquid circulation system including a forward extraction part and a scrubbing part used in the experiment of Comparative Example 2 without an external aqueous phase tank.

Liquid Circulation System Composed of a Forward Extraction Part and a Scrubbing Part As Comparative Example 2, the relationship between the distribution ratio of lanthanoid elements and the number of circulations was examined for a liquid circulation system including the forward extraction part 100 and the scrubbing part 200. As a result of the experiment conducted using the system of the emulsion flow method shown in FIG. 27A and FIG. 27B, the effect of the multistage by synchronous liquid circulation expressed in the system was limited. That is, even if the aqueous phase and the organic phase were repeatedly circulated, the separation between the lanthanoid elements was not significantly improved.

The cause is considered to be that the liquid circulation system does not have the backward extraction part 300. As a result of various studies on this matter, it was found that the effect of the multistage was the phenomenon first expressed significantly when the organic phase was reset to a state (more accurately, 70% or more of the elements that are most likely to remain in the organic phase among the elements to be extracted and separated) where most of the elements to be extracted and separated contained in the organic phase were removed, and its organic phase is introduced again into the forward extraction part 100. The results were the same regardless of the presence or absence of an external aqueous phase tank.

Comparative Example 3

Liquid Circulation System Composed of the Forward Extraction Part and the Backward Extraction Part As Comparative Example 3, the relationship between the distribution ratio of lanthanoid elements and the number of circulations was examined for a liquid circulation system including the forward extraction part 100 and the backward extraction part 300. As a result of an experiment conducted using the system of the emulsion flow method shown in FIG. 28A and FIG. 28B, the effect of the multistage by synchronous liquid circulation appeared in the liquid circulation system in which the organic phase can be reset. Specifically, in the aqueous phase of the forward extraction part 100, the change in the concentration of the two lanthanoid elements to be separated and the purity of the element (Ln1) on the remaining side of the aqueous phase with respect to the number of circulations was the same, regardless of the presence or absence of the scrubbing tower. Note that the effect of the multistage by synchronous liquid circulation was more remarkable when an external aqueous phase tank in which the supply side and the discharge side were separated was installed (the case of FIG. 28B). This point was the same regardless of the presence or absence of the scrubbing tower.

As shown in the graphs of FIG. 19, FIG. 21, FIG. 22, FIG. 23, FIG. 24, and FIG. 25 showing the experimental results from Embodiments 1 to 3, the change in the concentration and purity of the element in the aqueous phase of the forward extraction part 100 was almost no difference between the one scrubbing tower and the two scrubbing towers. This was the same even when there was no scrubbing tower (the number of scrubbing towers was 0). That is, it was possible to form the multistage system by synchronous liquid circulation only with the forward extraction part 100 and the backward extraction part 300 without providing the scrubbing part 200. However, it was also found that various problems described below occur when the scrubbing part 200 is not provided.

First, there is a problem that many of the elements (Ln1) on the remaining side of the aqueous phase move to the backward extraction liquid (loss). Increasing the number of circulations improved the purity of Ln1 in the aqueous phase of the forward extraction part 100, but decreased the recovery of Ln1. When only the forward extraction part 100 and the backward extraction part 300 are provided, all of Ln1 reduced from the aqueous phase of the forward extraction part 100 is transferred to the backward extraction part 300. That is, in order to simultaneously obtain a satisfactory purity and a recovery rate with respect to Ln1, further extraction and separation must be repeatedly performed to the backward extraction liquid. At that time, it is necessary to add the required amount of base, acid or salt to return from the condition of the backward extraction to the condition of the forward extraction, and then perform the same circulation processing, and it is necessary to repeat the process many times.

When returning from the condition of backward extraction to the condition of forward extraction, the agent to be added differs depending on the type of extractant. When the acidic extractant (the extractant in which acid anion generated by acid dissociation coordinates with metal ion) is used, that is, the aqueous solution containing a high concentration of an acid is used as the backward extraction liquid, it is necessary to neutralize the acid by adding a large amount of a base (eg. sodium hydroxide) so as to adopt to the condition of the forward extraction. When the molecular extractant (the extractant of the type that coordinates to metal ions as electrically neutral molecules) is used, that is, the pure water or the aqueous solution of a low-concentration acid or salt is used as the backward extraction liquid, a large amount of acid or salt must be added so as to increase the ionic strength up to the condition of the forward extraction. Moreover, since this operation is repeated many times until the required purity and the recovery are obtained, a large amount of base, acid or salt is consumed each time. Therefore, it is not practical because of the high cost involved in repeatedly supplying a large amount of medicine and the complexity of having to repeat many sets of circulation processing.

On the other hand, in the multistage by synchronous liquid circulation described in Embodiments 1 to 3, No base, acid, or salt addition is required by incorporating a required number of scrubbing towers in which the aqueous solution (blank liquid) having the same pH as the aqueous phase of the forward extraction tower is provided. In addition, as can be seen from the comparison between FIG. 1 and FIG. 2, when a sealed container is used in the emulsion flow method, the number of the organic phase pump remains one unchanged even if a scrubbing tower is newly added. That is, even if the scrubbing tower is incorporated, the cost does not increase significantly. Therefore, in practical use, the multistage by synchronous liquid circulation incorporating the scrubbing part 200 is overwhelmingly more advantageous than the multistage by synchronous liquid circulation composed only of the forward extraction part 100 and the backward extraction part 300.

In the present specification, claims, abstract, and drawings, unless otherwise specified, the aqueous phase is a heavy liquid phase, and the organic phase is a light liquid phase. In practice, the aqueous phase may be a light liquid phase and the organic phase may be a heavy liquid phase. In the four basic drawings showing the outline of the present invention, that is, in FIG. 3A, FIG. 7, FIG. 10, and FIG. 12, the aqueous phase is assumed to be a heavy liquid phase, and the organic phase is assumed to be a light liquid phase. The aqueous phase may be introduced from the top of the container and discharged from the bottom, and the organic phase may be introduced from below the container and discharged from above in these drawings, but the present invention is not limited to these embodiments. In terms of reducing the load of sending liquid using gravity and buoyancy, when the aqueous phase is a light liquid phase and the organic phase is a heavy liquid phase, it is preferred that the aqueous phase is introduced from the bottom of the container and discharged from the top and the organic phase is introduced from above the container and discharged from below. The heavy liquid phase is the relative expression with respect to the light liquid phase, and means that the specific gravity of the heavy liquid phase is larger than that of the light liquid phase.

In this producing method, the components to be separated and refined include not only components extracted in the organic phase of the forward extraction part 100 but also components remaining in the aqueous phase of the forward extraction part 100. In addition, the components that are cleaned away to the aqueous phase in the scrubbing part 200, the components that are left in the organic phase of the scrubbing part 200, the components that are returned to the aqueous phase in the backward extraction part 300, and the components that are left in the organic phase of in the backward extraction part 300, all are the objects to be separated and refined here. Therefore, although not shown, the separated and refined product is collected from each part.

The present invention relates to a method for producing a substance by liquid-liquid extraction/separation using a new system (mechanism) for obtaining effects equivalent to multistages by repeatedly performing liquid circulation without increasing the number of extraction containers (towers or tanks) Extraction and separation in a liquid-liquid system is a method for separating and refining substances such as metal ions, organic compounds, and biopolymers by using the difference in the distribution of substances between two immiscible liquid phases, and such a method is widely used in the industrial field.

When it is desired that the target components in the aqueous solution are extracted and separated to a high degree, multistage extraction that repeats the extraction part operation is indispensable. In general, a higher purity target component can be obtained by arranging as many containers (towers or tanks) as necessary for repeating the extraction part operation in each of the forward extraction part 100, the scrubbing part 200, and the backward extraction part 300. The higher the separation required or the more difficult the separation of the target components, the more containers (towers or tanks) must be installed. In the case of industrial liquid-liquid extraction/separation, multistage extraction exceeding 100 stages is required in some cases. For this reason, more than 100 containers (towers or tanks) must be arranged in that case.

In such a usual multistage, the apparatus becomes large and complicated for more accurate separation or more difficult separation. Therefore, the initial cost, the operation cost, and the maintenance cost all increase, and the operability is reduced. Further, since monitoring and complicated adjustment work are always required, labor costs are also increased. That is, the cost is greatly increased in many aspects. In addition, if the size of the apparatus is increased due to the increase in the number of stages, it may become impossible to install the apparatus due to a shortage of installation floor area.

If the producing method of the present invention is used, it becomes possible to produce a specific substance by a very small number of 3 to 6 containers, even for the separation and refining that required a total of 100 or more containers in the forward extraction part 100, the scrubbing part 200, and the backward extraction part 300. Therefore, it is possible to solve the above-mentioned various problems of cost increase and installation floor area, and it is considered that the industrial applicability of the liquid circulation type solvent extraction method such as an emulsion flow method is further expanded.

What is claimed is:

1. A method of producing a specific substance by extraction in a liquid-liquid system comprising the steps of:
performing a liquid-liquid extraction of the specific substance from an aqueous phase into an organic phase in a first container, and leaving a substance other than the specific substance in the aqueous phase;
circulating the organic phase in the first container to a second container, and scrubbing off the substance other than the specific substance, which is coextracted along with the specific substance to be extracted into the organic phase in said first container, into an aqueous phase of said second container;
circulating the organic phase from said second container to a third container, and back-extracting the specific substance contained in the organic phase into an aqueous phase of said third container; and
circulating the organic phase from said third container to said first container after back-extracting the specific substance into the aqueous phase of said third container;
circulating the aqueous phase of said first container through an aqueous phase re-circulation line provided from said first container back to said first container one or more times, and
circulating the organic phase from said first container across said second container and said third container to said first container again in synchronization with the circulation of the aqueous phase in said aqueous phase re-circulation line.

2. The method of producing the specific substance according to claim 1, comprising:
circulating aqueous phase in said second container and/or said third container in said second container and/or said third container through an aqueous phase re-circulation line provided from said second container and/or said third container back to said second container and/or said third container at the same time as the aqueous phase in said first container is circulated in said first container.

3. The method of producing the specific substance according to claim 1, comprising:
introducing the aqueous phase from the top of each of said first, second, or third container and discharging the aqueous phase from the bottom of each said first, second, or third container, and introducing the organic phase from the bottom of each said first, second, or third container and discharging the organic phase from the top of each of said first, second, or third container, wherein the aqueous phase is a heavy liquid phase having a specific gravity greater than that of a light liquid phase and wherein the organic phase is the light liquid phase; or
introducing the aqueous phase from the bottom of each said first, second, or third container and discharging the aqueous phase from the top of each said first, second, or third container,
and introducing the organic phase from the top of each said first, second, or third container and discharging the organic phase from the bottom of each said first, second, or third container, wherein the aqueous phase is the light liquid phase and wherein the organic phase is the heavy liquid phase.

4. A method of producing a specific substance by extraction in a liquid-liquid system comprising the steps of:
performing a liquid-liquid extraction of the specific substance from an aqueous phase into an organic phase in a first container, and leaving a substance other than the specific substance in the aqueous phase of said first container;
circulating the organic phase to a second container, and back-extracting the specific substance contained in the organic phase into an aqueous phase of said second container; and
circulating the organic phase of said second container to said first container after back-extracting the specific substance into the aqueous phase of said second container;
circulating the aqueous phase in said first container through an aqueous phase re-circulation line provided from said first container back to said first container one or more times, and
circulating the organic phase from said first container to said second container and then to said first container again in synchronization with the circulation of the aqueous phase in the aqueous phase re-circulation line.

5. The method of producing the specific substance according to claim 4, comprising:
circulating the aqueous phase in said second container through an aqueous phase re-circulation line provided from said second container back to said second container at the same time as the aqueous phase in said first container is circulated through the aqueous phase re-circulation line.

6. The method of producing the specific substance according to claim 4, comprising:
introducing the aqueous phase from the top of said first or second container and discharged from the bottom of said first or second container, and introducing the organic phase from the bottom of said first or second container and discharged from the top of said first or second container, wherein the aqueous phase is a heavy liquid phase having a specific gravity greater than that of a light liquid phase and wherein the organic phase is the light liquid phase; or introducing the aqueous phase from the bottom of said first or second container and discharged from the top of said first or second container, and introducing the organic phase from the top of said first or second container and discharged from the bottom of said first or second container, wherein the aqueous phase is the light liquid phase and wherein the organic phase is the heavy liquid phase.

7. An apparatus for producing a specific substance by extraction in a liquid-liquid system, which comprises:

a forward extraction part for extracting the specific substance from an aqueous phase into an organic phase;

a scrubbing part for scrubbing off a substance other than the specific substance, which is coextracted along with the specific substance to be extracted into the organic phase in said forward extraction part, and included in the organic phase supplied from said forward extraction part;

a back extraction part that back-extracts the specific substance present in the organic phase of said scrubbing part into the aqueous phase;

organic phase circulation lines provided between said forward extraction part and said scrubbing part, between said scrubbing part and said back extraction part, and between said back extraction part and said forward extraction part;

wherein said forward extraction part comprises an aqueous phase circulation line for circulating the aqueous phase of said forward extraction part, wherein each of said forward extraction part, said scrubbing part, and said back extraction part is operated synchronously based on the liquid circulation of the aqueous phase and the organic phase, wherein the aqueous phase of said forward extraction part is circulated only in said forward extraction part, and at the same time, the organic phase of said forward extraction part is circulated across said scrubbing part, said back extraction part, and returned to said forward extraction part again, and wherein the specific substance separated and refined is produced by performing repeatedly the independent circulation of the aqueous phase in said forward extraction part.

8. The apparatus for producing a specific substance by extraction in a liquid-liquid system according to claim 7, wherein each of said forward extraction part, said scrubbing part, and said back extraction part is comprised of a sealed container.

9. The apparatus for producing a specific substance by extraction in a liquid-liquid system according to claim 7, wherein at least one of said forward extraction part, said scrubbing part, and said back extraction part is comprised of a non-sealed container.

10. The apparatus for producing a specific substance by extraction in a liquid-liquid system according to claim 7, wherein said scrubbing part and/or said back extraction part is provided with an aqueous phase circulation line for circulating the aqueous phase in the respective part.

11. The apparatus for producing a specific substance by extraction in a liquid-liquid system according to claim 7, wherein said forward extraction part comprises one container, and said scrubbing part and said back extraction part each comprises one or more containers.

12. The apparatus for producing a specific substance by extraction in a liquid-liquid system according to claim 11, wherein the apparatus comprises a tank for storing the aqueous phase supplied to said forward extraction part in the first container and a tank for storing the aqueous phase discharged from said forward extraction part, wherein each of the tank for storing the aqueous phase supplied to said forward extraction part and the tank for storing the aqueous phase discharged from said forward extraction part is separately installed outside a body of said forward extraction part.

13. The apparatus for producing a specific substance by extraction in a liquid-liquid system according to claim 7, further comprising two or more containers installed in the forward extraction part by a pipe branched for supplying an organic phase to the forward extraction part and for discharging an organic phase from the forward extraction part.

14. The apparatus for producing a specific substance by extraction in a liquid-liquid system according to claim 7, further comprising each of a branched pipe for supplying an organic phase and a branched pipe for discharging the organic phase in at least one container installed in said scrubbing part and/or said back extraction part.

15. The apparatus for producing a specific substance by extraction in a liquid-liquid system according to claim 12, wherein the tank for storing the aqueous phase supplied to said forward extraction part and the tank for storing the aqueous phase discharged from said forward extraction part are comprised of one tank separated with a partition.

16. An apparatus for producing a specific substance by extraction in a liquid-liquid system, which comprises:

a forward extraction part for extracting the specific substance from an aqueous phase into an organic phase;

a back extraction part that back-extracts the specific substance present in the organic phase of said forward extraction part into an aqueous phase of said back extraction part; and organic phase circulation lines for circulating the organic phase from said forward extraction part to said back extraction part and for circulating the organic phase from said back extraction part to said forward extraction part provided between the forward extraction part and said back extraction part, and between said back extraction part and said forward extraction part;

wherein said forward extraction part comprises an aqueous phase circulation line for circulating the aqueous phase of said forward extraction part, wherein each of said forward extraction part, said scrubbing part, and said back extraction part is operated synchronously based on the circulation of the aqueous phase and the organic phase, and wherein the aqueous phase of said forward extraction part is circulated through an aqueous phase re-circulation line provided from said forward extraction part back to said forward extraction part one or more times, and at the same time, the organic phase of said forward extraction part is circulated to said back extraction part, and then returned to said forward extraction part again, wherein the specific substance separated and refined is produced by performing repeatedly the independent circulation of the aqueous phase in said forward extraction part.

17. The apparatus for producing a specific substance by extraction in a liquid-liquid system according to claim 16, wherein
each of said forward extraction part and said back extraction part is comprised of a sealed container.

18. The apparatus for producing a specific substance by extraction in a liquid-liquid system according to claim 16, wherein
at least one of said forward extraction part and said back extraction part is comprised of a non-sealed container.

19. The apparatus for producing a specific substance by extraction in a liquid-liquid system according to claim 16, wherein
said back extraction part is provided with an aqueous phase circulation line for circulating the aqueous phase of said back extraction part.

* * * * *